US012752589B2

(12) United States Patent
Makita et al.

(10) Patent No.: US 12,752,589 B2
(45) Date of Patent: Oct. 6, 2026

(54) VEHICLE SEAT AIR-CONDITIONING DEVICE

(71) Applicant: Panasonic Intellectual Property Management Co., Ltd., Osaka (JP)

(72) Inventors: Yuki Makita, Kanagawa (JP); Kou Komori, Nara (JP); Takeshi Enya, Hyogo (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 562 days.

(21) Appl. No.: 18/308,257

(22) Filed: Apr. 27, 2023

(65) Prior Publication Data

US 2023/0302871 A1 Sep. 28, 2023

Related U.S. Application Data

(63) Continuation of application No. PCT/JP2021/037218, filed on Oct. 7, 2021.

(30) Foreign Application Priority Data

Oct. 30, 2020 (JP) ................................ 2020-182004
Oct. 30, 2020 (JP) ................................ 2020-182439
Jun. 9, 2021 (JP) ................................ 2021-096842

(51) Int. Cl.
*B60H 1/00* (2006.01)

(52) U.S. Cl.
CPC ..... *B60H 1/00285* (2013.01); *B60H 1/00821* (2013.01)

(58) Field of Classification Search
CPC ............ B60H 1/00285; B60H 1/00821; B60H 2/5657; B60H 2/565

(Continued)

(56) References Cited

U.S. PATENT DOCUMENTS 2,791,956 A * 5/1957 Guest .................. B60N 2/5628 454/120
5,450,894 A 9/1995 Inoue et al.
(Continued)

FOREIGN PATENT DOCUMENTS

DE 19607110 A1 * 8/1997 ......... B64D 11/0626
JP H05201236 A 8/1993
(Continued)

OTHER PUBLICATIONS

Japanese to English machine translation of JP2004268773A.*
(Continued)

*Primary Examiner* — Michael G Hoang
*Assistant Examiner* — Elizabeth Ann Laughlin
(74) *Attorney, Agent, or Firm* — Seed Intellectual Property Law Group LLP

(57) ABSTRACT

In a vehicle seat air-conditioning device, at least a first inlet, a second inlet, and an outlet are provided in a seat, and at least a first ventilation path, a portion of a second ventilation path, a ventilation path selection switch, a blower, and a third ventilation path are provided inside of the seat. To lead air to the third ventilation path, the ventilation path selection switch has: a first mode in which the first ventilation path is connected to the third ventilation path; a second mode in which the second ventilation path is connected to the third ventilation path; and a third mode in which the first ventilation path and the second ventilation path are connected to the third ventilation path. A controller switches between the modes of the ventilation path selection switch by selecting one of the first mode, the second mode, or the third mode.

18 Claims, 24 Drawing Sheets

(58) Field of Classification Search
USPC .......................................................... 454/120
See application file for complete search history.

(56) References Cited

U.S. PATENT DOCUMENTS

| | | | | |
|---|---|---|---|---|
| 5,921,314 | A * | 7/1999 | Schuller | F16J 15/3468 454/907 |
| 5,948,297 | A * | 9/1999 | Haubner | B60N 2/5685 219/202 |
| 9,403,460 | B2 * | 8/2016 | Hickey | B60N 2/5628 |
| 10,351,029 | B2 * | 7/2019 | Ziolek | B60N 2/5685 |
| 2008/0288185 | A1 * | 11/2008 | Sawada | F04B 35/002 702/41 |
| 2010/0011799 | A1 | 1/2010 | Sakakibara | |
| 2014/0360215 | A1 * | 12/2014 | Inaba | B60H 1/00485 62/216 |
| 2015/0266404 | A1 * | 9/2015 | Sakane | B60N 2/5657 297/452.42 |
| 2017/0028886 | A1 | 2/2017 | Zhang et al. | |
| 2018/0222364 | A1 * | 8/2018 | Higashihara | B60N 2/5642 |
| 2019/0047449 | A1 * | 2/2019 | Fujii | B60N 2/5657 |
| 2021/0354611 | A1 * | 11/2021 | Migneco | B60N 2/0022 |
| 2022/0312862 | A1 * | 10/2022 | Kano | A41D 13/0025 |

FOREIGN PATENT DOCUMENTS

| | | | | |
|---|---|---|---|---|
| JP | H05286346 | A | 11/1993 | |
| JP | 3443836 | B2 * | 9/2003 | B60H 1/00 |
| JP | 2004268773 | A * | 9/2004 | B60H 1/00 |
| JP | 2008001151 | A | 1/2008 | |
| JP | 4333512 | B2 | 9/2009 | |
| JP | 2017171130 | A | 9/2017 | |
| JP | 2018150045 | A | 9/2018 | |
| JP | 6504308 | B2 | 4/2019 | |
| JP | 2019131144 | A | 8/2019 | |
| JP | 6696815 | B2 | 5/2020 | |

OTHER PUBLICATIONS

Japanese to English machine translation of JP3443836B2.*

German to English machine translation of DE_19607110_A1.*

Office Action, dated Aug. 20, 2024, for Japanese Patent Application No. 2021-096842. 1 (8 pages) (with English Translation).

Official Communication dated Feb. 19, 2026 for German patent application No. 112021005696.4 with English translation. (8 pages).

Office Action, dated Dec. 11, 2025, for Chinese Patent Application No. 202180072591.1. (30 pages)(with English Translation).

International Search Report and Written Opinion, mailed Dec. 14, 2021, for International Patent Application No. PCT/JP2021/037218. (12 pages) (with English Translation of Search Report only).

Office Action, dated Jun. 1, 2026, for Chinese Patent Application No. 202180072591.1. (20 pages)(with English Translation).

* cited by examiner

VEHICLE SEAT AIR-CONDITIONING DEVICE

CROSS REFERENCE TO RELATED APPLICATIONS

This is a continuation application of PCT International Application No. PCT/JP2021/037218 filed on Oct. 7, 2021, designating the United States of America, which is based on and claims priority of Japanese Patent Application No. 2020-182004 filed on Oct. 30, 2020, Japanese Patent Application No. 2020-182439 filed on Oct. 30, 2020, and Japanese Patent Application No. 2021-096842 filed on Jun. 9, 2021.

FIELD

The present disclosure relates to a vehicle seat air-conditioning device that blows air to a person seated in a seat.

BACKGROUND

In recent years, there has been a demand for providing a person seated in a seat with a comfortable air-conditioned environment.

For example, Patent Literature (PTL) 1 discloses a vehicle air-conditioning device that includes an air-conditioning device body that is provided in a vehicle and generates conditioned air, a first duct inside of which conditioned air sent from the air-conditioning device body flows, a second duct having a one-end side provided inside of a seat and an other-end side from which air is drawn in so that air is drawn in from a one end from the occupant's side to the inside, a third duct having a one-end side provided inside of the seat, a blower device that sends the conditioned air drawn in through the first duct and air drawn in through the second duct to the third duct, and a blowout portion that can blow out the conditioned air and the air flowing from the one-end side to the other-end side of the third duct toward outside of the seat.

CITATION LIST

Patent Literature

PTL 1: Japanese Unexamined Patent Application Publication No. 2019-131144

SUMMARY

However, the vehicle seat air-conditioning device according to PTL 1 is susceptible of a further improvement.

In view of this, the present disclosure provides a vehicle seat air-conditioning device that can exhibit a further improvement over the above related art.

A vehicle seat air-conditioning device according to an aspect of the present disclosure is a vehicle seat air-conditioning device for use in a seat of a vehicle, the vehicle seat air-conditioning device including: a blower; a ventilation path selection switch; a controller that controls the ventilation path selection switch; a first ventilation path that leads air drawn in from a first inlet by the blower to the ventilation path selection switch, the first inlet being provided in a seating surface of the seat, the seating surface being a surface for a person to sit; a second ventilation path that leads air drawn in from a second inlet by the blower to the ventilation path selection switch, the second inlet being different from the first inlet and provided in a portion of the seat other than the seating surface; and a third ventilation path that leads at least one of the air led through the first ventilation path by the blower or the air led through the second ventilation path by the blower from the ventilation path selection switch to an outlet provided in the seat. The first inlet opens toward an interior of a cabin of the vehicle. The first inlet and the second inlet are provided vertically below the outlet. At least the first inlet, the second inlet, and the outlet are provided in the seat, and at least the first ventilation path, a portion of the second ventilation path, the ventilation path selection switch, the blower, and the third ventilation path are provided inside of the seat. The ventilation path selection switch has modes for leading air to the third ventilation path, the modes including: a first mode in which the first ventilation path is connected to the third ventilation path; a second mode in which the second ventilation path is connected to the third ventilation path; and a third mode in which the first ventilation path and the second ventilation path are connected to the third ventilation path. The controller switches between the modes of the ventilation path selection switch by selecting one of the modes from among the first mode, the second mode, and the third mode.

Note that such general and specific aspects may be implemented using any combination of systems, methods, or integrated circuits.

A vehicle seat air-conditioning device according to the present disclosure can exhibit a further improvement.

BRIEF DESCRIPTION OF DRAWINGS

These and other advantages and features of the present disclosure will become apparent from the following description thereof taken in conjunction with the accompanying drawings that illustrate a specific embodiment of the present disclosure.

Figure 1:
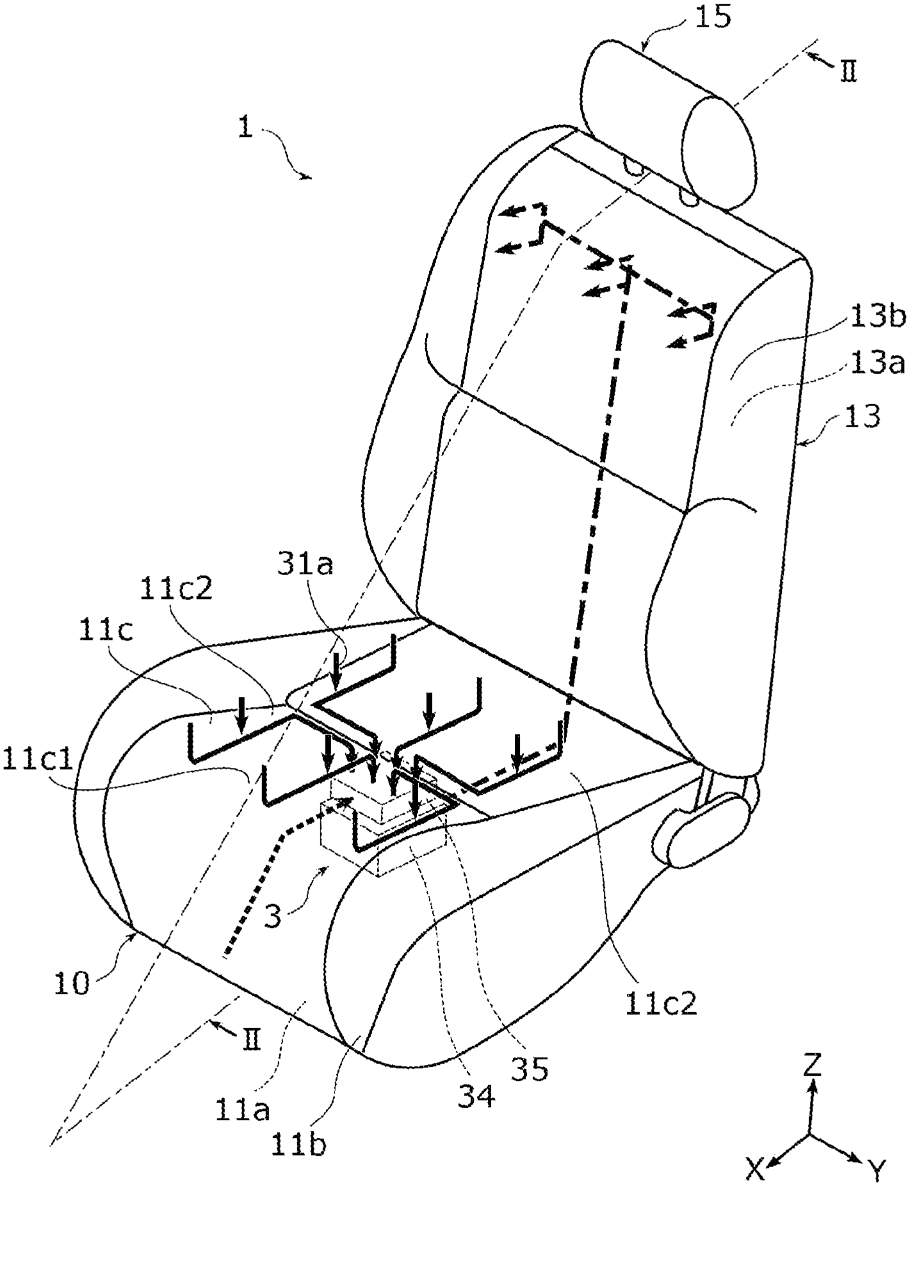
FIG. 1 is a perspective view illustrating an appearance of a seat provided with a vehicle seat air-conditioning device according to Embodiment 1.
Figure 2:
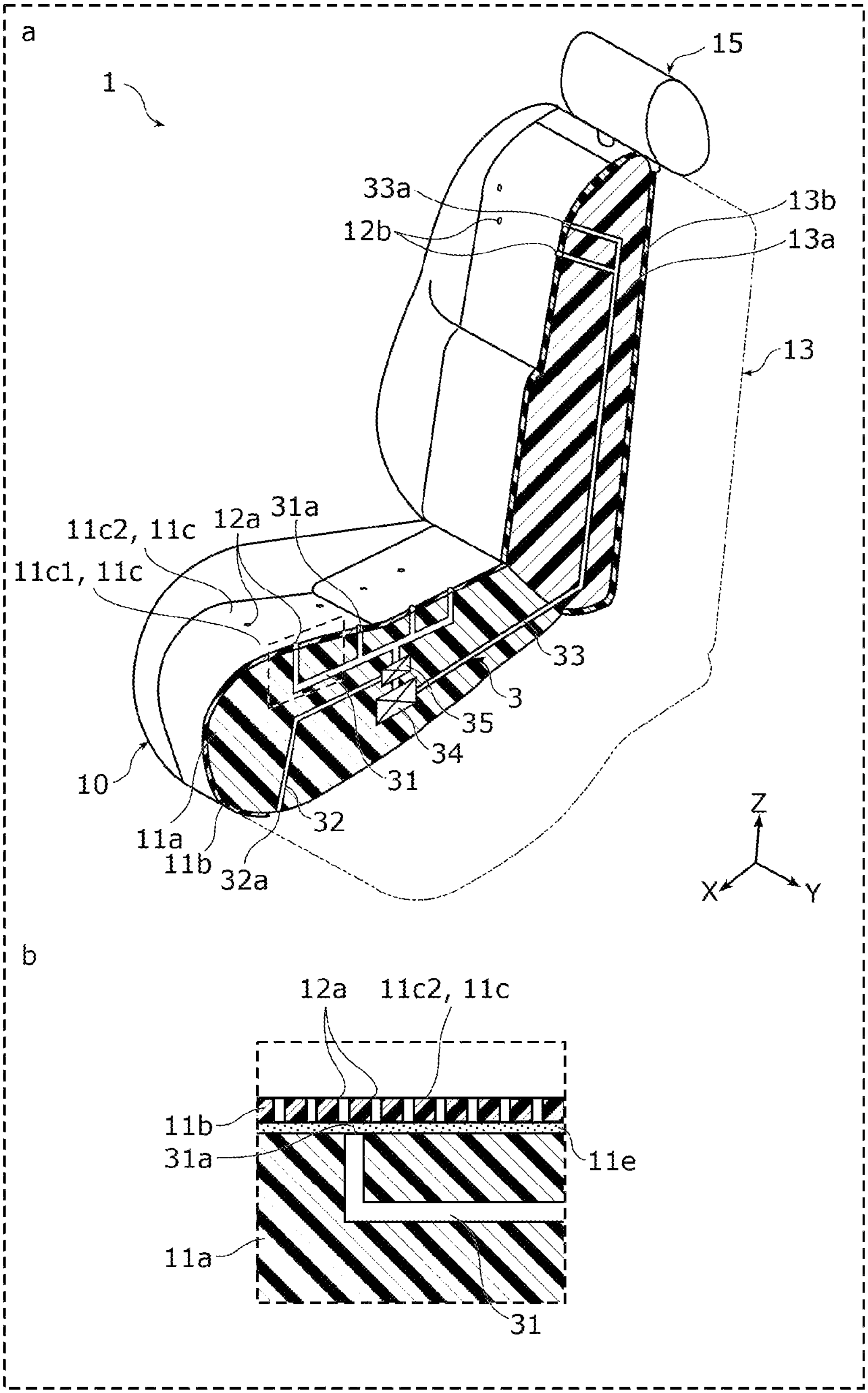

Part a of FIG. 2 includes a perspective view illustrating an appearance of a seat provided with the vehicle seat air-conditioning device and a cross sectional view illustrating the seat taken along line II-II in FIG. 1. Part b of FIG. 2 is an enlarged cross-sectional view in a frame indicated by the broken line in a of FIG. 2.

Figure 3:
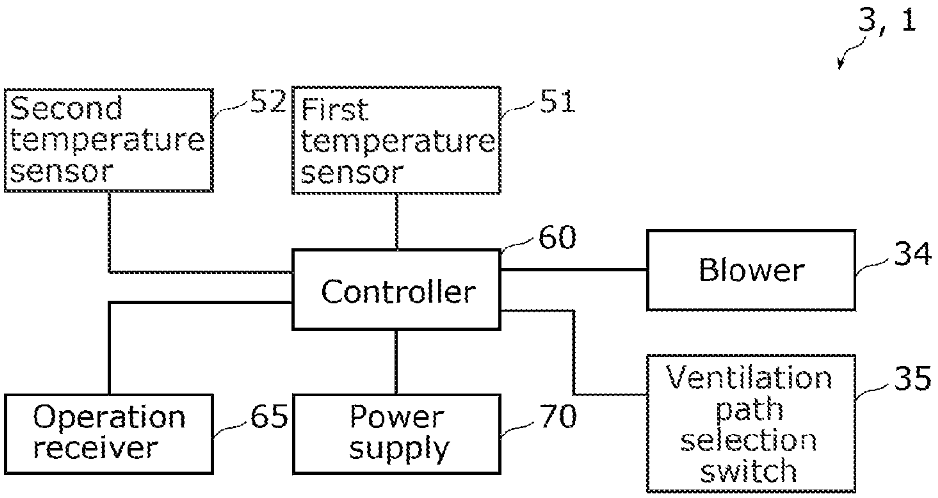

FIG. 3 is a block diagram illustrating the vehicle seat air-conditioning device according to Embodiment 1.

Figure 4:
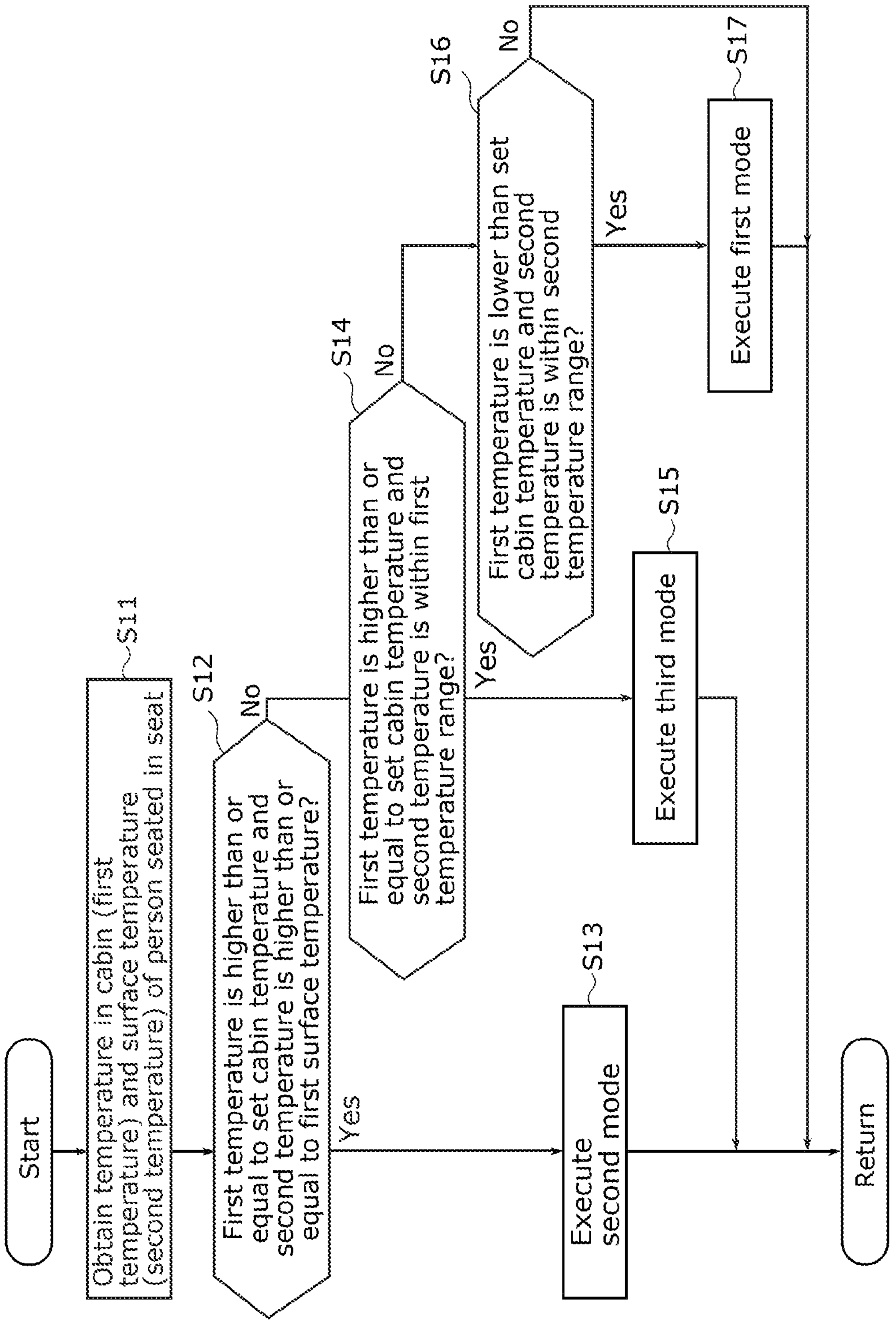

FIG. 4 is a flowchart illustrating processing performed by the vehicle seat air-conditioning device according to Embodiment 1.

Figure 5A:
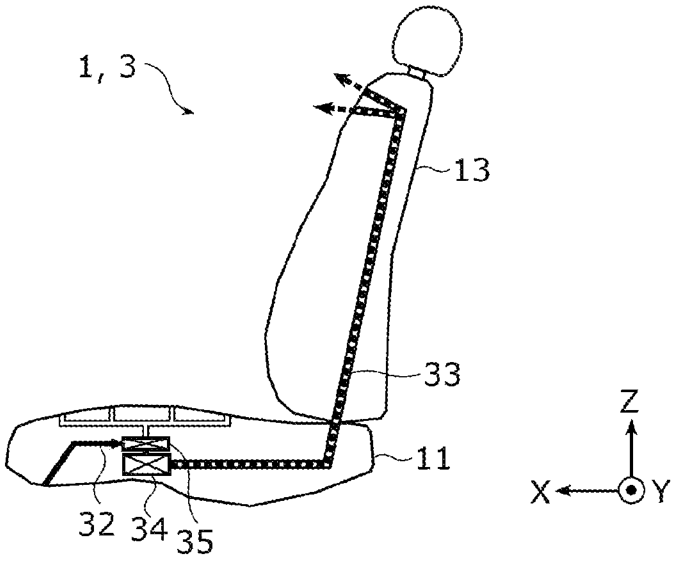

FIG. 5A is a schematic side view illustrating air flow paths in the seat when a second mode is executed.

Figure 5B:
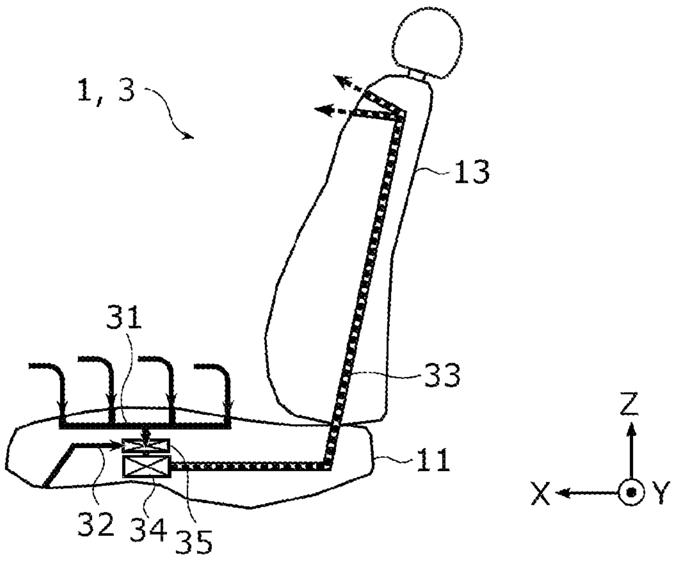

FIG. 5B is a schematic side view illustrating air flow paths in the seat when a third mode is executed.

Figure 5C:
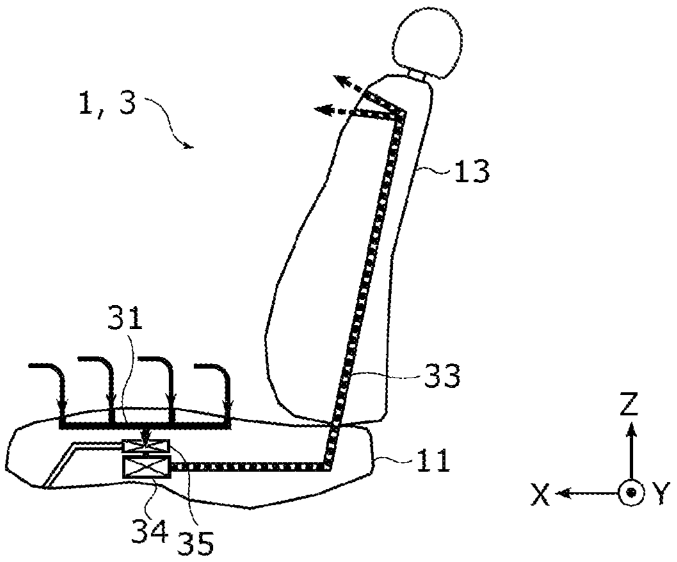

FIG. 5C is a schematic side view illustrating air flow paths in the seat when a first mode is executed.

Figure 5D:
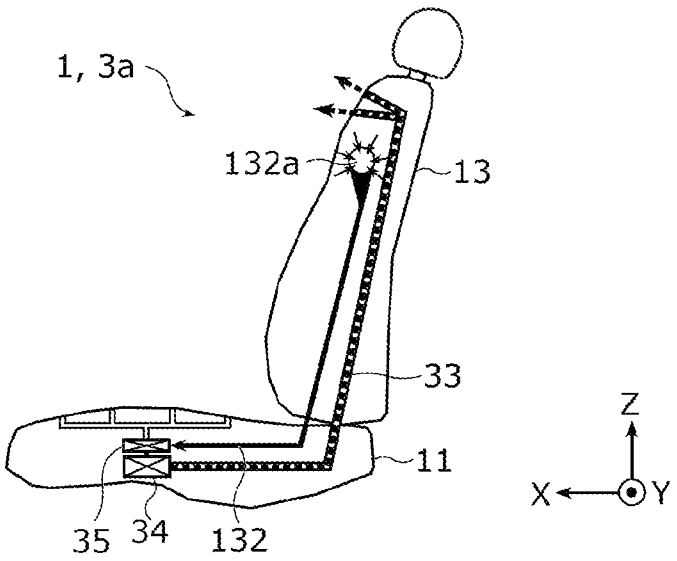

FIG. 5D is a schematic side view illustrating air flow paths in the seat when the second mode is executed in Variation 1 of Embodiment 1.

Figure 5E:
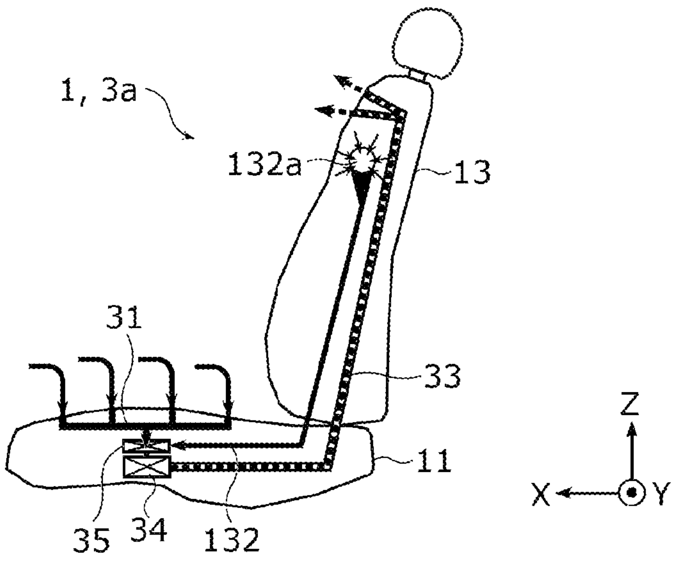

FIG. 5E is a schematic side view illustrating air flow paths in the seat when the third mode is executed in Variation 1 of Embodiment 1.

Figure 5F:
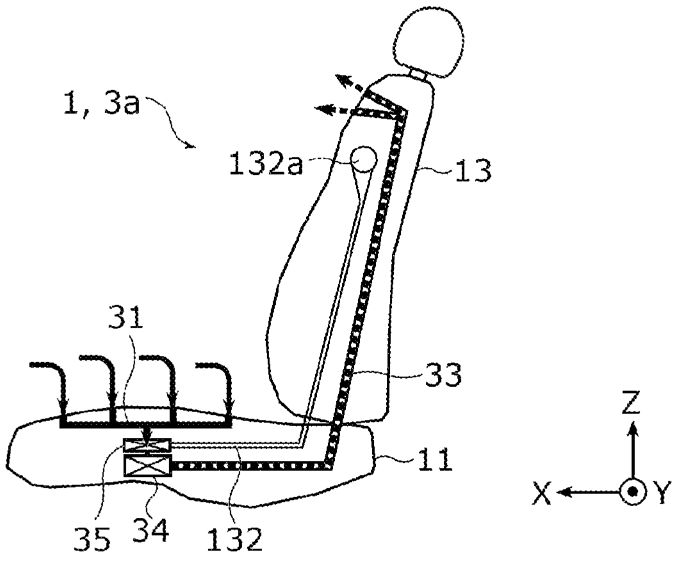

FIG. 5F is a schematic side view illustrating air flow paths in the seat when the first mode is executed in Variation 1 of Embodiment 1.

Figure 6:
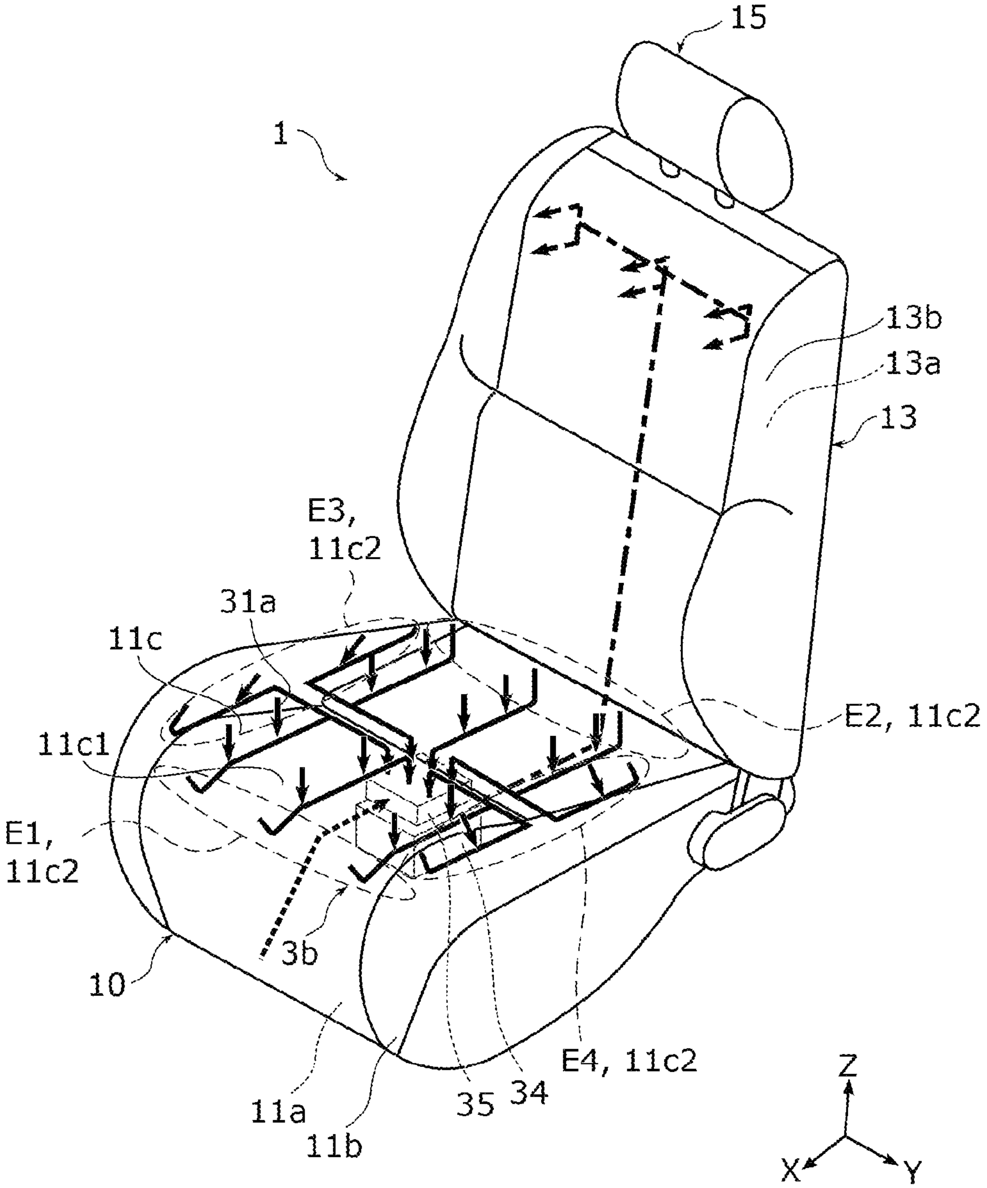

FIG. 6 is a perspective view illustrating an appearance of the seat that includes a vehicle seat air-conditioning device according to Variation 2 of Embodiment 1.

Figure 7:
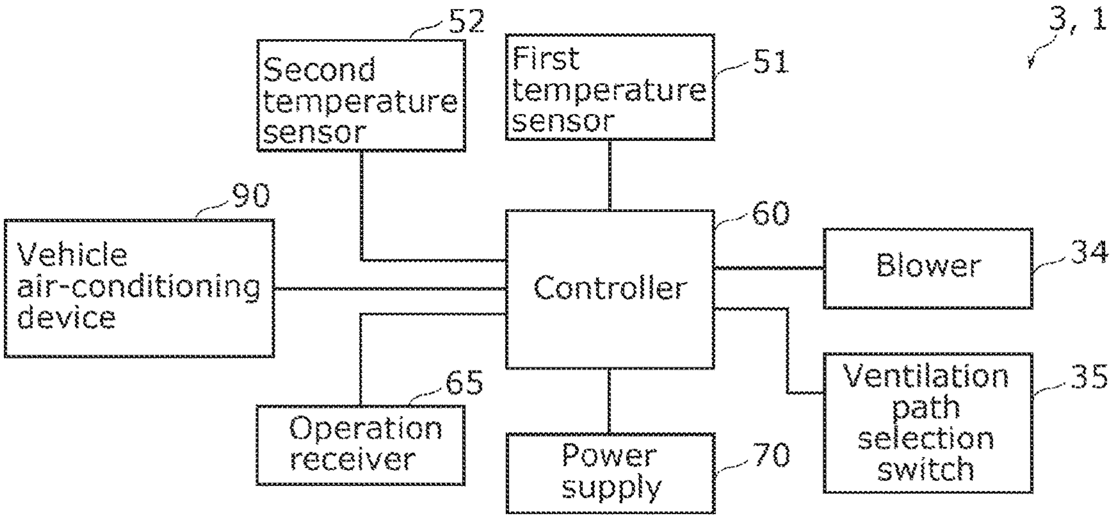

FIG. 7 is a block diagram illustrating a vehicle seat air-conditioning device according to Embodiment 2.

Figure 8:
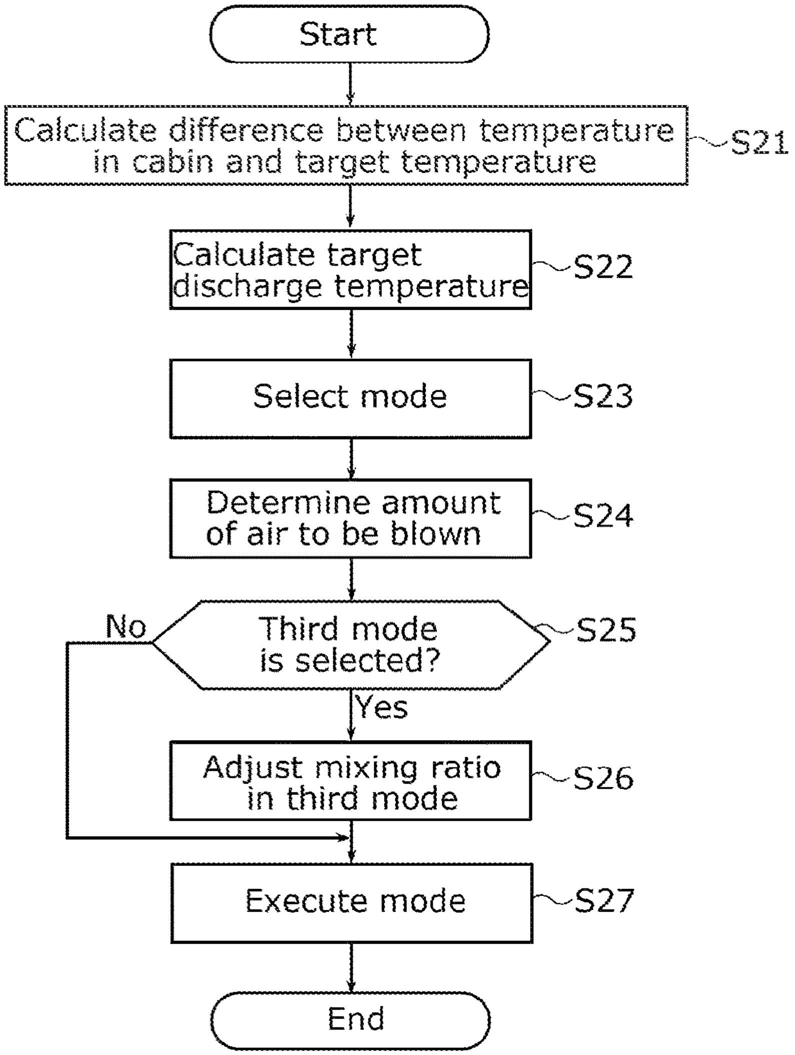

FIG. 8 is a flowchart illustrating processing performed by the vehicle seat air-conditioning device according to Embodiment 2.

Figure 9:
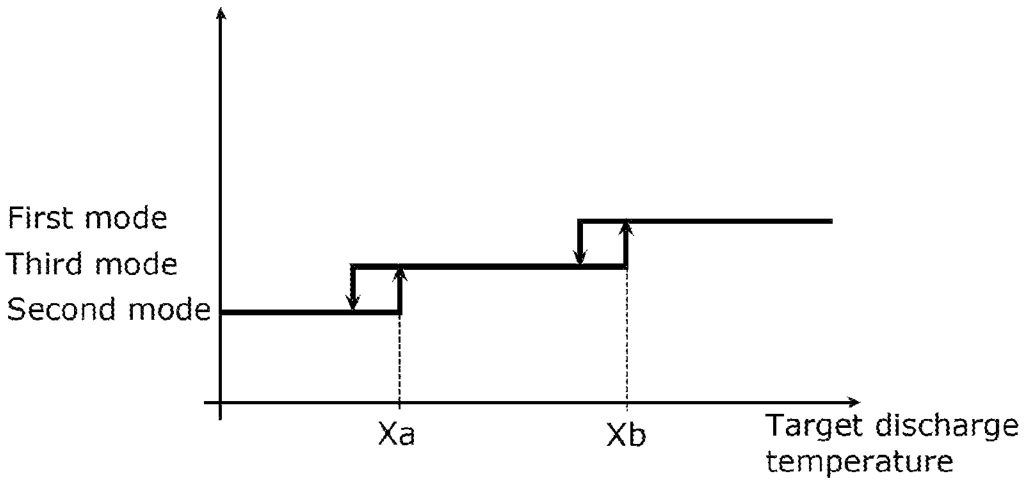

FIG. 9 is a schematic diagram illustrating switching between modes of a ventilation path selection switch.

Figure 10:
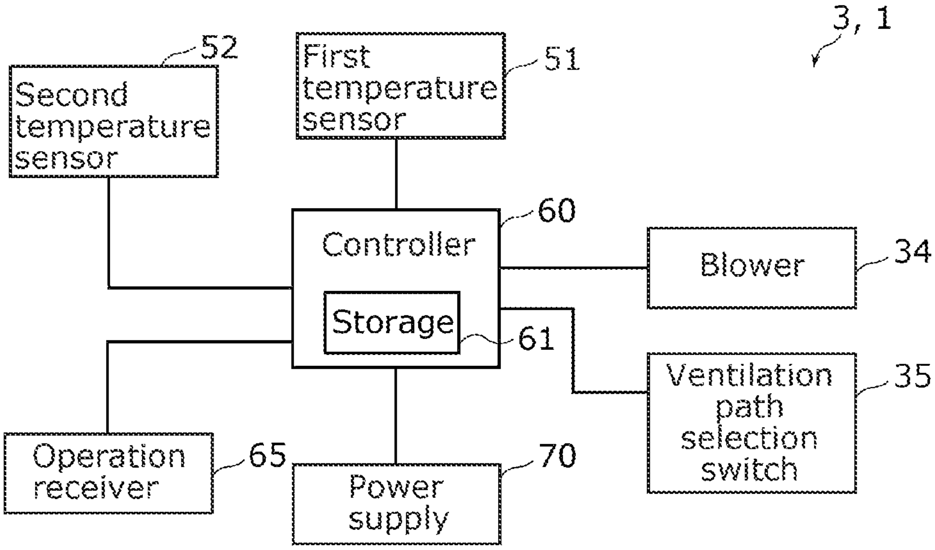

FIG. 10 is a block diagram illustrating a vehicle seat air-conditioning device according to Embodiment 3.

Figure 11:
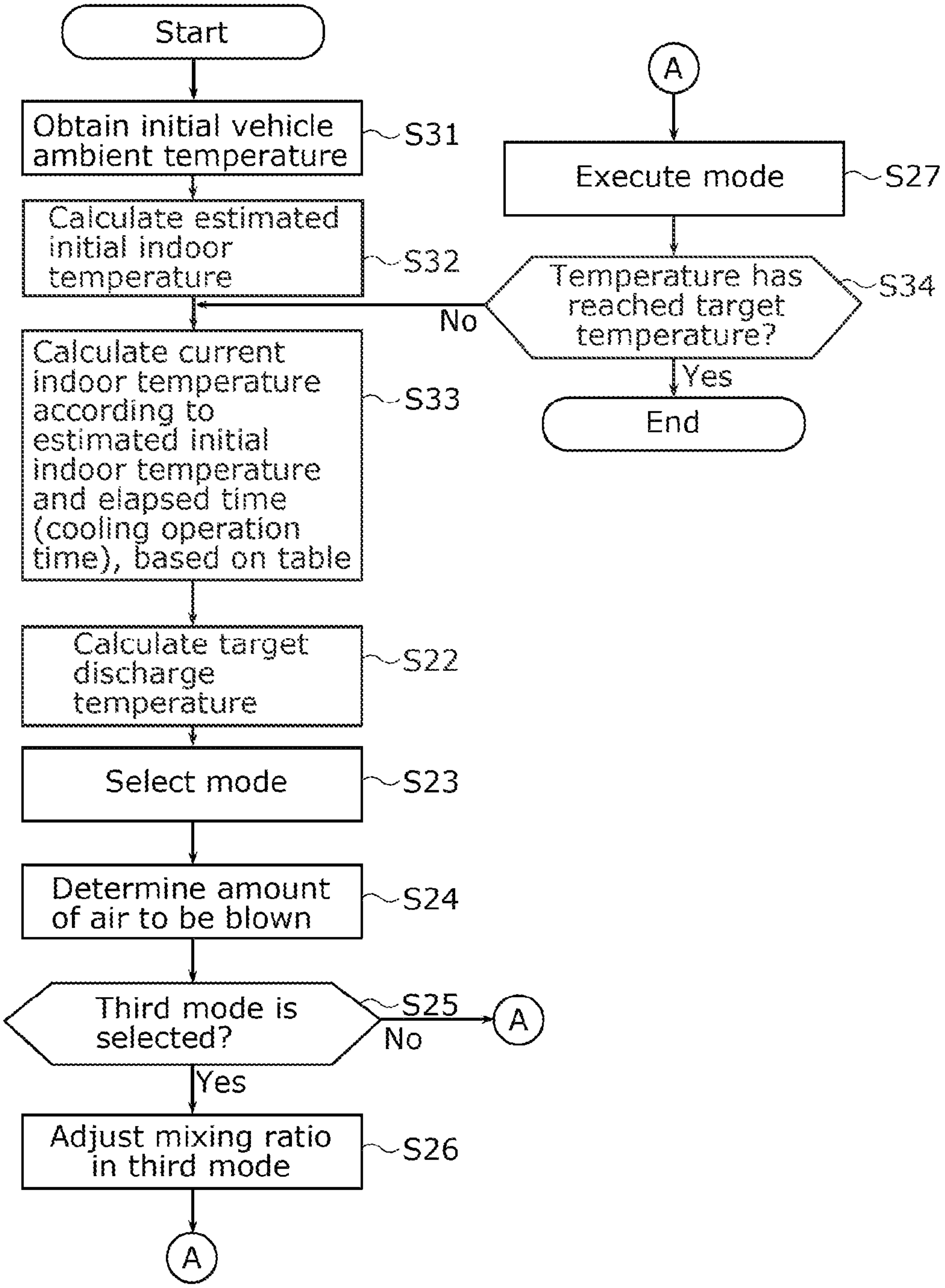

FIG. 11 is a flowchart illustrating processing performed by the vehicle seat air-conditioning device according to Embodiment 3.

Figure 12:
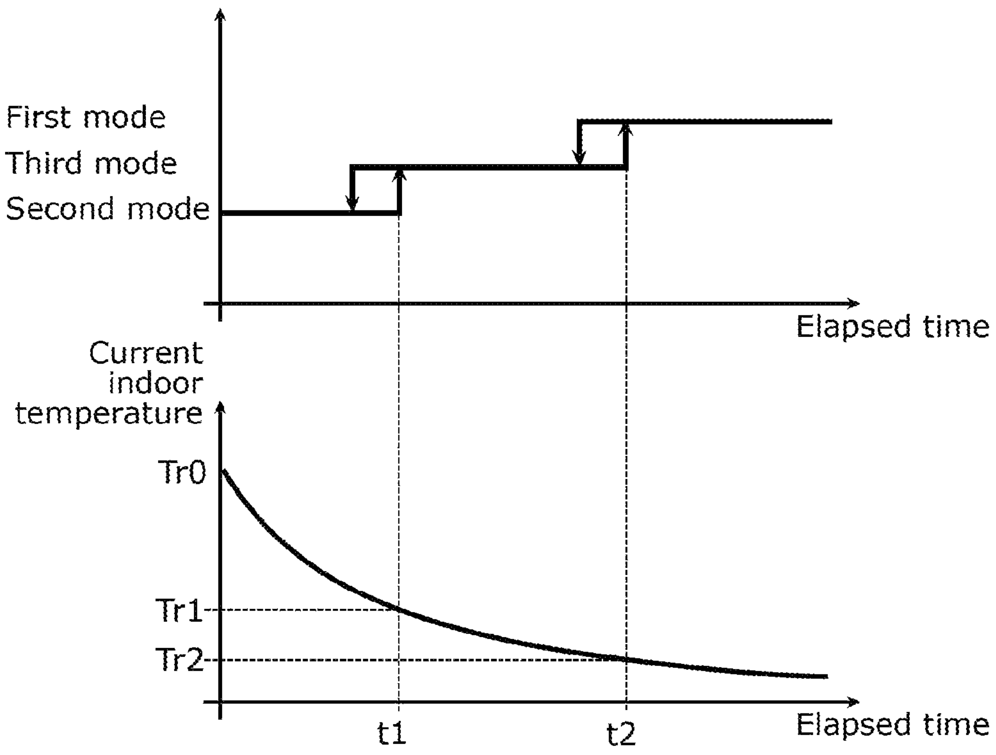

FIG. 12 includes a schematic diagram illustrating switching between modes of a ventilation path selection switch according to a target discharge temperature, and a schematic diagram illustrating a relation between an elapsed time and an estimated temperature.

Figure 13:
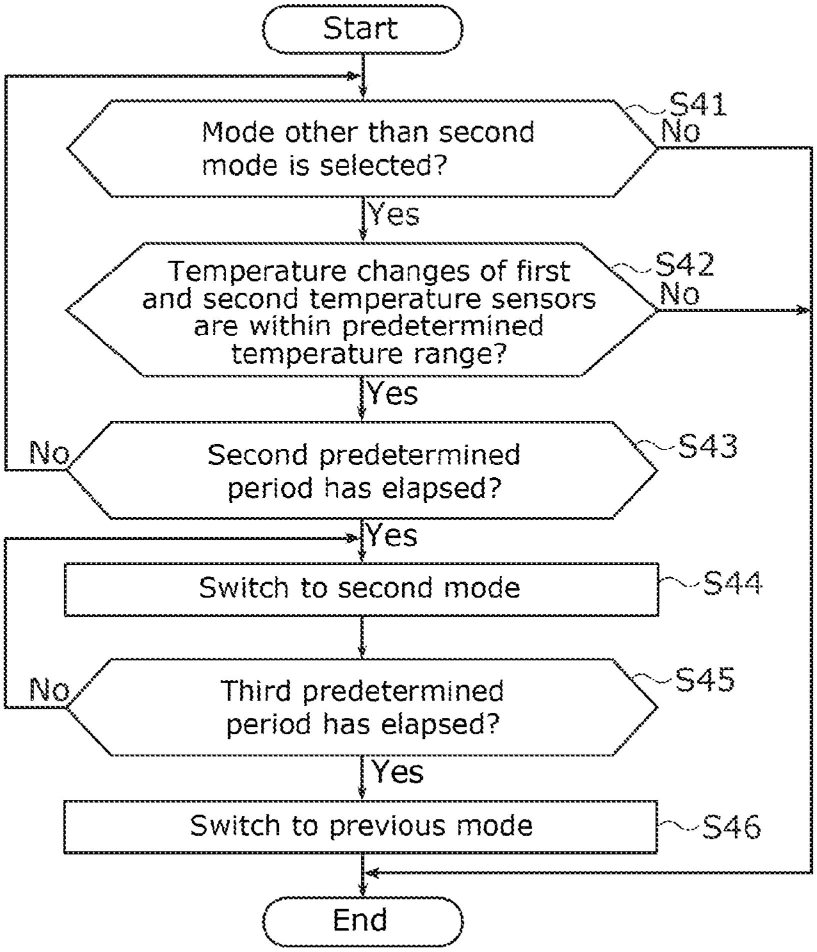

FIG. 13 is a flowchart illustrating processing performed by a vehicle seat air-conditioning device according to Embodiment 4.

Figure 14:
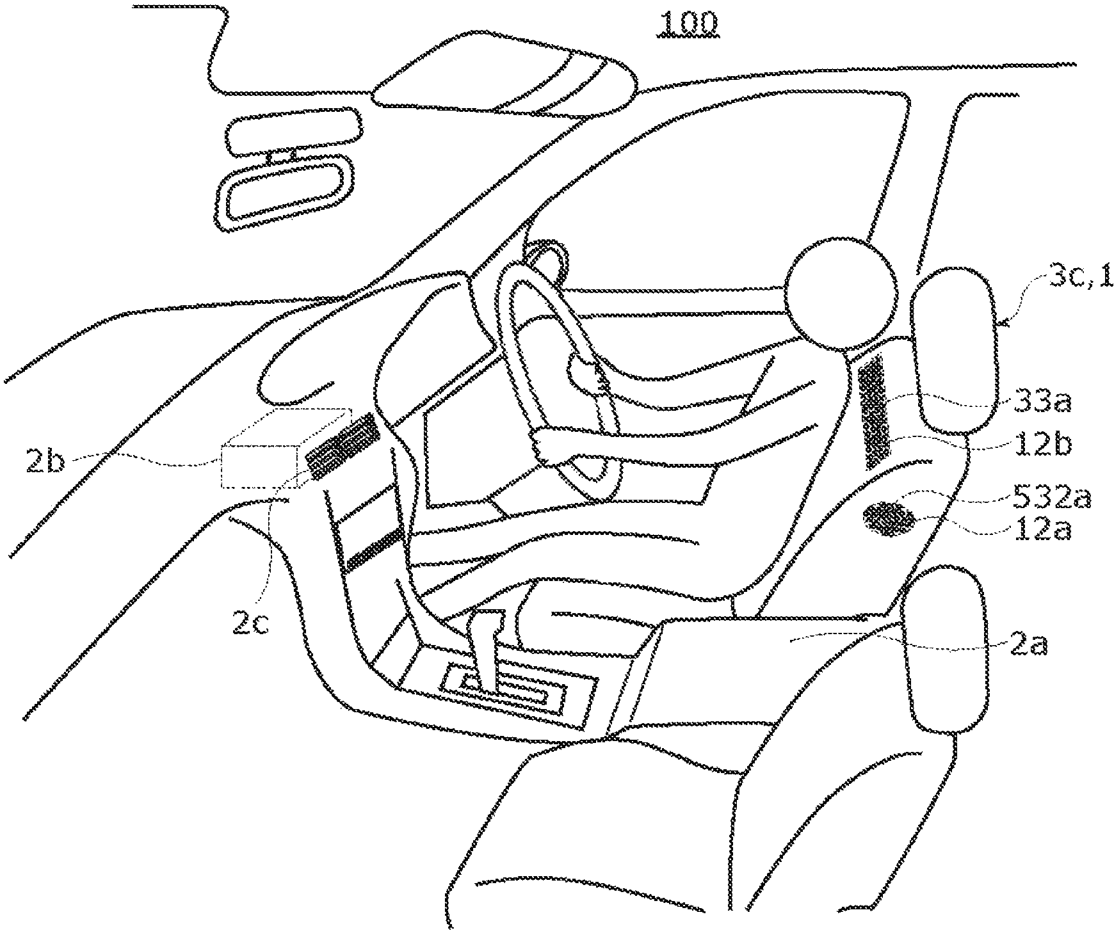

FIG. 14 is a perspective view illustrating an appearance of a vehicle air-conditioning unit in Embodiment 5, which is provided in a cabin of a vehicle.

Figure 15:
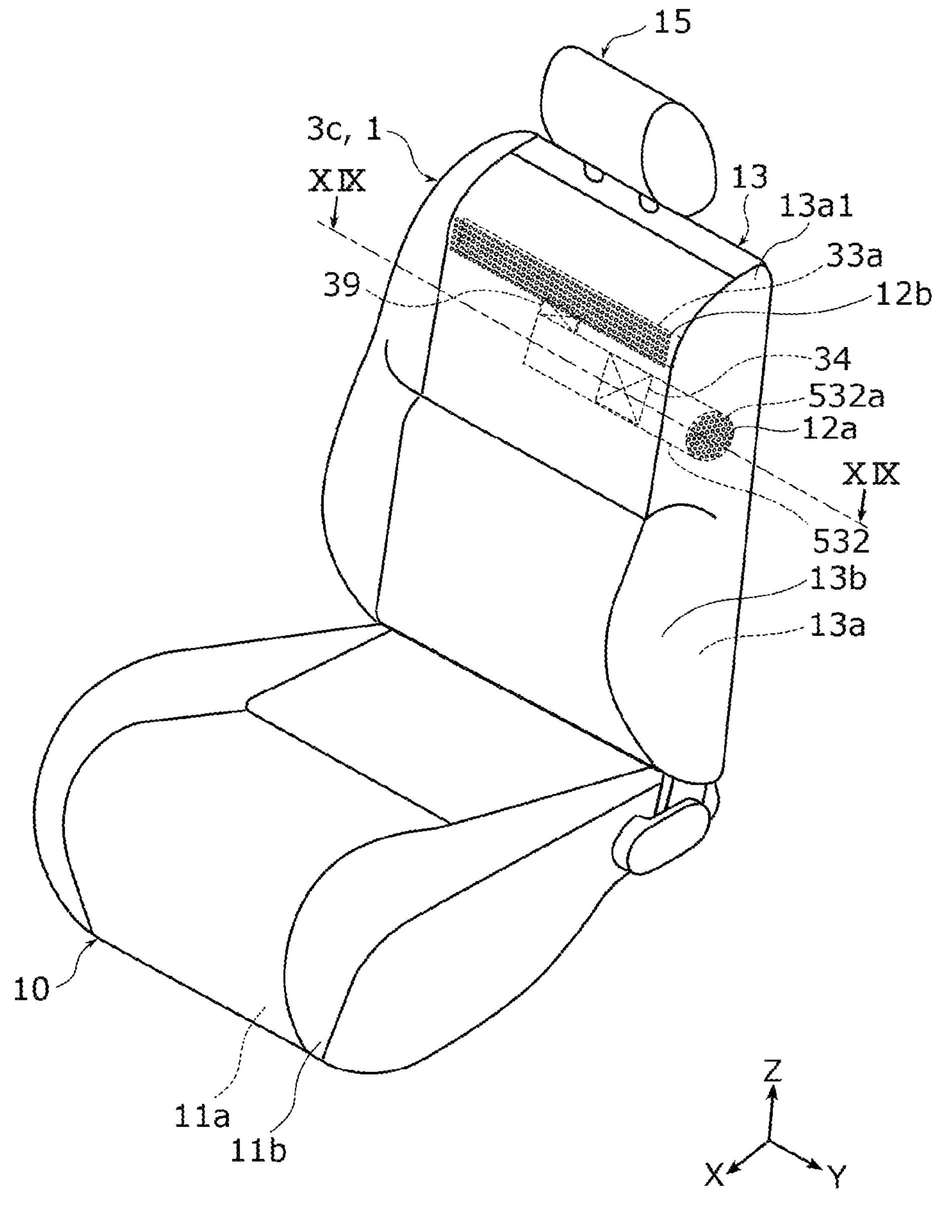

FIG. 15 is a perspective view illustrating an appearance of a vehicle seat air-conditioning device according to Embodiment 5.

Figure 16:
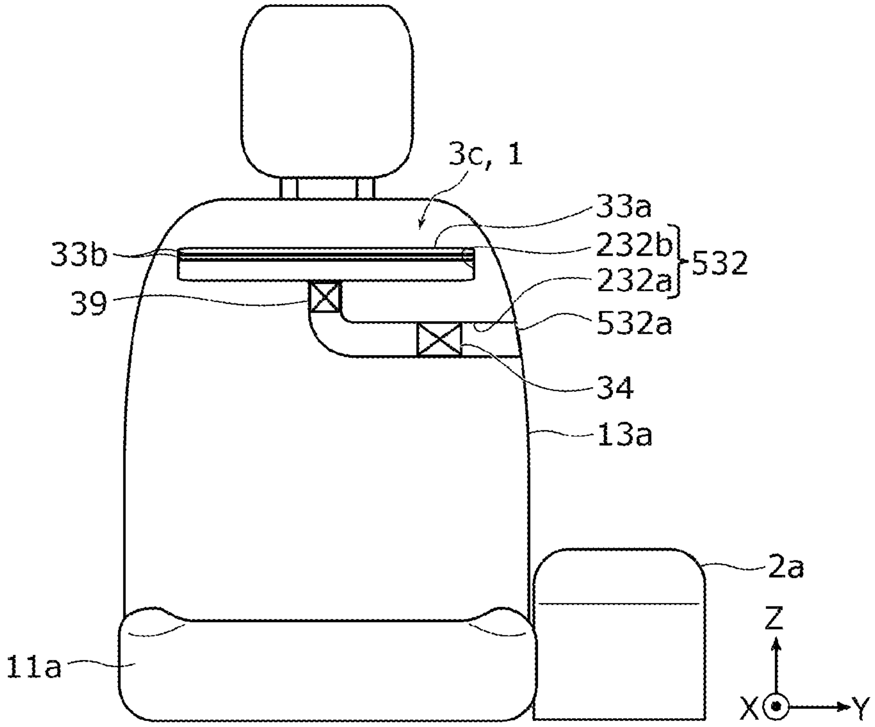

FIG. 16 is a plan view illustrating the vehicle seat air-conditioning device according to Embodiment 5.

Figure 17:
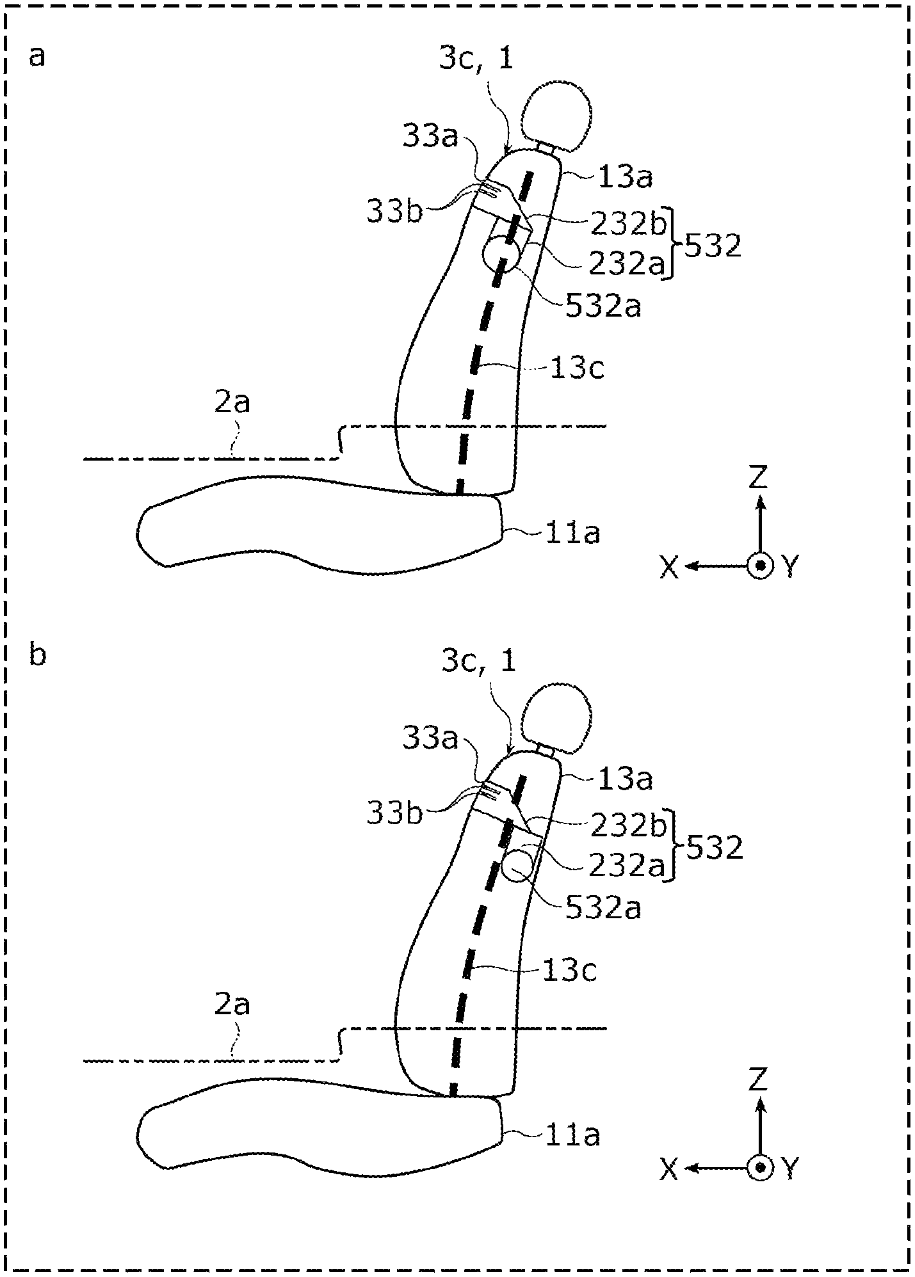

FIG. 17 includes side views illustrating the vehicle seat air-conditioning device according to Embodiment 5.

Figure 18:
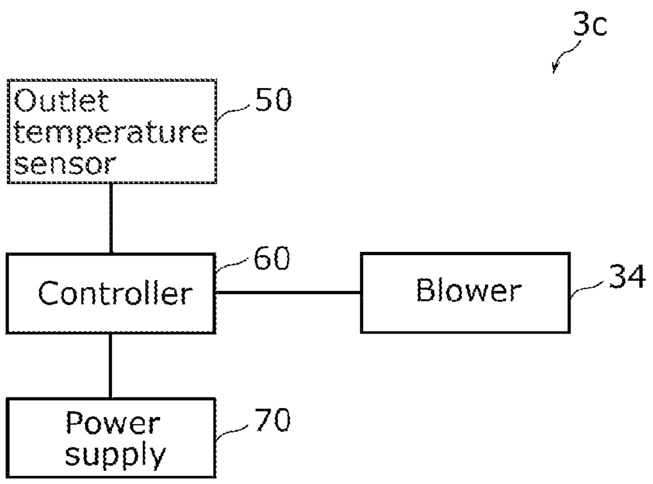

FIG. 18 is a block diagram illustrating the vehicle seat air-conditioning device according to Embodiment 5.

Figure 19:
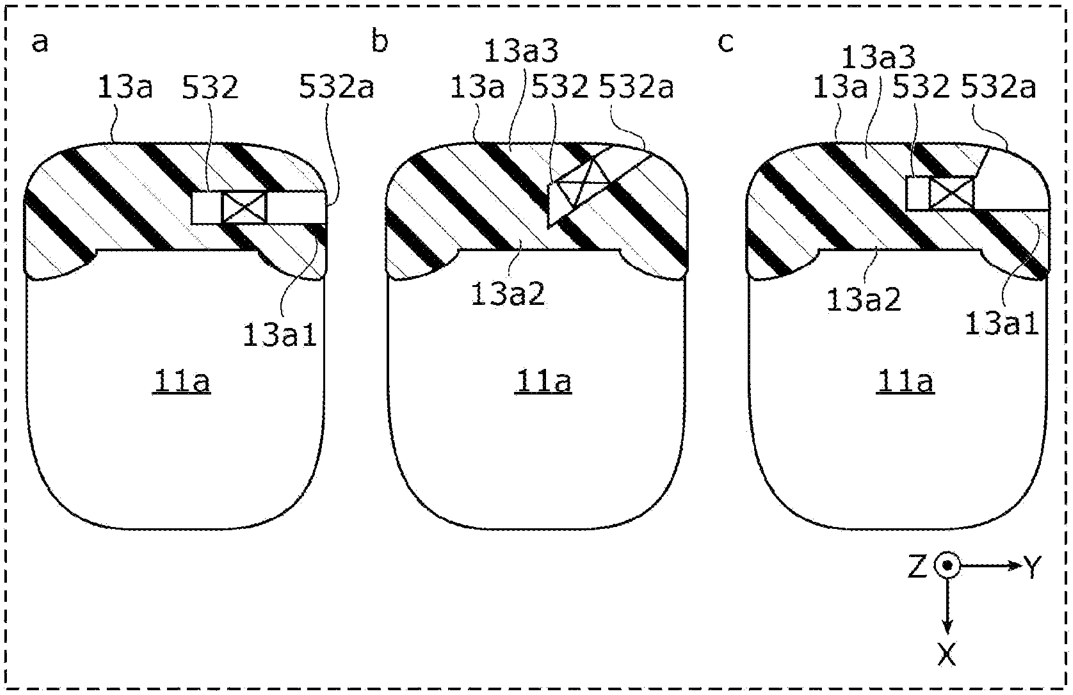

FIG. 19 includes cross sectional views of the vehicle seat air-conditioning device taken along line XIX-XIX in FIG. 15.

Figure 20:
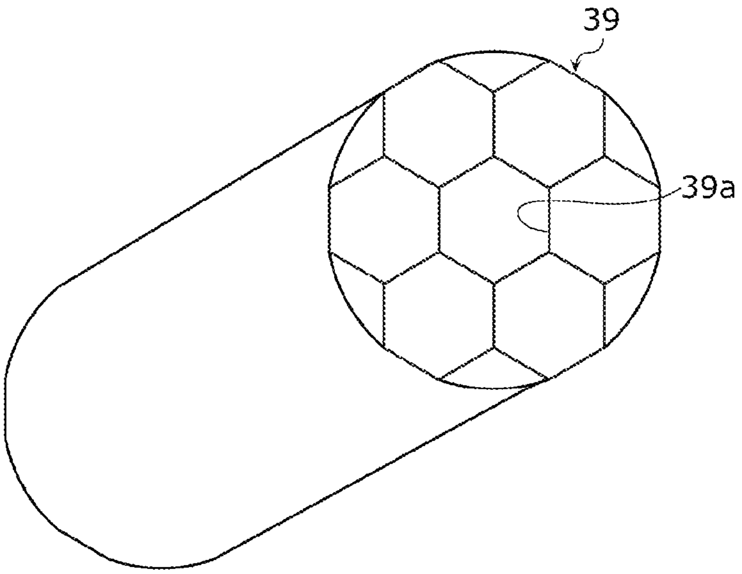

FIG. 20 is a perspective view of a three-dimensional structure.

Figure 21:
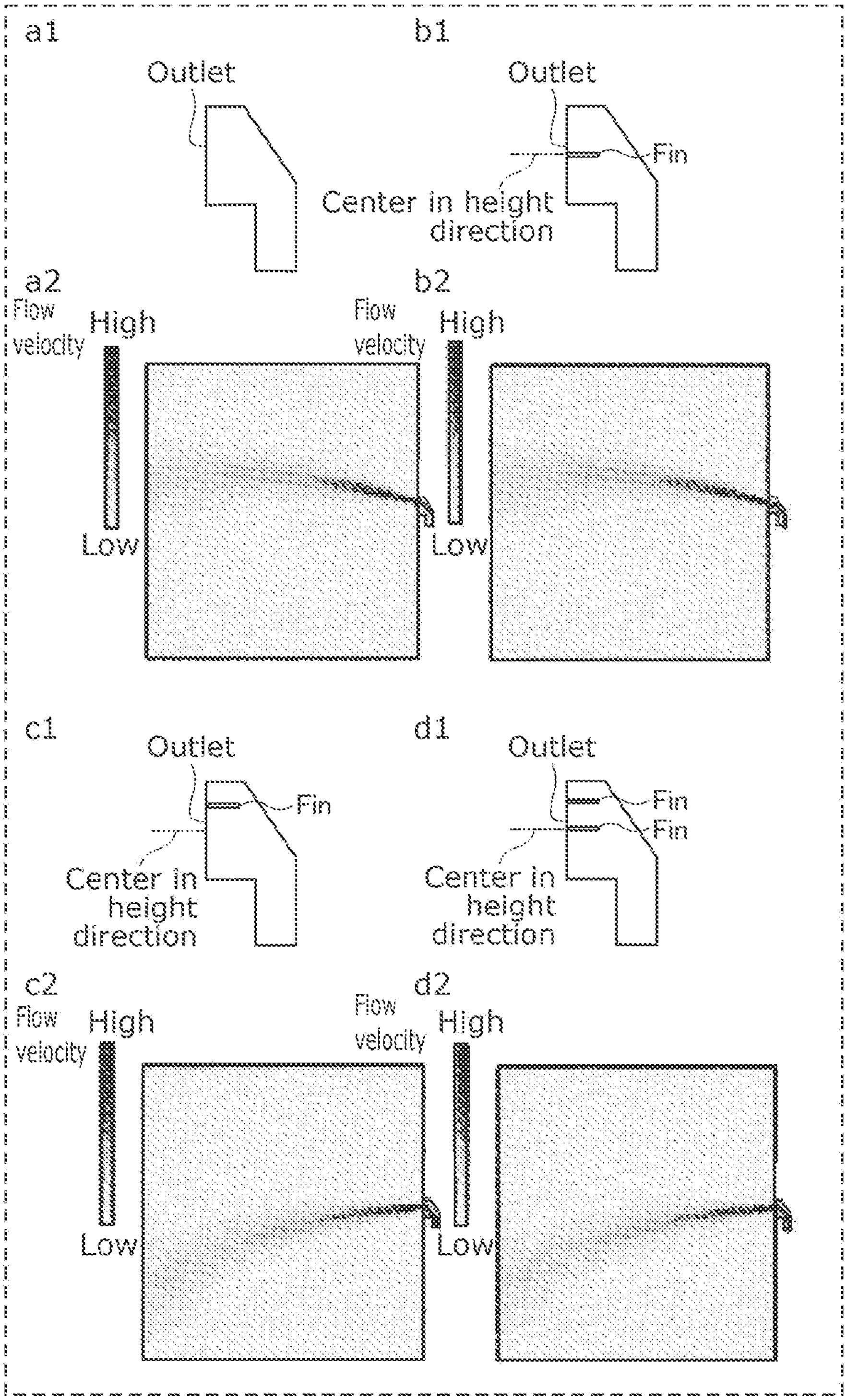

FIG. 21 illustrates results of simulation of the flow velocity of air blown out from an outlet.

Figure 22:
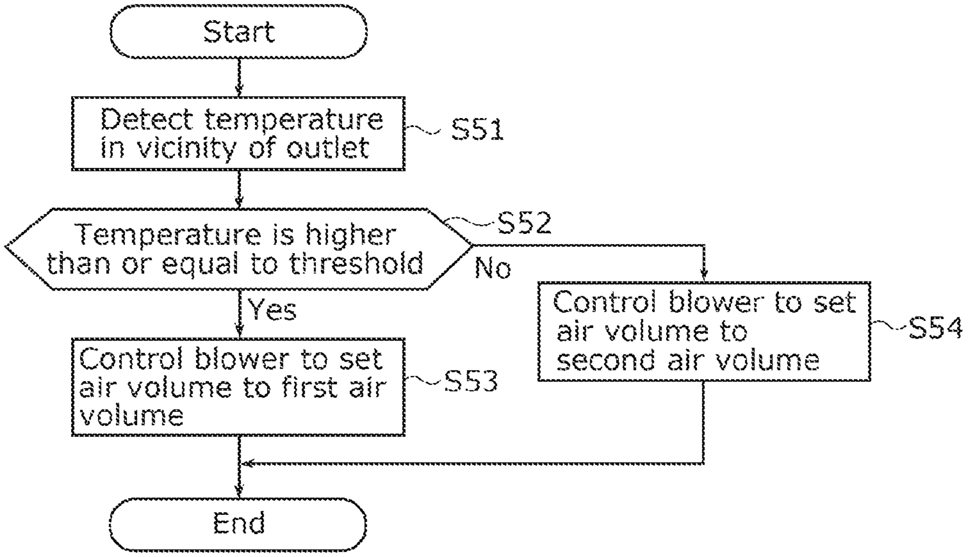

FIG. 22 is a flowchart illustrating processing performed by the vehicle seat air-conditioning device according to Embodiment 5.

Figure 23:
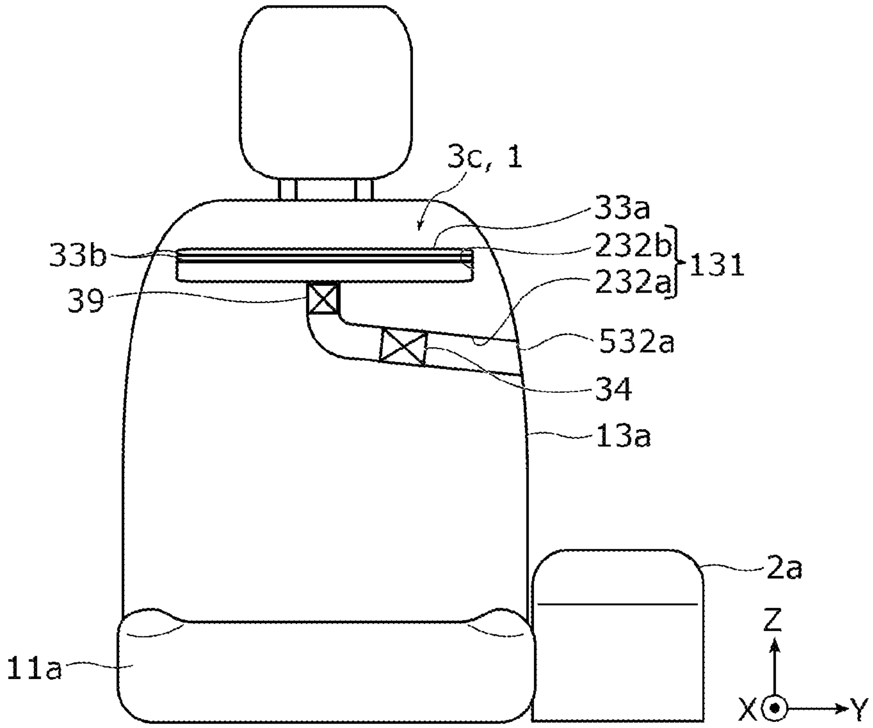

FIG. 23 is a plan view illustrating a seat provided with a vehicle seat air-conditioning device according to Variation 1 of Embodiment 5.

Figure 24:
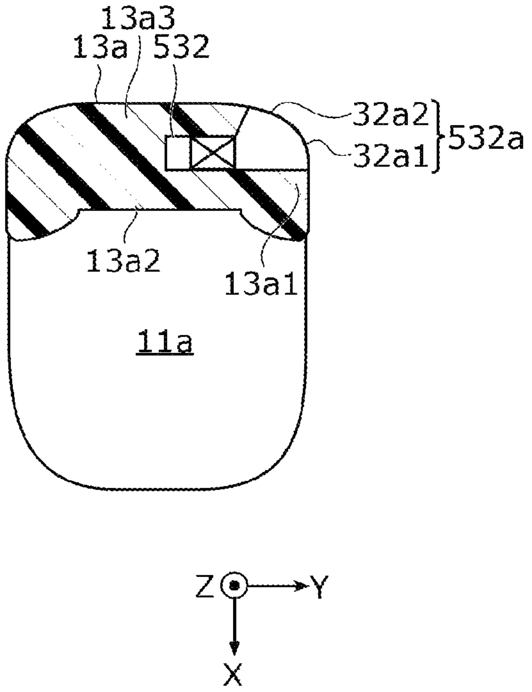

FIG. 24 is a cross sectional view illustrating a second inlet formed in a corner portion of a vehicle seat air-conditioning device according to Variation 2 of Embodiment 5.

Figure 25:
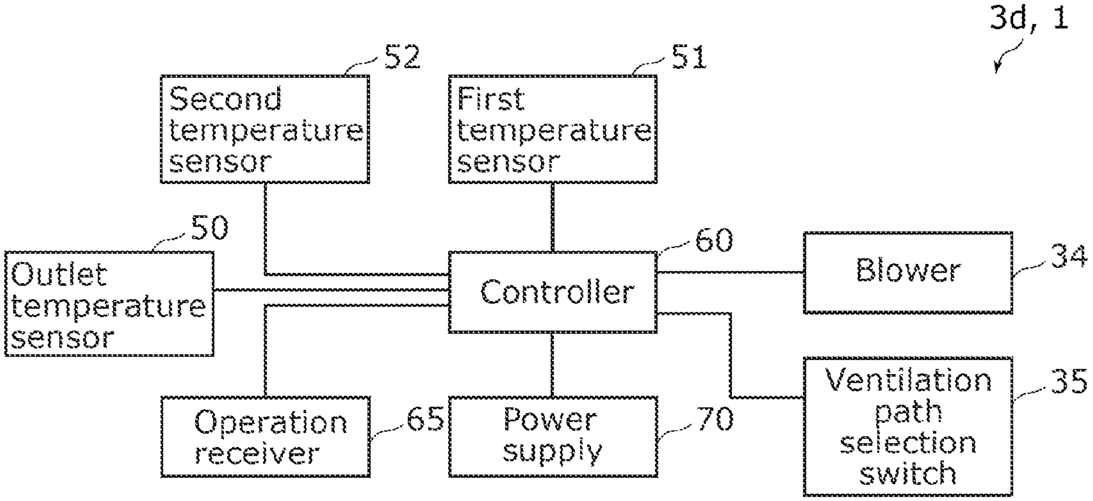

FIG. 25 is a block diagram illustrating a vehicle seat air-conditioning device according to Embodiment 6.

Figure 26:
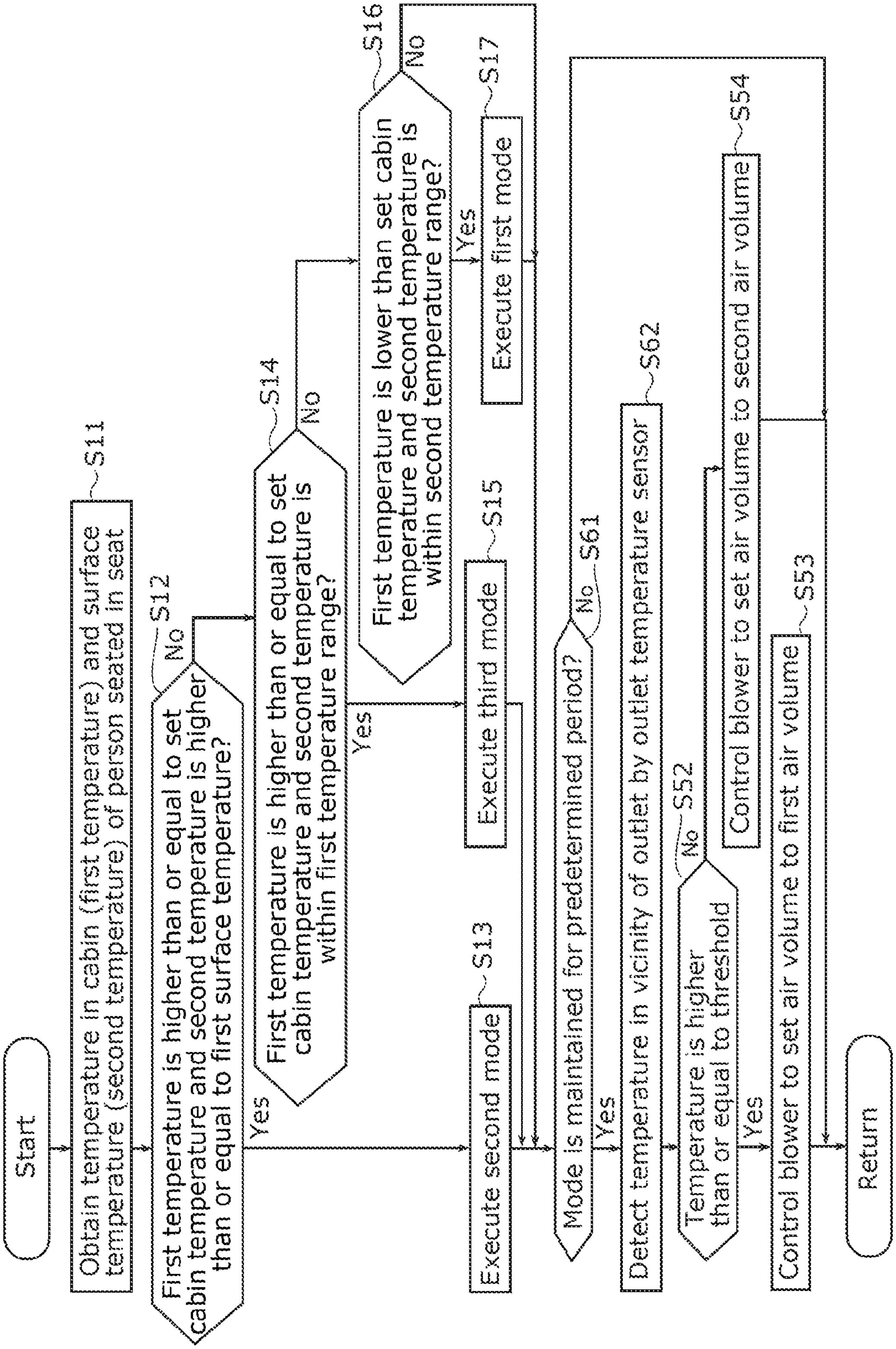

FIG. 26 is a flowchart illustrating processing performed by the vehicle seat air-conditioning device according to Embodiment 6.

DESCRIPTION OF EMBODIMENTS

However, in the vehicle seat air-conditioning device used as a conventional vehicle air-conditioning device, a structure in a vehicle is complicated due to the first duct that connects the vehicle air-conditioning device body and the vehicle seat air-conditioning device. In addition, an air-conditioning temperature is determined according to conditioned air from the vehicle air-conditioning device body, and furthermore, a ratio of sent air volumes of air that is drawn in to air that is blown out is fixed, and thus it is difficult to adjust the temperature of air discharged from the blowout portion. Accordingly, there are cases where a person seated in a seat cannot be provided a comfortable environment.

In view of this, a vehicle seat air-conditioning device according to an aspect of the present disclosure is a vehicle seat air-conditioning device for use in a seat of a vehicle, the vehicle seat air-conditioning device including: a blower; a ventilation path selection switch; a controller that controls the ventilation path selection switch; a first ventilation path that leads air drawn in from a first inlet by the blower to the ventilation path selection switch, the first inlet being provided in a seating surface of the seat, the seating surface being a surface for a person to sit; a second ventilation path that leads air drawn in from a second inlet by the blower to the ventilation path selection switch, the second inlet being different from the first inlet and provided in a portion of the seat other than the seating surface; and a third ventilation path that leads at least one of the air led through the first ventilation path by the blower or the air led through the second ventilation path by the blower from the ventilation path selection switch to an outlet provided in the seat. The first inlet opens toward an interior of a cabin of the vehicle. The first inlet and the second inlet are provided vertically below the outlet. At least the first inlet, the second inlet, and the outlet are provided in the seat, and at least the first ventilation path, a portion of the second ventilation path, the ventilation path selection switch, the blower, and the third ventilation path are provided inside of the seat. The ventilation path selection switch has modes for leading air to the third ventilation path, the modes including: a first mode in which the first ventilation path is connected to the third ventilation path; a second mode in which the second ventilation path is connected to the third ventilation path; and a third mode in which the first ventilation path and the second ventilation path are connected to the third ventilation path. The controller switches between the modes of the ventilation path selection switch by selecting one of the modes from among the first mode, the second mode, and the third mode.

According to this, irrespective of whether a duct that connects a vehicle air-conditioning device for conditioning air in the cabin of a vehicle to the vehicle seat air-conditioning device is provided as in a conventional vehicle seat air-conditioning device, air flowing or staying around the seat is drawn in by the blower and the air drawn in can be blown out from the outlet onto a person in the vehicle seat air-conditioning device according to the present disclosure. Accordingly, as compared with such a conventional vehicle seat air-conditioning device, the vehicle seat air-conditioning device according to the present disclosure can simplify the structure in a vehicle.

In the vehicle seat air-conditioning device, the first inlet is provided in the seating surface of the seat, the second inlet is provided in a portion other than the seating surface of the seat, and the outlet is also provided in the seat. Thus, the vehicle seat air-conditioning device has a configuration for drawing in air flowing or staying around the seat and blowing out, from the outlet, the air drawn in onto a person. Furthermore, in the vehicle seat air-conditioning device, the first ventilation path, a portion of the second ventilation path, the ventilation path selection switch, the blower, and the third ventilation path are provided inside of the seat. Thus, all the elements for air conditioning that is suitable for a state of a person seated in the seat are provided inside of the seat. Accordingly, as compared with the conventional vehicle seat air-conditioning device, the vehicle seat air-conditioning device according to the present disclosure can simplify the structure.

In the vehicle seat air-conditioning device, by using the ventilation path selection switch, only the air drawn in from the first inlet can be discharged from the outlet, only the air drawn in from the second inlet can be discharged from the outlet, or the air simultaneously drawn in from both the first inlet and the second inlet can be discharged from the outlet. Thus, air can be drawn in from different inlets, namely, the first inlet and the second inlet, and air drawn in from an inlet and air drawn in from a different inlet can be separately discharged from the outlet or mixed air can be discharged from the outlet, so that the temperature of air discharged from the outlet can be made different. Thus, the vehicle seat air-conditioning device can provide air conditioning suitable for a state of a person seated in the seat by switching air discharged from the outlet of the seat.

Thus, the vehicle seat air-conditioning device can provide a person seated in the seat with a comfortable air-conditioned environment while a structure in a vehicle is made less complicated.

In particular, the first inlet and the second inlet are provided vertically below the outlet, and thus for example, it is also possible that the first inlet is provided in a portion corresponding to legs of a person, the second inlet is provided in a portion where effects are less likely to be exerted onto the body of a person, and the outlet is provided in a portion corresponding to the upper half of the body of the person. In this case, an air current can be generated by drawing in air from at least one of the first inlet or the second inlet, and also air can be blown onto a person by discharging the air drawn in from the outlet. Accordingly, an air current that covers the body of a person can be generated, and thus conditioned air can be kept staying around a person seated in the seat, and thus a comfortable air-conditioned environment can be provided with minimum air-conditioning energy.

Furthermore, the ventilation path selection switch has a first mode in which the first ventilation path is connected to the third ventilation path.

According to this, for example, air drawn in from the first inlet can be blown onto the upper half of the body of a person. By discharging air from the outlet, the air blown onto the upper half of the body of the person is drawn in from the first inlet in the seating surface, or in other words, is drawn in via the upper half of the body of the person seated in the seat from the outlet. Accordingly, an air current that covers from the upper half of the body of a person to the buttocks and thighs can be generated.

For example, when a person is seated in the seat for a long time while the vehicle air-conditioning device is performing a cooling operation or when the vehicle air-conditioning device is performing a heating operation, for instance, the buttocks and the thighs of a person in contact with the seating surface may get damp due to sweat. However, in the vehicle seat air-conditioning device, an air current can be generated around the buttocks and thighs of a person by drawing in ambient air from the first inlet, and thus the buttocks and thighs of the person can be prevented from getting damp. Accordingly, a person seated in the seat can be provided with a comfortable air-conditioned environment.

Furthermore, the ventilation path selection switch has a second mode in which the second ventilation path is connected to the third ventilation path.

According to this, for example, air drawn in from the second inlet can be blown onto the upper half of the body of a person. Thus, when the second inlet is provided at a position where air discharged from the vehicle air-conditioning device can be drawn in (for example, a lower portion of the seat), a comfortable air-conditioned environment can be provided for a person seated in the seat by quickly blowing cool air and warm air onto the upper half of the body of the person.

For example, when the outdoor temperature is high or when an amount of solar radiation is great, the temperature in the cabin tends to be high immediately after a person gets into a vehicle. The vehicle seat air-conditioning device according to the present disclosure can blow air drawn in from the second inlet onto the upper half of the body of a person seated in the seat. In particular, during a cooling operation of the vehicle air-conditioning device, cooled air can be taken in from the second inlet, and thus the body of a person seated in the seat can be cooled.

When the outdoor temperature is low, for instance, the temperature in the cabin is low immediately after a person gets into a vehicle. The vehicle seat air-conditioning device according to the present disclosure can blow air drawn in from the second inlet onto the upper half of the body of a person seated in the seat. In particular, during a heating operation of the vehicle air-conditioning device, heated air can be taken in from the second inlet, and thus the body of a person seated in the seat can be warmed. Thus, the vehicle seat air-conditioning device can provide a comfortable air-conditioned environment for a person seated in the seat.

Furthermore, the ventilation path selection switch has a third mode in which the first ventilation path and the second ventilation path are connected to the third ventilation path.

According to this, for example, air drawn in from the first inlet and the second inlet can be blown onto the upper half of the body of a person. By discharging air from the outlet, the air blown onto the upper half of the body of the person is drawn in from the first inlet in the seating surface, or in other words, is drawn in via the upper half of the body of the person seated in the seat from the outlet. Accordingly, an air current that covers from the upper half of the body of a person to the buttocks and thighs can be generated.

For example, during a cooling operation of the vehicle air-conditioning device, there are cases where although the temperature of air blown out by the vehicle air-conditioning device has sufficiently lowered, the temperature in the cabin is not sufficiently lowered. The vehicle seat air-conditioning device according to the present disclosure can mix air around the seat drawn in from the first inlet with air cooled by the vehicle air-conditioning device, which is drawn in from the second inlet, and can blow the mixed air onto the upper half of the body of the person. Accordingly, the upper half of the body of the person seated in the seat can be prevented from getting excessively cold, so that the body can be moderately cooled. Further, an air current can be generated around the buttocks and thighs of a person by drawing in ambient air from the first inlet, and thus the buttocks and thighs of the person can be prevented from getting damp. Thus, the vehicle seat air-conditioning device can provide a person seated in the seat with a comfortable air-conditioned environment.

Furthermore, the controller switches between the modes of the ventilation path selection switch by selecting one of the modes from among the first mode, the second mode, and the third mode.

According to this, the controller can select one of the modes from among the first mode, the second mode, and the third mode, and thus can provide an air-conditioned environment according to a person seated in the seat.

The vehicle seat air-conditioning device according to another aspect of the present disclosure includes: a first temperature sensor that detects a temperature in the cabin of the vehicle; and a second temperature sensor that detects a surface temperature of a person seated in the seat. The controller switches between the modes of the ventilation path selection switch, based on information indicating a first temperature detected by the first temperature sensor and information indicating a second temperature detected by the second temperature sensor.

According to this, the first temperature that is a temperature in the cabin and the second temperature that is a surface temperature of a person seated in the seat can be detected. Accordingly, the modes of the ventilation path selection switch can be automatically switched according to the first temperature and the second temperature, and thus a person seated in the seat can be provided with a more comfortable air-conditioned environment.

In the vehicle seat air-conditioning device according to another aspect of the present disclosure, the controller causes the ventilation path selection switch to execute the second mode when the first temperature detected by the first temperature sensor is higher than or equal to a set cabin temperature, and the second temperature detected by the second temperature sensor is higher than or equal to a first surface temperature.

For example, when the outdoor temperature is high or when an amount of solar radiation is great, the temperature in the cabin tends to be high immediately after a person gets into a vehicle. At this time, the first temperature is higher than or equal to the set cabin temperature that is set to a temperature at which a person feels comfortable. Furthermore, when the first surface temperature is set to a temperature at which a person seated in the seat feels extremely hot, the second temperature may be higher than or equal to the first surface temperature.

According to this, in the above case, during a cooling operation of the vehicle air-conditioning device, the air cooled by the vehicle air-conditioning device can be taken in from the second inlet, and thus the body of a person seated in the seat can be cooled. Thus, the vehicle seat air-conditioning device can provide a person seated in the seat with a more comfortable air-conditioned environment.

In the vehicle seat air-conditioning device according to another aspect of the present disclosure, the controller causes the ventilation path selection switch to execute the third mode when the first temperature detected by the first temperature sensor is higher than or equal to a set cabin temperature, and the second temperature detected by the second temperature sensor is lower than a first surface temperature and is higher than or equal to a second surface temperature that is lower than the first surface temperature.

For example, when the outdoor temperature is high or when an amount of solar radiation is great, there are cases where although the indoor space is getting cool owing to the vehicle air-conditioning device, the temperature in the cabin (the first temperature) is still higher than or equal to the set cabin temperature. Furthermore, when a temperature range lower than the first surface temperature and higher than or equal to the second surface temperature is set to a range of temperatures at which a person seated in the seat feels hot, the second temperature may be in the temperature range.

According to this, in the above case, during a cooling operation of the vehicle air-conditioning device, the vehicle seat air-conditioning device can take in air in the cabin that is not completely cooled (for example, air having an ordinary temperature) and air cooled by the vehicle air-conditioning device. The vehicle seat air-conditioning device can mix air having an ordinary temperature in the cabin with cooled air, and blow the mixed air onto a person. Thus, a person seated in the seat does not feel excessive coldness, and his/her body can be moderately cooled. Accordingly, the vehicle seat air-conditioning device can provide a person seated in the seat with a more comfortable air-conditioned environment.

In the vehicle seat air-conditioning device according to another aspect of the present disclosure, the controller causes the ventilation path selection switch to execute the first mode when the first temperature detected by the first temperature sensor is lower than a set cabin temperature, and the second temperature detected by the second temperature sensor is lower than a second surface temperature and is higher than or equal to a third surface temperature that is lower than the second surface temperature.

For example, when the indoor space is stably cooled by the vehicle air-conditioning device and the temperature in the cabin (the first temperature) is lower than the set cabin temperature and furthermore, when a temperature range lower than the second surface temperature and higher than or equal to the third surface temperature is set to a range of temperatures at which a person seated in the seat feels slightly hot or comfortable, the second temperature may be in the above temperature range.

According to this, in the above case, during a cooling operation of the vehicle air-conditioning device, the vehicle seat air-conditioning device can generate an air current around the buttocks and thighs of a person by drawing in ambient air from the first inlet. Further, the vehicle seat air-conditioning device can blow the air drawn in toward a person, and thus can blow air onto a person seated in the seat. Thus, the vehicle seat air-conditioning device generates air currents that cover a person seated in the seat, and thus can provide a more comfortable air-conditioned environment to the person.

The vehicle seat air-conditioning device according to another aspect of the present disclosure includes: a first temperature sensor that detects a temperature in the cabin of the vehicle. The controller: obtains information indicating the temperature in the cabin detected by the first temperature sensor and information indicating a target temperature that is preset; calculates a target discharge temperature based on a difference between the temperature in the cabin and the target temperature indicated by the information; and switches between the modes of the ventilation path selection switch, according to the target discharge temperature calculated.

According to this, the modes can be switched according to a target temperature, and thus if the target temperature is set to a temperature preferable to a person, a person seated in the seat can be provided with a more comfortable air-conditioned environment.

In the vehicle seat air-conditioning device according to another aspect of the present disclosure, the controller switches between the modes of the ventilation path selection switch, based on a table showing a correlation between a temperature in the cabin and an elapsed time during which a vehicle air-conditioning device provided in the vehicle keeps discharging conditioned air.

According to this, the modes of the ventilation path selection switch can be automatically switched based on the table. As a result, the vehicle seat air-conditioning device can be controlled independently from the vehicle air-conditioning device.

In the vehicle seat air-conditioning device according to another aspect of the present disclosure, the seat includes a seat back, and the outlet is provided in the seat back.

According to this, if air is discharged from the outlet, air can be blown onto the upper half of the body of a person. Accordingly, the upper half of the body of the person can be cooled or warmed, and the whole body of the person can be substantially cooled or warmed. Accordingly, a person seated in the seat can be provided with a more comfortable air-conditioned environment.

In the vehicle seat air-conditioning device according to another aspect of the present disclosure, a plurality of first inlets are provided, the plurality of first inlets each being the first inlet, and the plurality of first inlets are provided in a center portion and an outer edge portion of the seating surface.

According to this, the buttocks and thighs of a person get less damp between the seating surface and the buttocks and thighs, by drawing in air from the first inlet formed in the center portion of the seating surface. The first inlet formed in the outer edge portion of the seating surface is formed at a position that is less likely to be covered by the buttocks and thighs, and thus air around the seat can be drawn in therefrom. For example, even if air cannot be drawn in from the first inlet formed in the center portion of the seating surface, air can be drawn in from the first inlet formed in the outer edge portion of the seating surface. Thus, air can be discharged from the outlet.

In the vehicle seat air-conditioning device according to another aspect of the present disclosure, the outer edge portion is at least one of a rear portion or a front edge portion of the seating surface.

According to this, the first inlet provided in the outer edge portion is less likely to be covered by the buttocks and thighs of a person even when the person is seated in the seat. Thus, the first inlet that is not covered by the buttocks or thighs of a person can be more certainly ensured, and thus a possibility that air cannot be drawn in can be further lowered.

In the vehicle seat air-conditioning device according to another aspect of the present disclosure, one or more outlets are provided, the one or more outlets each being the outlet, and the one or more outlets are provided at one or more of positions corresponding to a head, a neck, a shoulder, a back, and a waist of a person.

According to this, if air is discharged from the outlet, air can be blown onto one or more portions from among the head, neck, back, and waist of a person. Accordingly, the body of the person can be partially cooled or warmed, and the whole body of the person can be substantially cooled or warmed. Accordingly, a person seated in the seat can be provided with a more comfortable air-conditioned environment.

In the vehicle seat air-conditioning device according to an aspect of the present disclosure, a driver seat and a front passenger seat each include a seat back, the driver seat and the front passenger seat each being the seat of the vehicle, and the second inlet is provided in: one of a side surface of the driver seat that faces the front passenger seat, a back surface on an opposite side from a front surface, or a corner portion stretching from a portion of the side surface to a portion of the back surface of the driver seat, the front surface being in contact with a person seated in the driver seat, the side surface, the back surface, and the corner portion being included in the seat back; or one of a side surface of the front passenger seat that faces the driver seat, a back surface on an opposite side from a front surface, or a corner portion stretching from a portion of the side surface to a portion of the back surface of the front passenger seat, the front surface being in contact with a person seated in the front passenger seat, the side surface, the back surface, and the corner portion being included in the seat back.

According to this, the position of the second inlet can be placed in the side surface, the back surface, or the corner portion, and thus the degree of freedom of providing the inlet can be ensured. Further, the second inlet can be formed not only in the side surface of the driver or front passenger seat, but also in a portion that stretches to a portion of the back surface of the driver or front passenger seat, and thus the opening area of the second inlet can be increased as much as possible. Accordingly, air blown out from an air-conditioning unit can be more efficiently drawn in from the second inlet.

Furthermore, the outlet of the vehicle air-conditioning unit (hereinafter, also referred to as the outlet of the air-conditioning unit) provided in the vehicle is normally provided in an instrument panel of the vehicle. Conditioned air resulting from air conditioning is blown out from the outlet of the air-conditioning unit toward the driver seat and the front passenger seat.

In the vehicle seat air-conditioning device according to the present disclosure, the second inlet is provided between the driver seat and the front passenger seat, and thus conditioned air blown out from the outlet of the air-conditioning unit contributes to conditioning ambient air, and thereafter is drawn in from the second inlet. Accordingly, air-conditioning efficiency in the cabin is less likely to be lowered.

Since the second inlet is provided at a position where a person is unlikely to be present in a space between the second inlet and the outlet of the vehicle air-conditioning unit, conditioned air blown out from the outlet of the air-conditioning unit is less likely to be interrupted by a person seated in the driver seat or the front passenger seat.

Thus, in the vehicle seat air-conditioning device according to the present disclosure, a decrease in air-conditioning efficiency in the cabin is reduced, and also air blown out from the vehicle air-conditioning unit can be efficiently drawn in and blown out toward a person.

In particular, ambient air that includes conditioned air can be drawn in from the second inlet, without being influenced by a disturbance such as a difference between physiques or a posture of a person seated. Accordingly, conditioned air from the vehicle air-conditioning unit is reused, and thus energy consumption of the vehicle can be reduced.

In addition, this configuration eliminates necessity of providing a duct that connects the vehicle air-conditioning unit to the vehicle seat air-conditioning device, and thus the cost of manufacturing the vehicle seat air-conditioning device is less likely to increase. Moreover, since a duct is not provided, the space of the cabin is less likely to be decreased.

In the vehicle seat air-conditioning device according to another aspect of the present disclosure, the vehicle is provided with a center console between the driver seat and the front passenger seat, and the second inlet is provided at a position above the center console.

According to this, the position of the second inlet can be placed at a certain height, and thus a space between the second inlet and the outlet of the air-conditioning unit is less likely to be blocked by an obstacle such as the center console. Accordingly, air blown out from the air-conditioning unit can be efficiently drawn in from the second inlet.

In the vehicle seat air-conditioning device according to another aspect of the present disclosure, the driver seat and the front passenger seat each has a structure in which a seat frame is provided inside of the seat back, and when viewed in a direction in which the driver seat and the front passenger seat are aligned, the second inlet provided in the driver seat overlaps the seat frame or is between the back surface and the seat frame, the back surface being on the opposite side from the front surface that is in contact with a person seated in the driver seat.

According to this, when a person is seated in the driver seat or the front passenger seat, cushioning of the driver seat and the front passenger seat can be ensured, and thus the person is less likely to feel uncomfortable. Furthermore, a possibility that movement of a hand of the person prevents air from being drawn in can be decreased.

In the vehicle seat air-conditioning device according to another aspect of the present disclosure, between the second inlet and the blower, the second ventilation path slopes upward from the second inlet to a position vertically above the second inlet.

Accordingly, for example, even if a person spills drink, the liquid, which is the drink, is less likely to come into the seat farther from the second inlet. Accordingly, malfunction of an electrically equipped device such as the blower provided inside of the second ventilation path can be avoided.

In the vehicle seat air-conditioning device according to another aspect of the present disclosure, the second inlet is provided with a cover that is air-permeable.

According to this, while capability of drawing air in from the second inlet is ensured, the appearance of the driver seat and the front passenger seat in each of which the second inlet is formed can be maintained well.

In the vehicle seat air-conditioning device according to another aspect of the present disclosure, the second inlet is provided in the corner portion and the cover is provided over the corner portion, and air-permeability of a portion of the cover covering the portion of the side surface included in the corner portion is higher than air-permeability of a portion of the cover covering the portion of the back surface included in the corner portion.

Accordingly, the volume of air drawn in can be sufficiently ensured by forming the second inlet in the corner portion. Furthermore, dust stirred up by legs of a person seated in the rear seat is often drawn in from the back surface of the corner portion. Accordingly, in the vehicle seat air-conditioning device, air-permeability of the portion of the cover covering the portion of the back surface included in the corner portion is lower, so that dust is less likely to be drawn in.

The vehicle seat air-conditioning device according to another aspect of the present disclosure includes: a fin that is provided at the outlet and leads, in a predetermined direction, air blown out from the outlet.

According to this, air that flows along the posture of a person seated in the driver/front passenger seat can be blown onto the person. Accordingly, a person seated in the driver/front passenger seat can be provided with a more comfortable air-conditioned environment.

In the vehicle seat air-conditioning device according to another aspect of the present disclosure, the fin is provided vertically above a center of the outlet in a height direction.

According to this, even in a small space such as a cabin, the air-path axis of air blown out from the outlet due to the Coanda effect can be controlled. Accordingly, air that flows along the posture of a person seated in the driver/front passenger seat can be blown onto the person. Accordingly, a person seated in the driver/front passenger seat can be provided with a more comfortable air-conditioned environment.

The vehicle seat air-conditioning device according to another aspect of the present disclosure includes: an outlet temperature sensor electrically connected to the controller, and provided in a vicinity of the outlet. The controller controls the blower according to a temperature detected by the outlet temperature sensor.

According to this, the temperature of air blown onto persons seated in the driver seat and the front passenger seat can be detected, and thus the air volume of the blower can be appropriately adjusted according to a temperature. Accordingly, a person seated in the driver/front passenger seat can be provided with a more comfortable air-conditioned environment.

In the vehicle seat air-conditioning device according to another aspect of the present disclosure, the controller: sets an air volume of the blower to a first air volume when the temperature detected by the outlet temperature sensor is higher than or equal to a threshold; and sets the air volume of the blower to a second air volume when the temperature detected by the outlet temperature sensor is lower than the threshold, the second air volume being smaller than the first air volume.

According to this, for example, during a cooling operation, if the temperature of air blown onto the persons seated in the driver seat and the front passenger seat is low, the air volume of the blower can be decreased, and if the temperature of air blown onto the persons seated in the driver seat and the front passenger seat is high, the air volume of the blower can be increased.

In the vehicle seat air-conditioning device according to another aspect of the present disclosure, the controller controls the blower based on the temperature detected by the outlet temperature sensor when the ventilation path selection switch maintains one of the modes for a first predetermined period.

According to this, in order to be compatible with the control by the first temperature sensor and the second temperature sensor, priority is given to the control by first temperature sensor and the second temperature sensor, and the outlet temperature sensor can control the blower once the temperature is stabilized. According to this, the vehicle seat air-conditioning device can adjust the temperature and the air volume more finely. As a result, a more comfortable air-conditioned environment can be provided.

The vehicle seat air-conditioning device according to another aspect of the present disclosure includes: a three-dimensional structure provided inside of at least one of the first ventilation path, the second ventilation path, or the third ventilation path.

According to this, even if a person is seated in the driver/front passenger seat, the second ventilation path is not compressed and air can be led therethrough, and thus the second ventilation path can lead air from the second inlet to the outlet with use of the blower. Accordingly, the person seated in the driver/front passenger seat can be provided with a more comfortable air-conditioned environment.

In the vehicle seat air-conditioning device according to another aspect of the present disclosure, the controller temporarily switches the ventilation path selection switch to the second mode, when the ventilation path selection switch is in one of the modes other than the second mode, and a change in the first temperature detected by the first temperature sensor and a change in the second temperature detected by the second temperature sensor are in a predetermined temperature range for a second predetermined period.

According to this, air is not drawn in from the seating surface only in the second mode, and thus an air current that covers the body is temporarily stopped by switching a mode other than the second mode to the second mode. Accordingly, a person seated in the seat readily notices a change in air current. If a state in which the temperature is stable maintains and the person seated in the seat possibly releases tension, air having a temperature difference can be blown out from an outlet. Accordingly, the vehicle seat air-conditioning device can give a warning to a person seated in the seat.

Note that the embodiments described below each show a general or specific example. The numerical values, shapes, materials, elements, the arrangement and connection of the elements, steps, and the processing order of the steps, for instance, described in the following embodiments are mere examples, and thus are not intended to limit the present disclosure. Out of the elements in the embodiments below, elements not recited in any of the independent claims are described as optional elements.

In addition, the drawings are schematic diagrams, and do not necessarily provide strictly accurate illustration. Further, the same sign is given to the same structural member throughout the drawings. In the following embodiments, expressions such as substantially quadrilateral are used. For example, substantially quadrilateral means not only a complete rectangle, but also substantially rectangular and thus means that a several percent of error is included, for example. Furthermore, a substantially quadrilateral shape means being quadrilateral in a scope where advantageous effects of the present disclosure can be yielded. The same also applies to the other expressions that include "substantially".

In the description below, the front-and-rear direction of a seat is referred to as the X-axis direction, and the up-and-down direction of the seat is referred to as the Z-axis direction. Furthermore, the right-and-left direction of the seat, that is, a direction perpendicular to the X-axis direction and the Z-axis direction is referred to as the Y-axis direction. The front side of the seat in the X-axis direction is referred to as a positive side, and the rear side of the seat in the X-axis direction is referred to as a negative side. The left side of the seat in the Y-axis direction (the right side that is closer to a viewer when the viewer looks at FIG. 1) is referred to as a positive side, and the opposite side therefrom in the Y-axis direction is referred to as a negative side. In addition, the right side is the right of a person with respect to a travel direction of a vehicle when the person is seated in a seat, and is a negative Y-axis direction. In addition, the left side is the left of a person with respect to a travel direction of a vehicle when the person is seated in the seat, and is a positive Y-axis direction. The upper side of the seat in the Z-axis direction is referred to as a positive side, and the lower side of the seat in the Z-axis direction is referred to as a negative side. The same applies to FIG. 2 and the drawings thereafter.

Hereinafter, embodiments are to be specifically described with reference to the drawings.

Embodiment 1

<Configuration: Seat 1>

FIG. 1 is a perspective view illustrating an appearance of seat 1 provided with vehicle seat air-conditioning device 3 according to Embodiment 1. In FIG. 1, solid-line arrows correspond to air led to first ventilation path 31, a broken-line arrow corresponds to air led to second ventilation path 32, and dash-dot line arrows correspond to air led to third ventilation path 33. Part a of FIG. 2 includes a perspective view illustrating an appearance of seat 1 provided with vehicle seat air-conditioning device 3 and a cross sectional view illustrating seat 1 taken along line II-II in FIG. 1. Part b of FIG. 2 is an enlarged cross-sectional view in a frame indicated by the broken line in a of FIG. 2. FIG. 3 is a block diagram illustrating vehicle seat air-conditioning device 3 according to Embodiment 1.

As illustrated in FIG. 1 and FIG. 2, for example, seat 1 provided in a vehicle, for instance, cools or warms a person seated in seat 1 by blowing air onto the upper half of the body of the person. Specifically, seat 1 can cool or warm the body of a person seated in seat 1 by blowing air from outlets 33*a* used in seat 1 to the head, neck, shoulders, back, and waist of the person. Air currents can be generated by drawing in air from portions corresponding to the buttocks and thighs, so that the person get less damp between seat 1 and the buttocks and thighs. Such seat 1 includes seating portion 10 for a person to be seated, seat back 13, headrest 15, vehicle seat air-conditioning device 3, and power supply 70.

[Seating Portion 10]

As illustrated in FIG. 1 and a of FIG. 2, seating portion 10 is a seat cushion that supports, for instance, buttocks and thighs of a person seated in seat 1. Seating portion 10 includes first seat pad 11*a* that corresponds to a cushion material, and first seat cover 11*b* that covers first seat pad 11*a*.

First seat pad 11*a* is made of, for example, urethane foam, and forms a main body of the seating portion. First seat pad 11*a* has a substantially quadrilateral plate-like shape having a thickness, and is disposed in an orientation substantially parallel to the X-Y plane. First seat pad 11*a* supports the buttocks and thighs of a person seated.

First seat pad 11*a* is provided with first ventilation path 31 that leads air drawn in from first vent holes 12*a* of seating surface 11*c* that is a surface under first seat cover 11*b* on the positive Z-axis side.

Note that a of FIG. 2 shows an example in which first vent holes 12*a* and portions of first ventilation path 31 are in one-to-one correspondence, but the present embodiment is not limited to this configuration. Specifically, a configuration may be adopted in which in the portion defined by the broken line in a of FIG. 2, a plurality of first vent holes 12*a* are formed for single first ventilation path 31, as illustrated in the enlarged view in b of FIG. 2. In the case of b of FIG. 2, the plurality of first vent holes 12*a* are all in correspondence with single first ventilation path 31. For example, spongy cushion member 11*e* may be disposed between first seat pad 11*a* and first seat cover 11*b*, so that the plurality of first vent holes 12*a* communicate with single first ventilation path 31.

First inlets 31*a* are formed in seating surface 11*c* that is a portion of seat 1 on the side of seat 1 where a person sits. Thus, first inlets 31*a* open toward the interior of the cabin.

In the present embodiment, a plurality of first inlets 31*a* are formed. Specifically, first inlets 31*a* are formed in center portion 11*c*1 and outer edge portion 11*c*2 of seating surface 11*c* of seat 1 for a person to sit. In the present embodiment, outer edge portion 11*c*2 includes a portion of first seat pad 11*a* on the positive side of the Y-axis direction relative to center portion 11*c*1 and a portion of first seat pad 11*a* on the negative side of the Y-axis direction relative to center portion 11*c*1. First inlets 31*a* in center portion 11*c*1 are formed along the X-axis direction, whereas a plurality of sets of first inlets 31*a* in outer edge portion 11*c*2 are provided on the positive and negative sides of the Y-axis direction, along the X-axis direction. Thus, the plurality of sets of first inlets 31*a* provided in the X-axis direction are aligned in columns in the Y-axis direction on a surface on the positive side of the Z-axis direction.

Second ventilation path 32 for leading air drawn in from second inlet 32*a* provided in the surface on the negative side of the Z-axis direction is provided in first seat pad 11*a*.

Second inlet 32*a* is formed in a portion other than seating surface 11*c* of seat 1 for a person to sit. Thus, second inlet 32*a* opens toward the interior of the cabin. In the present embodiment, second inlet 32*a* is provided in a predetermined portion of seat 1 other than seating surface 11*c*. Note that the present embodiment has described an example in which second inlet 32*a* opens toward the interior of the cabin similarly to first inlets 31*a*, yet the present embodiment is not limited thereto. For example, second inlet 32*a* may have a configuration of being connected to an air-conditioning device (not illustrated) provided in a vehicle.

First seat pad 11*a* is provided with, for instance, a portion of third ventilation path 33, blower 34, and ventilation path selection switch 35 that are elements of vehicle seat air-conditioning device 3, other than first ventilation path 31 and second ventilation path 32 that are elements of vehicle seat air-conditioning device 3. Air flows into at least one of first ventilation path 31 or second ventilation path 32 in first seat pad 11*a* due to driving of blower 34. First ventilation path 31 and second ventilation path 32 formed in first seat pad 11*a* may simply be through-holes formed in first seat pad 11*a* or may be formed by ventilation ducts.

First seat cover 11*b* covers first seat pad 11*a*. First seat cover 11*b* is a leather cover or a fabric cover, for example.

First vent hole 12*a* for drawing in air is formed in first seat cover 11*b*. First vent hole 12*a* is formed in seating surface 11*c* that is on a side of seating portion 10 where a person is seated (on the positive side of the Z-axis direction), at a position corresponding to first inlet 31*a* of vehicle seat air-conditioning device 3. In the present embodiment, a plurality of sets of first vent holes 12*a* are formed in first seat cover 11*b* in the X-axis direction, and aligned in columns in the Y-axis direction. In FIG. 1, the solid-line arrows correspond to first vent holes 12*a*.

The air drawn in from first vent holes 12*a* is led to first inlets 31*a* of vehicle seat air-conditioning device 3, is drawn in from first inlets 31*a*, and is led to first ventilation path 31. Accordingly, first vent holes 12*a* also serve as inlets for sucking air flowing above seating surface 11*c* due to suction force from first inlets 31*a* by the driving of vehicle seat air-conditioning device 3. Note that first vent holes 12*a* may be part of first ventilation path 31. In this case, first vent holes 12*a* are examples of a first inlet.

Note that in the present embodiment, first seat cover 11*b* may cover second inlet 32*a*. In this case, similarly to first vent holes 12*a* corresponding to first inlets 31*a*, a vent hole corresponding to second inlet 32*a* may be formed in first seat cover 11*b*. The air drawn in from the vent hole may be led to second ventilation path 32.

[Seat Back 13]

Seat back 13 is a backrest portion that supports the shoulders, the back, and the waist of a person seated in seat 1. Seat back 13 is elongated in the Z-axis direction, and disposed rising from seating portion 10. Seat back 13 includes second seat pad 13*a* corresponding to a cushion material, and second seat cover 13*b* that covers second seat pad 13*a*.

Second seat pad 13*a* is made of urethane foam, for instance, and is disposed in an orientation turnable about the Y axis. Second seat pad 13*a* supports the shoulders, the back, and the waist of a person seated.

Second seat pad 13*a* is provided with a portion of third ventilation path 33 for discharging air drawn in from first vent holes 12*a*. At least one of air flowing into first ventilation path 31 in first seat pad 11*a* or air flowing into second ventilation path 32 in first seat pad 11*a* by the driving of blower 34 is led through third ventilation path 33 and discharged from outlets 33*a* in second seat pad 13*a*. Outlets 33*a* are formed in second seat pad 13*a* of seat back 13. Third ventilation path 33 formed in second seat pad 13*a* may simply be a through-hole as the one formed in first seat pad 11*a* or may be formed by a ventilation duct.

Second seat cover 13*b* covers second seat pad 13*a*. Second seat cover 13*b* is a leather cover or a fabric cover, for example.

Second vent hole 12*b* for discharging air drawn in is formed in second seat cover 13*b*. Second vent hole 12*b* is formed in a surface (on the positive side of the X axis direction) facing a person seated in seating portion 10, at a position corresponding to outlet 33*a* of third ventilation path 33. Outlets 33*a* are provided vertically above first inlets 31*a* and second inlet 32*a*, on the positive side of the Z-axis direction. In the present embodiment, a plurality of second vent holes 12*b* are formed in second seat cover 13*b*. The plurality of second vent holes 12*b* are scattered over an area for the right shoulder to the left shoulder of a person seated in seat 1, for example. For example, second vent holes 12*b* are formed in portions of second seat cover 13*b* corresponding to at least one of the head, the neck, the shoulders, the back, or the waist of a person.

Air led to third ventilation path 33 via at least one of first ventilation path 31 or second ventilation path 32 and discharged from outlets 33*a* passes through second vent holes 12*b*. Thus, once air led to third ventilation path 33 by the driving of vehicle seat air-conditioning device 3 via at least one of first ventilation path 31 or second ventilation path 32 is discharged from outlets 33*a*, the air is led to second vent holes 12*b*. Accordingly, second vent holes 12*b* also serve as outlets from which air is discharged to the outside of seat 1. Note that second vent holes 12*b* may be portions of second ventilation path 32. In this case, second vent holes 12*b* are examples of an outlet.

[Head Rest 15]

Headrest 15 is a headrest portion that supports the head of a person seated in seat 1. Headrest 15 is fixed at an edge portion of seat back 13 on the positive side of the Z-axis direction.

Note that one or more third vent holes 12*c* may be formed in headrest 15. Thus, a portion of third ventilation path 33 may be provided in headrest 15.

[Vehicle Seat Air-Conditioning Device 3]

Vehicle seat air-conditioning device 3 is an air-conditioning device that is used in seat 1 of a vehicle and can blow air onto a person seated in seat 1 from behind the person. Vehicle seat air-conditioning device 3 sends air by drawing in air flowing around seat 1 and blowing the air drawn in onto a person. Accordingly, if the temperature around seat 1 is higher than an ordinary temperature, warm air is blown, whereas if the temperature around seat 1 is lower than an ordinary temperature, cool air is blown. Note that an air conditioner that can perform heating and cooling operations may be provided in vehicle seat air-conditioning device 3.

As illustrated in FIG. 2 and FIG. 3, vehicle seat air-conditioning device 3 includes blower 34, first ventilation path 31, second ventilation path 32, ventilation path selection switch 35, third ventilation path 33, first temperature sensor 51, second temperature sensor 52, controller 60, and operation portion 65.

Blower 34 can draw in air from first vent holes 12*a* formed in first seat cover 11*b* of seat 1 and/or second inlet 32*a* formed in first seat pad 11*a*, and discharge the air drawn in from second vent holes 12*b* formed in second seat pad 13*a*. Specifically, blower 34 is electrically connected to controller 60 that controls the driving of blower 34, so that blower 34 draws air in from first inlets 31*a* via first vent holes 12*a* and/or second inlet 32*a*, and discharges air from outlets 33*a* via at least one of first ventilation path 31 or second ventilation path 32, ventilation path selection switch 35, and third ventilation path 33.

Blower 34 is provided inside of seating portion 10 of seat 1. Specifically, blower 34 is disposed inside of first seat pad 11*a*. When blower 34 is driven, air is drawn in from first inlets 31*a* and second inlet 32*a* of first seat cover 11*b*.

Blower 34 is disposed downstream of ventilation path selection switch 35. Specifically, blower 34 is disposed downstream of ventilation path selection switch 35 on a flow path of air that flows from first inlets 31*a* to outlets 33*a* and a flow path of air that flows from second inlet 32*a* to outlets 33*a*. Thus, blower 34 is disposed on a path from ventilation path selection switch 35 to outlets 33*a*. In the present embodiment, blower 34 is disposed on third ventilation path 33. Note that blower 34 may be disposed outside third ventilation path 33 as long as air flows from first inlets 31*a* and/or second inlet 32*a* to ventilation path selection switch 35 and air flows from ventilation path selection switch 35 to outlets 33*a*. Blower 34 may be disposed outside first seat pad 11*a*, and thus a position at which blower 34 is disposed is not limited in particular.

First ventilation path 31 is provided inside of seat 1. Specifically, first ventilation path 31 is provided inside of seating portion 10, extending from seating surface 11*c* of seating portion 10 up to blower 34.

First ventilation path 31 leads air drawn in from first inlets 31*a* provided in seating portion 10 of seat 1 by blower 34 to ventilation path selection switch 35. Air flows inside first ventilation path 31 when selected by ventilation path selection switch 35. First ventilation path 31 is formed by a ventilation duct, for example.

End portions of first ventilation path 31 form first inlets 31*a*, and the other end is connected to ventilation path selection switch 35. Thus, first ventilation path 31 extends from first inlets 31*a* up to ventilation path selection switch 35.

First inlets 31*a* can draw air in from a surface (seating surface 11*c*) of seating portion 10 for a person to sit, and correspond to first vent holes 12*a* of first seat cover 11*b*. When viewed in the Z-axis direction, first inlets 31*a* overlap first vent holes 12*a*. In the present embodiment, air is drawn in from first inlets 31*a* via first vent holes 12*a*, but first inlets 31*a* may have a configuration in which air is directly drawn in therefrom.

Second ventilation path 32 is provided inside of seat 1. Specifically, second ventilation path 32 is provided inside of seating portion 10, extending from a portion other than a surface (seating surface 11*c*) of seating portion 10 for a person to sit up to blower 34.

Second ventilation path 32 is a ventilation path different from first ventilation path 31. Second ventilation path 32 leads air drawn in from second inlet 32*a* provided in seating portion 10 of seat 1 by blower 34 to ventilation path selection switch 35.

Air flows inside second ventilation path 32 when selected by ventilation path selection switch 35. Second ventilation path 32 is formed by a ventilation duct, for example.

An end of second ventilation path 32 forms second inlet 32*a*, and the other end is connected to ventilation path selection switch 35. Thus, second ventilation path 32 extends from second inlet 32*a* to ventilation path selection switch 35.

Second inlet 32*a* is an inlet different from first inlets 31*a*. Second inlet 32*a* is formed in a portion other than a surface (seating surface 11*c*) of seating portion 10 for a person to sit. In the present embodiment, second inlet 32*a* is formed in a surface (a surface of seating portion 10 on the negative side of the Z-axis direction) opposite from seating surface 11*c*, and air present below seat 1 (on the negative side of the Z-axis direction) can be drawn in.

Ventilation path selection switch 35 is provided inside of seating portion 10 of seat 1. Specifically, ventilation path selection switch 35 is provided on the first inlet 31*a* side and on the second inlet 32*a* side that are upstream of blower 34.

In order to lead air to third ventilation path 33, ventilation path selection switch 35 selects and switches to at least one of first ventilation path 31 or second ventilation path 32, thus leading, to third ventilation path 33, air led to the at least one of first ventilation path 31 or second ventilation path 32 to which switching is made. Ventilation path selection switch 35 includes a damper, for example, and can switch between air flow paths, that is, ventilation paths. Ventilation path selection switch 35 can selectively lead, to third ventilation path 33, one of air led through only first ventilation path 31, air led through only second ventilation path 32, or air simultaneously led through both first ventilation path 31 and second ventilation path 32.

Specifically, ventilation path selection switch 35 has a first mode, a second mode, and a third mode. The first mode is a mode for connecting first ventilation path 31 to third ventilation path 33. In the first mode, air is discharged from outlets 33*a* by leading air led through only first ventilation path 31 to third ventilation path 33. The second mode is a mode for connecting second ventilation path 32 to third ventilation path 33. In the second mode, air is discharged from outlets 33*a* by leading air led through only second ventilation path 32 to third ventilation path 33. The third mode is a mode for connecting first ventilation path 31 and second ventilation path 32 to third ventilation path 33. In the third mode, air led through first ventilation path 31 and air simultaneously led through second ventilation path 32 are led to third ventilation path 33 and mixed, and the mixed air is discharged from outlets 33*a*. Ventilation path selection switch 35 is electrically connected to controller 60, and the driving of ventilation path selection switch 35 is controlled by controller 60, so that ventilation path selection switch 35 selects one of the first mode, the second mode, or the third mode.

Third ventilation path 33 is a ventilation path different from first ventilation path 31 and second ventilation path 32. Third ventilation path 33 leads air led through at least one of first ventilation path 31 or second ventilation path 32 by blower 34 to outlets 33*a* provided in seat 1 from ventilation path selection switch 35. Specifically, third ventilation path 33 leads, to outlets 33*a*, only air drawn in from first inlets 31*a* and led to first ventilation path 31, and leads, to outlets 33*a*, only air drawn in from second inlet 32*a* and led to second ventilation path 32. Third ventilation path 33 mixes air drawn in simultaneously from first inlets 31*a* and second inlet 32*a* and simultaneously led into first ventilation path 31 and second ventilation path 32, and leads the mixed air to outlets 33*a*. Third ventilation path 33 is formed by a ventilation duct, for example. End portions of third ventilation path 33 form outlets 33*a*, and the other end is connected to ventilation path selection switch 35. Note that third ventilation path 33 may be connected to ventilation path selection switch 35 via blower 34. Outlets 33*a* correspond to second vent holes 12*b* of second seat cover 13*b*. When viewed in the X-axis direction, outlets 33*a* overlap second vent holes 12*b*. In the present embodiment, air is discharged from outlets 33*a* via second vent holes 12*b*, but outlets 33*a* may have a configuration of directly discharging air.

Third ventilation path 33 is provided inside of seat 1. Specifically, a portion of third ventilation path 33 is provided inside of seating portion 10, and a remaining portion of third ventilation path 33 is provided inside of seat back 13.

Third ventilation path 33 extends from ventilation path selection switch 35 to outlets 33*a*. In the present embodiment, third ventilation path 33 extends from ventilation path selection switch 35 in first seat pad 11*a* to second seat pad 13*a*. In the present embodiment, third ventilation path 33 extends to a portion of second seat cover 13*b* in the vicinity of headrest 15. One or more outlets 33*a* that are end portions of third ventilation path 33 are provided at one or more of positions corresponding to the head, the neck, the shoulders, the back, and the waist of a person.

With such configurations of first ventilation path 31, second ventilation path 32, and third ventilation path 33, first inlets 31*a*, second inlet 32*a*, and outlets 33*a* have the relation as below. First inlets 31*a* and second inlet 32*a* are provided vertically below outlets 33*a*. Second inlet 32*a* is provided vertically below first inlets 31*a*. Accordingly, air currents that cover a person seated in seat 1 can be generated by discharging, from portions corresponding to the head, the neck, the shoulders, the back, and the waist of a person, air drawn in from portions corresponding to the buttocks and the thighs of the person and portions other than seating surface 11*c* of seat 1.

In vehicle seat air-conditioning device 3, first inlets 31*a*, second inlet 32*a*, and outlets 33*a* are provided in seat 1, and first ventilation path 31, second ventilation path 32, third ventilation path 33, blower 34, and ventilation path selection switch 35 are provided inside of seat 1. Thus, all the elements that generate air currents that cover a person seated in seat 1 are provided in seat 1, and thus a configuration of vehicle seat air-conditioning device 3 can be simplified.

[First Temperature Sensor 51, Second Temperature Sensor 52]

First temperature sensor 51 detects a temperature in the cabin of a vehicle. In the present embodiment, first temperature sensor 51 detects a temperature in the cabin in a space where a person is present, as an example of a temperature in the cabin detected by first temperature sensor 51. For example, first temperature sensor 51 may be provided on/in seat 1, first ventilation path 31, second ventilation path 32, or third ventilation path 33, for instance. In this case, first temperature sensor 51 may detect a temperature of air that flows through first ventilation path 31, second ventilation path 32, or third ventilation path 33, as an example of a temperature in the cabin detected by first temperature sensor 51. For example, first temperature sensor 51 may be a temperature sensor provided in advance in a vehicle air-conditioning device. In this case, first temperature sensor 51 may detect a temperature at a discharge outlet of the vehicle air-conditioning device, as an example of a temperature in the cabin detected by first temperature sensor 51. First temperature sensor 51 outputs, to controller 60, information indicating a first temperature that is a temperature in the cabin, as a detected result.

Second temperature sensor detects a surface temperature of a person seated in seat 1. In the present embodiment, second temperature sensor 52 is provided in a cabin of a vehicle, at a position where a person seated in seat 1 can be observed therefrom. For example, second temperature sensor 52 is an image capturing device that captures an image of a person seated in seat 1. Second temperature sensor 52 outputs, to controller 60, information indicating a second temperature that is the surface temperature, as a detected result. Note that second temperature sensor 52 is not limited to a sensor that detects a second temperature using an image capturing device, for instance, and may be configured to indirectly detect a second temperature from information obtained by a temperature sensor disposed on the surface of seat 1, for example.

Note that vehicle seat air-conditioning device 3 may be provided with one or more of sensors such as an outdoor temperature sensor that detects a temperature outside of the vehicle, a solar radiation sensor that detects an amount of solar radiation emitted onto the vehicle, a temperature sensor that detects a temperature of air at first inlets 31*a*, a humidity sensor that detects humidity of air at first inlets 31*a*, a skin temperature sensor that detects a temperature of skin of a person seated in seat 1, and a temperature sensor that detects a surface temperature of seat 1, for instance. Such sensors may output, to controller 60, information indicating the detected temperature or information indicating humidity.

Note that vehicle seat air-conditioning device 3 may be provided with a sensor that detects a state of a person. The state of a person is a state of a person sweating or a seating period, for instance. For example, the sensor may include a sensor that detects a seating period for which a person is seated in seat 1, or may include an image capturing device that captures an image of a person. The sensor that detects a seating period may detect a seating period based on a period for which a vehicle is operating or may detect a seating period for which the sensor keeps detecting presence of a person, for example. The sensor may output, to controller 60, information indicating a seating period as a result of the detection. The sensor may detect a state of a person sweating by capturing an image of the person. The sensor may output, to controller 60, information indicating a state of a person sweating as a result of the detection.

[Controller 60]

Controller 60 controls blower 34 and ventilation path selection switch 35. Controller 60 is a microcomputer that allows or stops a flow of current to blower 34 and ventilation path selection switch 35, and controls output of blower 34 by changing the value of the current.

Controller 60 switches between the modes of ventilation path selection switch 35 by selecting one of the modes from among the first mode, the second mode, and the third mode. Further, controller 60 switches between the modes of ventilation path selection switch 35, based on information indicating a first temperature detected by first temperature sensor 51 and information indicating a second temperature detected by second temperature sensor 52. Note that the present embodiment shows an example in which first temperature sensor 51 and second temperature sensor 52 are both used, yet second temperature sensor 52 may not be provided.

Specifically, controller 60 executes control for switching between the modes of ventilation path selection switch 35, based on a temperature in the cabin detected by first temperature sensor 51 and a surface temperature of a person seated in seat 1, which is detected by second temperature sensor 52. More specifically, controller 60 causes ventilation path selection switch 35 to execute the second mode when the first temperature detected by first temperature sensor 51 is higher than or equal to a set cabin temperature, and the second temperature detected by second temperature sensor 52 is higher than or equal to a first surface temperature. Further, controller 60 causes ventilation path selection switch 35 to execute the third mode when the first temperature detected by first temperature sensor 51 is higher than or equal to the set cabin temperature, and the second temperature detected by second temperature sensor 52 is lower than the first surface temperature and is higher than or equal to a second surface temperature. The second surface temperature is lower than the first surface temperature. Further, controller 60 causes ventilation path selection switch 35 to execute the first mode when the first temperature detected by first temperature sensor 51 is lower than the set cabin temperature and the second temperature detected by second temperature sensor 52 is lower than the second surface temperature and is higher than or equal to a third surface temperature. The third surface temperature is lower than the second surface temperature. The set cabin temperature, the first surface temperature, and the second surface temperature are preset temperatures (thresholds), and can be changed arbitrarily.

Note that controller 60 may execute control for switching between the modes of ventilation path selection switch 35 and control for adjusting the air volume of blower 34, based on one or more of the followings when a person is seated in seat 1: the temperature outside of the vehicle, an amount of solar radiation emitted onto the vehicle, a temperature of air at first inlets 31*a*, humidity of air at first inlets 31*a*, a skin temperature of a person seated in seat 1, and a surface temperature of seat 1, for instance.

[Operation Receiver 65]

Operation receiver 65 is an input interface provided in the vehicle, and outputs, to controller 60, instructions for setting a temperature and an air volume of the vehicle air-conditioning device, for example, in response to an operation input received from a person. For example, operation receiver 65 can output, to controller 60, an instruction for switching between the modes in response to an operation input received from a person. Note that operation receiver 65 is a control panel for a vehicle, a tablet terminal, or a smartphone, for instance. Furthermore, operation receiver 65 may output, to controller 60, instructions for setting the set cabin temperature, the first surface temperature, and the second surface temperature stated above.

[Power Supply 70]

Power supply 70 is a power source circuit that supplies power to blower 34 and ventilation path selection switch 35 via controller 60, for instance. Here, power supply 70 is a power source of a direct current supplied from a battery not illustrated. Power supply 70 adjusts a current to be supplied to blower 34 and ventilation path selection switch 35 by being controlled by controller 60.

<Processing>

FIG. 4 is a flowchart illustrating processing performed by vehicle seat air-conditioning device 3 according to Embodiment 1. FIG. 5A is a schematic side view illustrating air flow paths in seat 1 when the second mode is executed. FIG. 5B is a schematic side view illustrating air flow paths in seat 1 when the third mode is executed. FIG. 5C is a schematic side view illustrating air flow paths in seat 1 when the first mode is executed.

Note that the control of controller 60 illustrated in FIG. 4 is described as an example when a cooling operation is performed.

First, as illustrated in FIG. 4, first temperature sensor 51 detects a temperature (a first temperature) in a cabin of a vehicle. Second temperature sensor 52 detects a surface temperature (a second temperature) of a person seated in seat 1. As a result of detection by first temperature sensor 51, first temperature sensor 51 outputs, to controller 60, information indicating a first temperature that is a temperature in the cabin. As a result of detection by second temperature sensor 52, second temperature sensor 52 outputs, to controller 60, information indicating a second temperature that is a surface temperature of a person seated in seat 1.

Controller 60 obtains information indicating a first temperature from first temperature sensor 51 and information indicating a second temperature from second temperature sensor 52 (S11). Controller 60 switches between the modes of ventilation path selection switch 35, based on the obtained information indicating the first temperature and the obtained information indicating the second temperature.

Specifically, controller 60 determines whether the first temperature detected by first temperature sensor 51 is higher than or equal to a set cabin temperature and the second temperature detected by second temperature sensor 52 is higher than or equal to a first surface temperature (S12).

Controller 60 causes ventilation path selection switch 35 to execute the second mode (S13) when the first temperature detected by first temperature sensor 51 is higher than or equal to the set cabin temperature and the second temperature detected by second temperature sensor 52 is higher than or equal to the first surface temperature (Yes in S12). Controller 60 ends the processing, returns to step S11 and repeats the processing.

For example, when the outdoor temperature is high or when an amount of solar radiation is great, the temperature in the cabin (the first temperature) tends to be higher than or equal to the set cabin temperature immediately after a person gets into a vehicle. Furthermore, if the second temperature is higher than or equal to the first surface temperature, a person seated in seat 1 often feels extremely hot. Accordingly, as illustrated in FIG. 5A, air in the cabin cooled by the vehicle air-conditioning device is drawn in from second inlet 32*a* and the air drawn in is discharged from outlets 33*a*, so that the cooled air can be blown onto the person seated in seat 1. As a result, the surface temperature of the person seated in seat 1 can be lowered. In FIG. 5A, air led through second ventilation path 32 is shown by a solid line, and air led through third ventilation path 33 is shown by broken lines.

When the first temperature detected by first temperature sensor 51 is lower than the set cabin temperature or when the second temperature detected by second temperature sensor 52 is lower than the first surface temperature (No in S12), controller 60 determines whether the first temperature detected by first temperature sensor 51 is higher than or equal to the set cabin temperature, and the second temperature detected by second temperature sensor 52 is lower than the first surface temperature and is higher than or equal to a second surface temperature (within a first temperature range) (S14).

Controller 60 causes ventilation path selection switch 35 to execute the third mode (S15) when the first temperature detected by first temperature sensor 51 is higher than or equal to the set cabin temperature, and the second temperature detected by second temperature sensor 52 is lower than the first surface temperature and is higher than or equal to the second surface temperature (Yes in S14). Controller 60 ends the processing, returns to step S11, and repeats the processing.

For example, when the outdoor temperature is high or when an amount of solar radiation is great, there are cases where the indoor space is getting cool owing to the vehicle air-conditioning device, the temperature in the cabin (the first temperature) is still higher than or equal to the set cabin temperature. Furthermore, if the second temperature is lower than the first surface temperature and is higher than or equal to the second surface temperature, the temperature in the cabin is still high, so the person seated in seat 1 may feel hot. Accordingly, as illustrated in FIG. 5B, air in the cabin cooled by the vehicle air-conditioning device is drawn in from second inlet 32*a*, and air is drawn in also from first inlets 31*a* on the seating surface 11*c* side of seat 1. Then, the air drawn in from first inlets 31*a* and the air drawn in simultaneously from second inlet 32*a* are mixed in third ventilation path 33. The mixed air can be blown onto the person seated in seat 1 by being discharged from outlets 33*a*. The temperature of air discharged from outlets 33*a* in the third mode tends to be higher than the temperature of air discharged from outlets 33*a* in the second mode. In this manner, by mixing such air, the air becomes moderately cool, so the person seated in seat 1 can be prevented from feeling extreme coldness. In FIG. 5B, air led through first ventilation path 31 and second ventilation path 32 is shown by solid lines, and air led through third ventilation path is shown by broken lines.

When the first temperature detected by first temperature sensor 51 is lower than the set cabin temperature or when the second temperature detected by second temperature sensor 52 is lower than the first surface temperature and is higher than or equal to the second surface temperature and thus is outside the range (No in S14), controller 60 determines whether the first temperature detected by first temperature sensor 51 is lower than the set cabin temperature, and the second temperature detected by second temperature sensor 52 is lower than the second surface temperature and is higher than or equal to a third surface temperature (within a second temperature range) (S16). Controller 60 causes ventilation path selection switch 35 to execute the first mode (S17) when the first temperature detected by first temperature sensor 51 is lower than the set cabin temperature, and the second temperature detected by second temperature sensor 52 is lower than the second surface temperature and is higher than or equal to a third surface temperature (Yes in S16). Then, controller 60 ends the processing, returns to step S11, and repeats the processing.

For example, when the indoor space is stably cooled by the vehicle air-conditioning device and the temperature in the cabin (the first temperature) becomes below the set cabin temperature, and furthermore if the second temperature is lower than the second surface temperature and is higher than or equal to the third surface temperature, it is appropriate if the temperature in the cabin is slightly lower than the set cabin temperature, but nevertheless the person seated in seat 1 is feeling comfortable or slightly hot. Accordingly, as illustrated in FIG. 5C, air is drawn in from first inlets 31*a* on the seating surface 11*c* side of seat 1 and the air drawn in is discharged from outlets 33*a*. Thus, the air can be blown onto the person seated in seat 1. The temperature of air discharged from outlets 33*a* in the first mode tends to be higher than the temperature of air discharged from outlets 33*a* in the third mode. Accordingly, the temperature can be lowered while the temperature that the person seated in seat 1 feels can be prevented from being excessively low. In FIG. 5C, air led through first ventilation path 31 is shown by solid lines, and air led through third ventilation path 33 is shown by broken lines.

Controller 60 returns to step S11 and repeats the processing when the first temperature detected by first temperature sensor 51 is higher than or equal to the set cabin temperature or when the second temperature detected by second temperature sensor 52 is lower than the third surface temperature (No in S16).

Note that in this processing, the order in which determination processing is performed may be switched as appropriate in steps S12, S14, and S16.

[Operational Effects]

Next, operational effects yielded by vehicle seat air-conditioning device 3 according to the present embodiment are to be described.

As described above, vehicle seat air-conditioning device 3 for use in seat 1 of a vehicle, vehicle seat air-conditioning device 3 including: blower 34; ventilation path selection switch 35; controller 60 that controls ventilation path selection switch 35; first ventilation path 31 that leads air drawn in from first inlet 31*a* by blower 34 to ventilation path selection switch 35, first inlet 31*a* being provided in seating surface 11*c* of seat 1, seating surface 11*c* being a surface for a person to sit; second ventilation path 32 that leads air drawn in from second inlet 32*a* by blower 34 to ventilation path selection switch 35, second inlet 32*a* being different from first inlet 31*a* and provided in a portion of seat 1 other than seating surface 11*c*; and third ventilation path 33 that leads at least one of the air led through first ventilation path 31 by blower 34 or the air led through second ventilation path 32 by blower 34 from ventilation path selection switch 35 to outlet 33*a* provided in seat 1. First inlet 31*a* opens toward an interior of a cabin of the vehicle. First inlet 31*a* and second inlet 32*a* are provided vertically below outlet 33*a*. At least first inlet 31*a*, second inlet 32*a*, and outlet 33*a* are provided in seat 1, and at least first ventilation path 31, a portion of second ventilation path 32, ventilation path selection switch 35, blower 34, and third ventilation path 33 are provided inside of seat 1. Ventilation path selection switch 35 has modes for leading air to third ventilation path 33, the modes including: a first mode in which first ventilation path 31 is connected to third ventilation path 33; a second mode in which second ventilation path 32 is connected to third ventilation path 33; and a third mode in which first ventilation path 31 and second ventilation path 32 are connected to third ventilation path 33. Controller 60 switches between the modes of the ventilation path selection switch by selecting one of the modes from among the first mode, the second mode, and the third mode.

According to this, as a conventional vehicle seat air-conditioning device, irrespective of whether a duct that connects a vehicle air-conditioning device for conditioning air in the cabin of a vehicle to the vehicle seat air-conditioning device is provided, in vehicle seat air-conditioning device 3 according to the present embodiment, air flowing or staying around seat 1 is drawn in by blower 34 and the air drawn in can be blown out from outlet 33*a* onto a person. Accordingly, as compared with such a conventional vehicle seat air-conditioning device, vehicle seat air-conditioning device 3 according to the present embodiment can simplify the structure in a vehicle.

In vehicle seat air-conditioning device 3, first inlet 31*a* is provided in seating surface 11*c* of seat 1, second inlet 32*a* is provided in a portion other than seating surface 11*c* of seat 1, and outlet 33*a* is also provided in seat 1. Thus, vehicle seat air-conditioning device 3 has a configuration for drawing in air flowing or staying around seat 1 and blowing the air drawn in from outlet 33*a* onto a person. Furthermore, in vehicle seat air-conditioning device 3, first ventilation path 31, a portion of second ventilation path 32, ventilation path selection switch 35, blower 34, and third ventilation path 33 are provided inside of seat 1. Thus, all the elements for air conditioning suitable for a state of a person seated in seat 1 are provided inside of seat 1. Accordingly, as compared with conventional vehicle seat air-conditioning device 3, vehicle seat air-conditioning device 3 according to the present disclosure can simplify the structure.

In vehicle seat air-conditioning device 3, by using ventilation path selection switch 35, only the air drawn in from first inlet 31*a* can be discharged from outlet 33*a*, only the air drawn in from second inlet 32*a* can be discharged from outlet 33*a*, and the air simultaneously drawn in from both first inlet 31*a* and second inlet 32*a* can be discharged from outlet 33*a*. Thus, air can be drawn in from different inlets, namely, first inlet 31*a* and second inlet 32*a*, and air drawn in from an inlet and air drawn in from a different inlet can be separately discharged from outlet 33*a* or mixed air can be discharged from outlet 33*a*, so that the temperature of air discharged from outlet 33*a* can be made different. Thus, vehicle seat air-conditioning device 3 can provide air conditioning suitable for a state of a person seated in seat 1 by switching air discharged from outlet 33*a* of seat 1.

Thus, vehicle seat air-conditioning device 3 according to the present disclosure can provide a person seated in seat 1 with a comfortable air-conditioned environment while a structure in a vehicle is made less complicated.

In particular, first inlet 31*a* and second inlet 32*a* are provided vertically below outlet 33*a* and thus, for example, it is also possible that first inlet 31*a* is provided in a portion corresponding to legs of a person, second inlet 32*a* is provided in a portion where effects are less likely to be exerted onto the body of the person, and outlet 33*a* is provided in a portion corresponding to the upper half of the body of the person. In this case, an air current can be generated by drawing in air from at least one of first inlet 31*a* or second inlet 32*a*, and also air can be blown onto a person by discharging the air drawn in from outlet 33*a*. Accordingly, an air current that covers the body of a person can be generated, and thus conditioned air can be kept staying around a person seated in seat 1, and thus a comfortable air-conditioned environment can be provided with minimum air-conditioning energy.

Furthermore, ventilation path selection switch 35 has a first mode in which first ventilation path 31 is connected to third ventilation path 33.

According to this, for example, air drawn in from first inlet 31*a* can be blown onto the upper half of the body of a person. By discharging air from outlet 33*a*, the air blown onto the upper half of the body of the person is drawn in from first inlet 31*a* in seating surface 11*c*, or in other words, drawn in from first inlet 31*a* via the upper half of the body of the person seated in seat 1 from outlet 33*a*. Accordingly, an air current that covers from the upper half of the body of a person to the buttocks and thighs can be generated.

For example, when a person is seated in seat 1 for a long time while the vehicle air-conditioning device is performing a cooling operation or when the vehicle air-conditioning device is performing a heating operation, the buttocks and the thighs of a person in contact with seating surface 11*c* may get damp due to sweat. However, in vehicle seat air-conditioning device 3, an air current can be generated around the buttocks and the thighs of a person by drawing in ambient air from first inlet 31*a*, and thus the buttocks and the thighs of the person can be prevented from getting damp. Accordingly, a comfortable air-conditioned environment can be provided to the person seated in seat 1.

Furthermore, ventilation path selection switch 35 has a second mode in which second ventilation path 32 is connected to third ventilation path 33.

According to this, for example, air drawn in from second inlet 32*a* can be blown onto the upper half of the body of a person. Thus, when second inlet 32*a* is provided at a position where air discharged from the vehicle air-conditioning device can be drawn in (for example, a lower portion of seat 1), a comfortable air-conditioned environment can be provided for a person seated in seat 1 by quickly blowing cool air and warm air onto the upper half of the body of the person.

For example, when the outdoor temperature is high or when an amount of solar radiation is great, for instance, the temperature in the cabin tends to be high immediately after a person gets into a vehicle. Vehicle seat air-conditioning device 3 according to the present embodiment can blow air drawn in from second inlet 32*a* onto the upper half of the body of a person seated in seat 1. In particular, during a cooling operation of the vehicle air-conditioning device, cooled air can be taken in from second inlet 32*a*, and thus the body of a person seated in seat 1 can be cooled.

When, for instance, the outdoor temperature is low, the temperature in the cabin is low immediately after a person gets into a vehicle. Vehicle seat air-conditioning device 3 according to the present embodiment can blow air drawn in from second inlet 32*a* onto the upper half of the body of a person seated in seat 1. In particular, during a heating operation of the vehicle air-conditioning device, heated air can be taken in from second inlet 32*a*, and thus the body of a person seated in seat 1 can be warmed. Thus, vehicle seat air-conditioning device 3 can provide a person seated in seat 1 with a comfortable air-conditioned environment.

Furthermore, ventilation path selection switch 35 has a third mode in which first ventilation path 31 and second ventilation path 32 are connected to third ventilation path 33.

According to this, for example, air drawn in from first inlet 31*a* and second inlet 32*a* can be blown onto the upper half of the body of a person. By discharging air from outlet 33*a*, the air blown onto the upper half of the body of the person is drawn in from first inlet 31*a* in seating surface 11*c*, or in other words, drawn in from first inlet 31*a* via the upper half of the body of the person seated in seat 1 from outlet 33*a*. Accordingly, an air current that covers from the upper half of the body of a person to the buttocks and the thighs can be generated.

For example, during a cooling operation of the vehicle air-conditioning device, there are cases where the temperature of air blown out from the air-conditioning device has sufficiently lowered, but the temperature in the cabin is not sufficiently lowered. Vehicle seat air-conditioning device 3 according to the present embodiment can mix air around seat 1 drawn in from first inlet 31*a* with air cooled by the vehicle air-conditioning device, which is drawn in from second inlet 32*a*, and can blow the mixed air onto the upper half of the body of a person seated in seat 1. Accordingly, the upper half of the body of the person seated in seat 1 can be prevented from getting excessively cold, so that the body can be moderately cooled. Further, air currents can be generated around the buttocks and the thighs of a person by drawing in ambient air from first inlet 31*a*, and thus the buttocks and the thighs of the person can be prevented from getting damp.

Thus, vehicle seat air-conditioning device 3 can provide a more comfortable air-conditioned environment to a person seated in seat 1.

Furthermore, controller 60 switches between the modes of ventilation path selection switch 35 by selecting one of the modes from among the first mode, the second mode, and the third mode.

According to this, controller 60 can select one of the modes from among the first mode, the second mode, and the third mode, and thus can provide an air-conditioned environment according to a person seated in seat 1.

Vehicle seat air-conditioning device 3 according to the present embodiment includes first temperature sensor 51 that detects a temperature in the cabin of the vehicle; and second temperature sensor 52 that detects a surface temperature of the person seated in seat 1. Controller 60 switches between the modes of ventilation path selection switch 35, based on information indicating a first temperature detected by first temperature sensor 51 and information indicating a second temperature detected by second temperature sensor 52.

According to this, the first temperature that is a temperature in the cabin and the second temperature that is a surface temperature of a person seated in seat 1 can be detected. Accordingly, the modes of ventilation path selection switch 35 can be automatically switched according to the first temperature and the second temperature, and thus a person seated in seat 1 can be provided with a more comfortable air-conditioned environment.

In vehicle seat air-conditioning device 3 according to the present embodiment, controller 60 causes ventilation path selection switch 35 to execute the second mode when the first temperature detected by first temperature sensor 51 is higher than or equal to a set cabin temperature, and the second temperature detected by second temperature sensor 52 is higher than or equal to a first surface temperature.

According to this, for example, when the outdoor temperature is high or when an amount of solar radiation is great, for instance, the temperature in the cabin tends to be high immediately after a person gets into a vehicle. At this time, the first temperature is higher than or equal to the set cabin temperature that is set to a temperature at which a person feels comfortable. Furthermore, when the first surface temperature is set to a temperature at which a person seated in seat 1 feels extremely hot, the second temperature may be higher than or equal to the first surface temperature.

According to this, in the above case, during a cooling operation of the vehicle air-conditioning device, the air cooled by the air-conditioning device can be taken in from second inlet 32*a*, and thus the body of a person seated in seat 1 can be cooled. Thus, vehicle seat air-conditioning device 3 can provide a person seated in seat 1 with a more comfortable air-conditioned environment.

In vehicle seat air-conditioning device 3 according to the present embodiment, controller 60 causes ventilation path selection switch 35 to execute the third mode when the first temperature detected by first temperature sensor 51 is higher than or equal to a set cabin temperature, and the second temperature detected by second temperature sensor 52 is lower than the first surface temperature, and is higher than or equal to the second surface temperature that is lower than the first surface temperature.

For example, when the outdoor temperature is high or when an amount of solar radiation is great, there are cases where the indoor space is getting cool owing to the vehicle air-conditioning device, but the temperature in the cabin (the first temperature) is still higher than or equal to the set cabin temperature. Furthermore, when a temperature range lower than the first surface temperature and higher than or equal to the second surface temperature is set to a range of temperatures at which a person seated in seat 1 feels hot, the second temperature may be in the temperature range.

According to this, in the above case, during a cooling operation of the vehicle air-conditioning device, vehicle seat air-conditioning device 3 can take in air in the cabin that is not completely cooled (for example, air having an ordinary temperature) and air cooled by the vehicle air-conditioning device. Vehicle seat air-conditioning device 3 can mix air having an ordinary temperature in the cabin with cooled air, and blow the mixed air onto a person. Thus, a person seated in seat 1 does not feel excessive coldness, and his/her body can be moderately cooled. Accordingly, vehicle seat air-conditioning device 3 can provide a person seated in seat 1 with a more comfortable air-conditioned environment.

In vehicle seat air-conditioning device 3 according to the present embodiment, controller 60 causes ventilation path selection switch 35 to execute the first mode when the first temperature detected by first temperature sensor 51 is lower than a set cabin temperature, and the second temperature detected by second temperature sensor 52 is lower than the second surface temperature, and is higher than or equal to the third surface temperature that is lower than the second surface temperature.

For example, when the indoor space is stably cooled by the vehicle air-conditioning device and the temperature in the cabin (the first temperature) is lower than the set cabin temperature, and further when a temperature range lower than the second surface temperature and higher than or equal to the third surface temperature is set to a range of temperatures at which a person seated in seat 1 feels slightly hot or comfortable, the second temperature may be in the above temperature range.

According to this, in the above case, during a cooling operation of the vehicle air-conditioning device, vehicle seat air-conditioning device 3 can generate an air current around the buttocks and the thighs of a person by drawing in ambient air from first inlet 31*a*. Further, vehicle seat air-conditioning device 3 can blow air drawn in toward a person, and thus can blow air onto a person seated in seat 1. Thus, vehicle seat air-conditioning device 3 generates an air current that covers a person seated in seat 1, and thus can provide the person with a more comfortable air-conditioned environment.

In vehicle seat air-conditioning device 3 according to the present embodiment, seat 1 includes seat back 13. Outlet 33*a* is provided in seat back 13.

According to this, if air is discharged from outlet 33*a*, air can be blown onto the upper half of the body of a person. Accordingly, the upper half of the body of the person can be cooled or warmed, and the whole body of the person can be substantially cooled or warmed. Accordingly, a person seated in seat 1 can be provided with a more comfortable air-conditioned environment.

In vehicle seat air-conditioning device 3 according to the present embodiment, a plurality of first inlets 31*a* are provided, the plurality of first inlets 31*a* each being first inlet 31*a*, and the plurality of first inlets 31*a* are provided in center portion 11*c*1 and outer edge portion 11*c*2 of seating surface 11*c*.

According to this, the buttocks and the thighs of a person get less damp between seating surface 11*c* and the buttocks and thighs, by drawing in air from first inlets 31*a* formed in center portion 11*c*1 of seating surface 11*c*. First inlets 31*a* formed in outer edge portion 11*c*2 of seating surface 11*c* are formed at positions that are less likely to be covered with the buttocks and the thighs, and thus air around seat 1 can be drawn in therefrom. For example, even if air cannot be drawn in from first inlets 31*a* formed in center portion 11*c*1 of seating surface 11*c*, air can be drawn in from first inlets 31*a* formed in outer edge portion 11*c*2 of seating surface 11*c*. Thus, air can be discharged from outlet 33*a*.

In vehicle seat air-conditioning device 3 according to the present embodiment, one or more outlets 33*a* are provided, one or more outlets 33*a* each being outlet 33*a*, and one or more outlets 33*a* are provided at one or more of positions corresponding to a head, a neck, a shoulder, a back, and a waist of a person.

According to this, if air is discharged from one or more outlets 33*a*, air can be blown onto one or more portions from among the head, the neck, the shoulders, the back, and the waist of a person. Accordingly, the body of the person can be partially cooled or warmed, and the whole body of the person can be substantially cooled or warmed. Accordingly, a person seated in seat 1 can be provided with a more comfortable air-conditioned environment.

Variation 1 of Embodiment 1

In this variation, a difference from the vehicle seat air-conditioning device according to Embodiment 1 is that second inlet 132*a* is provided in seat back 13. The other configuration in this variation is the same as that of Embodiment 1, and thus the same signs are given to the same configuration and functions, and a detailed description of the configuration and functions is omitted.

FIG. 5D is a schematic side view illustrating air flow paths in seat 1 when the second mode is executed in Variation 1 of Embodiment 1. FIG. 5E is a schematic side view illustrating air flow paths in seat 1 when the third mode is executed in Variation 1 of Embodiment 1. FIG. 5F is a schematic side view illustrating air flow paths in seat 1 when the first mode is executed in Variation 1 of Embodiment 1.

In this variation, second ventilation path 132 of vehicle seat air-conditioning device 3*a* leads, to ventilation path selection switch 35, air drawn in from second inlet 132*a* provided in second seat cover 13*b* of seat back 13 by blower 34. Air flows inside of second ventilation path 132 when second ventilation path 132 is selected by ventilation path selection switch 35.

In this variation, second inlet 132*a* is formed in the side surface of seat back 13. In this variation, the height at which second inlet 132*a* is provided from the floor of the cabin is below the height at which outlets 33*a* are provided from the floor of the cabin.

The flows of air in vehicle seat air-conditioning device 3*a* according to this variation are to be described with reference to FIG. 5D to FIG. 5F.

For example, when the outdoor temperature is high or when an amount of solar radiation is great, the temperature in the cabin (the first temperature) tends to be higher than or equal to the set cabin temperature immediately after a person gets into a vehicle. Furthermore, if the second temperature is higher than or equal to the first surface temperature, a person seated in seat 1 often feels extremely hot. Accordingly, as illustrated in FIG. 5D, air in the cabin cooled by the vehicle air-conditioning device is drawn in from second inlet 132*a* and the air drawn in is discharged from outlets 33*a*, thus the cooled air can be blown onto the person seated in seat 1. As a result, the surface temperature of the person seated in seat 1 can be lowered. In FIG. 5D, air led through second ventilation path 132 is shown by a solid line, and air led through third ventilation path 33 is shown by broken lines.

For example, when the outdoor temperature is high or when an amount of solar radiation is great, there are cases where the indoor space is getting cool owing to the vehicle air-conditioning device, but the temperature in the cabin (the first temperature) is still higher than or equal to the set cabin temperature. Furthermore, if the second temperature is lower than the first surface temperature and is higher than or equal to the second surface temperature, the temperature in the cabin is still high, so the person seated in seat 1 may feel hot. Accordingly, as illustrated in FIG. 5E, air in the cabin cooled by the vehicle air-conditioning device is drawn in from second inlet 132*a*, and air is drawn in also from first inlets 31*a* on the seating surface 11*c* side of seat 1. Then, the air drawn in from first inlets 31*a* and the air drawn in simultaneously from second inlet 132*a* are mixed in third ventilation path 33. The mixed air can be blown onto the person seated in seat 1, by being discharged from outlets 33*a*. The temperature of air discharged from outlets 33*a* in the third mode tends to be higher than the temperature of air discharged from outlets 33*a* in the second mode. In this manner, by mixing such air, the air becomes moderately cool, so the person seated in seat 1 can be prevented from feeling extreme coldness. In FIG. 5E, air led through first ventilation path 31 and second ventilation path 132 is shown by solid lines, and air led through third ventilation path 33 is shown by broken lines.

For example, when the indoor space is stably cooled by the vehicle air-conditioning device, and the temperature in the cabin (the first temperature) becomes below the set cabin temperature, and furthermore if the second temperature is lower than the second surface temperature and is higher than or equal to the third surface temperature, it is appropriate if the temperature in the cabin is slightly lower than the set cabin temperature, but nevertheless the person seated in seat 1 is feeling comfortable or slightly hot. Accordingly, as illustrated in FIG. 5F, air is drawn in from first inlets 31*a* on the seating surface 11*c* side of seat 1, and the air drawn in is discharged from outlets 33*a*. Thus, the air can be blown onto the person seated in seat 1. The temperature of air discharged from outlets 33*a* in the first mode tends to be higher than the temperature of air discharged from outlets 33*a* in the third mode. Accordingly, the temperature can be lowered while the temperature that the person seated in seat 1 feels can be prevented from being excessively low. In FIG. 5F, air led through first ventilation path 31 is shown by solid lines, and air led through third ventilation path 33 is shown by broken lines.

Variation 2 of Embodiment 1

In this variation, a difference from the vehicle seat air-conditioning device according to Embodiment 1, for instance, is that first inlets 31*a* are provided in front edge portion E1, rear portion E2, right edge portion E3, and left edge portion E4 of seating surface 11*c* of seat 1. The other configuration in this variation is the same as that of Embodiment 1, for instance, and thus the same signs are given to the same configuration and functions, and a detailed description of the configuration and functions is omitted.

FIG. 6 is a perspective view illustrating an appearance of seat 1 that includes vehicle seat air-conditioning device 3*b* according to Variation 2 of Embodiment 1.

As illustrated in FIG. 6, first inlets 31*a* are formed in center portion 11*c*1 and outer edge portion 11*c*2 of seating surface 11*c*. Outer edge portion 11*c*2 is at least one of rear portion E2 or front edge portion E1 of seating surface 11*c*. Accordingly, first inlets 31*a* are provided in center portion 11*c*1 of seating surface 11*c*, and further provided in at least one of rear portion E2 or front edge portion E1 of seating surface 11*c*. Outer edge portion 11*c*2 may further include at least one of right edge portion E3 or left edge portion E4.

In this variation, first inlets 31*a* are provided in all of front edge portion E1, rear portion E2, right edge portion E3, and left edge portion E4 of seating surface 11*c*. Front edge portion E1 of seating surface 11*c* is located on the front side of center portion 11*c*1 of seating surface 11*c*. Rear portion E2 of seating surface 11*c* is located on the rear side of center portion 11*c*1 of seating surface 11*c*. Right edge portion E3 of seating surface 11*c* is located on the right side of center portion 11*c*1 of seating surface 11*c*. Left edge portion E4 of seating surface 11*c* is located on the left side of center portion 11*c*1 of seating surface 11*c*. Right edge portion E3 and left edge portion E4 are ridge portions of seating portion 10 on both sides.

First inlets 31*a* formed in rear portion E2, front edge portion E1, right edge portion E3, and left edge portion E4 are provided at positions that are less likely to be covered by the buttocks and the thighs when a person is seated in seat 1.

In vehicle seat air-conditioning device 3*b* according to this variation, outer edge portion 11*c*2 is at least one of rear portion E2 or front edge portion E1 of seating surface 11*c*.

According to this, first inlets 31*a* provided in outer edge portion 11*c*2 are less likely to be covered by the buttocks or the thighs of a person even when the person is seated in seat 1. Thus, first inlets 31*a* that are not covered by the buttocks or the thighs of a person can be more certainly ensured, and thus a possibility that air cannot be drawn in can be further lowered.

Embodiment 2

In the present embodiment, a difference from vehicle seat air-conditioning device 3 according to Embodiment 1 is that modes are switched according to a target discharge temperature. The other configuration in the present embodiment is the same as that of Embodiment 1, and thus the same signs are given to the same configuration and functions, and a detailed description of the configuration and functions is omitted.

FIG. 7 is a block diagram illustrating vehicle seat air-conditioning device 3 according to Embodiment 2.

In the present embodiment, as illustrated in FIG. 7, controller 60 causes vehicle air-conditioning device 90 to adjust at least one of the temperature or the air volume of conditioned air blown out from vehicle air-conditioning device 90. Vehicle air-conditioning device 90 may be or may not be included in elements of vehicle seat air-conditioning device 3.

In the present embodiment, the second temperature sensor in Embodiment 1 may not be included in vehicle seat air-conditioning device 3, and is not an essential element in the present embodiment.

<Processing>

FIG. 8 is a flowchart illustrating processing performed by vehicle seat air-conditioning device 3 according to Embodiment 2. FIG. 9 is a schematic diagram illustrating switching between modes of ventilation path selection switch 35.

As illustrated in FIG. 8, first temperature sensor 51 detects a temperature in a cabin of a vehicle. As a result of detection by first temperature sensor 51, first temperature sensor 51 outputs, to controller 60, information indicating a first temperature that is a temperature in the cabin. Controller 60 obtains information indicating a first temperature from first temperature sensor 51. Controller 60 obtains information indicating a target temperature, from, for instance, operation receiver 65 of vehicle air-conditioning device 90 that receives an operation input made by a person. Controller 60 calculates a difference between the temperature in the cabin and the target temperature, based on the items of obtained information (S21). The target temperature is a preset temperature, and is, for example, a set temperature that is set in vehicle air-conditioning device 90 or a desired set temperature of a person.

Controller 60 calculates a target discharge temperature of air blown out from outlets 33*a*, based on the calculated difference, in order to adjust the temperature in the cabin to the target temperature (S22).

Controller 60 selects a mode according to the calculated target discharge temperature (S23). The mode determined by controller 60 is selected according to the target discharge temperature, as illustrated in FIG. 9, for example. Specifically, controller 60 selects a first mode if the calculated target discharge temperature is higher than or equal to temperature Xb, selects a third mode if the calculated target discharge temperature is higher than or equal to temperature Xa that is lower than temperature Xb, and selects a second mode if the calculated target discharge temperature is lower than temperature Xa.

Note that due to a change in the ambient environment of the vehicle while traveling, a switched mode may be switched back to a previous mode. In this case, in order to avoid excessively frequent switching between the modes, switching is performed with hysteresis, as illustrated in FIG. 9.

Note that FIG. 4 in Embodiment 1 may be used in selecting a mode, and the selection is not limited to the one in the present embodiment.

Controller 60 determines the output of blower 34 (that is, an amount of air to be blown) according to the calculated target discharge temperature (S24). For example, controller 60 may increase the amount of air to be blown by blower 34 as the target discharge temperature is lower when the target temperature is about 25 degrees Celsius, which is a normal temperature, when performing a cooling operation, and may increase an amount of air to be blown by blower 34 when information indicating the surface temperature of a person is obtained and if the information indicates that the surface temperature of the person is high.

Controller 60 determines whether the mode selected in step S23 is the third mode (S25).

If the mode selected in step S23 is the third mode (Yes in S25), controller 60 adjusts a mixing ratio of air drawn in from first inlets 31*a* to air drawn in from second inlet 32*a* in the third mode (S26). Controller 60 makes a proportion of air drawn in from second inlet 32*a* greater than a proportion of air drawn in from first inlets 31*a*, as the target discharge temperature is higher. By controlling an opening (an air inflow) of ventilation path selection switch 35, controller 60 can adjust a mixing ratio of an inflow of air drawn in from first inlets 31*a* into third ventilation path 33 and an inflow of air drawn in from second inlet 32*a* into third ventilation path 33.

If the mode selected in step S23 is not the third mode (No in S25) or if step S26 is performed, controller 60 executes the mode selected in step S23 (S27). Then, controller 60 ends the processing.

Controller 60 may perform control as follows. Here, the control described in the following is mostly for an example when cooling is performed.

Note that when controller 60 obtains information indicating a temperature outside of a vehicle from an outdoor temperature sensor that detects a temperature outside of the vehicle, controller 60 may correct a calculated target discharge temperature, based on the information. For example, the higher the temperature outside of the vehicle indicated by the information is, the lower temperature the calculated target discharge temperature may be corrected to.

Note that if controller 60 obtains information indicating an amount of solar radiation from a solar radiation sensor that detects an amount of solar radiation emitted onto the vehicle, controller 60 may correct the calculated target discharge temperature, based on the information. For example, the more the amount of solar radiation indicated by the information is, the lower temperature the calculated target discharge temperature may be corrected to.

Note that if controller 60 obtains, from a temperature sensor that detects a temperature of air at first inlets 31*a*, information indicating a temperature of the air drawn in, controller 60 may correct the calculated target discharge temperature, based on the information. For example, the higher the temperature of the air drawn in indicated by the information is, the lower temperature the calculated target discharge temperature may be corrected to.

Note that if controller 60 obtains, from a humidity sensor that detects humidity of air at first inlets 31*a*, information indicating humidity of the air drawn in, controller 60 may correct the calculated target discharge temperature, based on the information. For example, the higher the humidity of the air drawn in indicated by the information is, the higher temperature the calculated target discharge temperature may be corrected to.

Note that when controller 60 obtains, from a skin temperature sensor that detects a skin temperature of a person seated in seat 1, information indicating a skin temperature of the person, controller 60 may correct the calculated target discharge temperature, based on the information. For example, the higher the surface temperature indicated by the information is, the lower temperature the calculated target discharge temperature may be corrected to.

Note that when controller 60 obtains, from a sensor that detects a surface temperature of seat 1 (for example, an infrared sensor), information indicating the surface temperature of seat 1, controller 60 may correct the calculated target discharge temperature, based on the information. For example, the higher the surface temperature indicated by the information is, the lower temperature the calculated target discharge temperature may be corrected to.

Note that if controller 60 obtains information indicating characteristics of a person seated in seat 1 by an image capturing device capturing an image of the person, controller 60 may correct the calculated target discharge temperature, based on the information. Characteristics of a person include posture, a gender, physique, a race, and an awaking degree of the person, for instance. Controller 60 determines whether a person is sensitive to heat or cold according to the characteristics of the person, and may correct the target discharge temperature to a higher temperature or a lower temperature, based on the result of the determination. Further, controller 60 may determine whether a person is sensitive to heat or cold based on input information that is input via operation receiver 65 by operating the vehicle air-conditioning device, and correct the target discharge temperature, based on the result of the determination. For example, controller 60 corrects the target discharge temperature to a lower temperature if the person is sensitive to heat. If the person is sleepy (when the awakening degree is low), controller 60 corrects the target discharge temperature to a lower temperature. In this manner, the target discharge temperature may be corrected based on characteristics and preference of a person.

Note that if controller 60 obtains sensing information from a heart rate sensor provided in a vehicle, controller 60 may correct the calculated target discharge temperature, based on the sensing information. For example, if a person is determined to be feeling fatigue due to coldness, based on the sensing information, controller 60 may correct the target discharge temperature to a higher temperature. The heart rate sensor may be actualized by using a seat heater provided in a seat or a steering wheel heater, for example.

[Operational Effects]

Next, operational effects yielded by vehicle seat air-conditioning device 3 according to the present embodiment are to be described.

As described above, vehicle seat air-conditioning device 3 according to the present embodiment includes: first temperature sensor 51 that detects a temperature in the cabin of the vehicle. Controller 60: obtains information indicating the temperature in the cabin detected by first temperature sensor 51 and information indicating a target temperature that is preset; calculates a target discharge temperature based on a difference between the temperature in the cabin and the target temperature indicated by the information; and switches between the modes of ventilation path selection switch 35, according to the target discharge temperature calculated.

According to this, the modes can be switched according to a target temperature, and thus if the target temperature is set to a temperature preferable to a person, a more comfortable air-conditioned environment can be provided to a person seated in seat 1.

The present embodiment also yields operational effects similar to those as described above.

Embodiment 3

In the present embodiment, a difference from vehicle seat air-conditioning device 3 according to Embodiment 2 is that modes are automatically switched based on a table showing a correlation between a temperature in a cabin and an elapsed time. The other configuration in the present embodiment is the same as that of Embodiment 2, and thus the same signs are given to the same configuration and functions, and a detailed description of the configuration and functions is omitted.

FIG. 10 is a block diagram illustrating vehicle seat air-conditioning device 3 according to Embodiment 3.

As illustrated in FIG. 10, controller 60 includes storage 61. Storage 61 stores therein a table showing a correlation between a temperature in a cabin and an elapsed time during which a vehicle air-conditioning device provided in a vehicle keeps discharging conditioned air. The table is shown in FIG. 12 described below. Controller 60 reads the table from storage 61, and using the read table, automatically switches between modes of ventilation path selection switch 35 as the time elapses according to the temperature in the cabin. Controller 60 can change mode switching for ventilation path selection switch 35 to automatic mode switching or manual mode switching, by obtaining an instruction via operation receiver 65.

Note that present Embodiment 3 shows a configuration in which a correlation between a temperature in the cabin and an elapsed time during which the vehicle air-conditioning device keeps discharging conditioned air is stored in the form of a table, yet the present embodiment is not limited thereto. An approximation showing a correlation therebetween may be obtained in advance, and the approximation may be stored in storage 61. Controller 60 may calculate and obtain a temperature in the cabin by substituting the elapsed time into the approximation.

Controller 60 may measure an elapsed time by using a clock such as a timer. The clock may be provided in controller 60, or may be provided separately from controller 60.

Controller 60 obtains information indicating a temperature around the vehicle (hereinafter, referred to as an initial vehicle ambient temperature), and estimates a temperature in the cabin based on the obtained information. Thus, controller 60 obtains an estimated temperature that is a temperature in the cabin (hereinafter, referred to as an estimated initial indoor temperature), based on the initial vehicle ambient temperature. The initial vehicle ambient temperature may be obtained from, for instance, a temperature sensor provided in the vehicle or an external device outside of the vehicle.

Storage 61 is a storage device such as read only memory (ROM) or flash memory. Note that controller 60 may not include storage 61, and storage 61 may be provided outside controller 60 and communicably connected to controller 60 so that information communication is possible.

Storage 61 stores therein a table showing, for each estimated initial indoor temperature, a correlation between a current indoor temperature and an elapsed time during which the vehicle air-conditioning device keeps discharging conditioned air.

<Processing>

FIG. 11 is a flowchart illustrating processing performed by vehicle seat air-conditioning device 3 according to Embodiment 3. FIG. 11 shows a case where the vehicle air-conditioning device performs a cooling operation. FIG. 12 includes a schematic diagram illustrating switching between modes of ventilation path selection switch 35 according to a target discharge temperature, and a schematic diagram illustrating a relation between an elapsed time and an estimated temperature. The following shows, as an example, a state in which modes are automatically switched in the order of the second mode, the third mode, and the first mode. Note that in FIG. 11, the same signs are given to the same processing as those in the flowchart in FIG. 8 described in Embodiment 2, and detailed description thereof is omitted.

As illustrated in FIG. 11, first, controller 60 obtains information indicating an initial vehicle ambient temperature (S31).

Next, controller 60 calculates an estimated initial indoor temperature, based on the obtained information (S32). For example, in FIG. 12, controller 60 calculates estimated initial indoor temperature Tr0 by obtaining information indicating an initial vehicle ambient temperature.

Note that controller 60 may correct estimated initial indoor temperature Tr0 using information obtained by a solar radiation sensor, a temperature sensor in the cabin, a humidity sensor in the cabin, a skin temperature sensor, and a temperature sensor that detects the surface temperature of seat 1, for instance. In the flowchart in FIG. 11, this processing is not performed.

Controller 60 reads, from storage 61, a table showing a correlation between current indoor temperature Tr and an elapsed time in FIG. 12. Controller 60 calculates current indoor temperature Tr according to an elapsed time, based on the table read from storage 61 (S33). Thus, controller 60 calculates, based on the table, current indoor temperature Tr that changes when the vehicle air-conditioning device is driven as time elapses, from estimated initial indoor temperature Tr0 that is a starting point. For example, in FIG. 12, by maintaining the vehicle air-conditioning device being driven, controller 60 calculates that the temperature has reached current indoor temperature Tr1 at elapsed time t1, based on the table.

After that, controller 60 obtains a target discharge temperature (S22), selects a mode (S23), determines the amount of air to be blown (S24), adjusts a mixing ratio in the third mode (S26) when the mode is the third mode (Yes in S25), and executes the selected mode (S27), but those operations are the same as those in FIG. 8, and thus a detailed description thereof is omitted.

Next, controller 60 determines whether current indoor temperature Tr has reached a target temperature (S34). If current indoor temperature Tr has reached the target temperature (Yes in S34), controller 60 ends the processing in FIG. 11. On the other hand, if current indoor temperature Tr has not reached the target temperature (No in S34), controller 60 returns to step S33 and repeats the processing in step S33 and steps thereafter until current indoor temperature Tr reaches the target temperature.

Through such processing, as illustrated in FIG. 12, the modes are automatically switched in the order of the second mode, the third mode, and the first mode. Thus, controller 60 switches the second mode to the third mode when current indoor temperature Tr reaches Tr1, and switches the third mode to the first mode when current indoor temperature Tr reaches Tr2.

Note that controller 60 may change the mode switching to manual mode switching if an instruction for ending automatic mode switching is received via operation receiver 65. In this case, controller 60 may execute the switched mode without changing it to another mode.

Note that there are cases where modes are switched in the reverse order of the order of the second mode, the third mode, and the first mode, due to a change in vehicle ambient environment while the vehicle is traveling, and thus the order is not limited to the one in the above description. If the modes are switched in the reverse order, switching is performed with hysteresis, as illustrated in FIG. 12 in order to avoid excessively frequent switching between the modes.

Note that when a heating operation is performed, the order of switching between the modes is the same. In this case, the relation between the elapsed time and current indoor temperature Tr in FIG. 12 is a relation reversed upside down with respect to the axial direction of the elapsed time. Thus, when a heating operation is performed, the relation between the elapsed time and current indoor temperature Tr ends up being constant after current indoor temperature Tr rises.

[Operational Effects]

Next, operational effects yielded by vehicle seat air-conditioning device 3 according to the present embodiment are to be described.

As described above, in vehicle seat air-conditioning device 3 according to the present embodiment, controller 60 switches between the modes of ventilation path selection switch 35, based on a table showing a correlation between a temperature in the cabin and an elapsed time during which a vehicle air-conditioning device provided in the vehicle keeps discharging conditioned air.

According to this, the modes of ventilation path selection switch 35 can be automatically switched based on the table. As a result, vehicle seat air-conditioning device 3 can be controlled independently from the vehicle air-conditioning device.

The present embodiment also yields operational effects similar to those as described above.

Embodiment 4

In the present embodiment, a difference from vehicle seat air-conditioning device 3 according to Embodiment 2 is that controller 60 temporarily switches a mode to the second mode according to a change in temperature. The other configuration in the present embodiment is the same as that of Embodiment 2, and thus the same signs are given to the same configuration and functions, and a detailed description of the configuration and functions is omitted.

Controller 60 temporarily switches ventilation path selection switch 35 to the second mode, when ventilation path selection switch 35 is in one of the modes other than the second mode, and a change in the first temperature detected by first temperature sensor 51 and a change in the second temperature detected by second temperature sensor 52 are in a predetermined temperature range for a second predetermined period. Here, the second predetermined period is about several tens of minutes after which tension is assumed to be released. A specific example of the second predetermined period is about 30 minutes. Note that this is a mere example, and the second predetermined period is not limited to 30 minutes. Here, a predetermined temperature range is a range of several degrees Celsius in which a temperature is assumed to be stable. A specific example of the predetermined temperature range is about a range of 1 to 2 degrees Celsius. Note that this range is a mere example, and the predetermined temperature range is not limited to a range of 1 to 2 degrees Celsius.

<Processing>

FIG. 13 is a flowchart illustrating processing performed by vehicle seat air-conditioning device 3 according to Embodiment 4.

Controller 60 determines whether ventilation path selection switch 35 is presently selecting a mode other than the second mode (S41).

Controller 60 ends the processing in the flowchart when ventilation path selection switch 35 is presently selecting the second mode so that a mode other than the second mode is not being selected (No in S41).

On the other hand, when ventilation path selection switch 35 is presently selecting a mode other than the second mode (Yes in S41), controller 60 determines whether changes in the temperatures detected by first temperature sensor 51 and second temperature sensor 52 are each within the predetermined temperature range.

Controller 60 ends the processing in the flowchart if the temperature changes are not within the predetermined temperature range (No in S42).

On the other hand, if controller 60 determines that the temperature changes are each within the predetermined temperature range (Yes in S42), controller 60 determines whether the time period in which the temperature changes are each within the predetermined temperature range has exceeded the second predetermined period (S43).

When controller 60 determines that the time period in which the temperature changes are each within the predetermined temperature range has not exceeded the second predetermined period (No in S43), controller 60 returns the processing to step S41.

On the other hand, when controller 60 determines that the time period in which the temperature changes are each within the predetermined temperature range has exceeded the second predetermined period (Yes in S43), controller 60 controls and causes ventilation path selection switch 35 to temporarily select the second mode. Accordingly, ventilation path selection switch 35 switches the presently selected mode to the second mode (S44).

Controller 60 determines whether a third predetermined period has elapsed since ventilation path selection switch 35 temporarily selected the second mode (S45).

When controller 60 determines that the third predetermined period has not elapsed since ventilation path selection switch 35 temporarily selected the second mode (No in S45), controller 60 returns the processing to step S44.

On the other hand, when controller 60 determines that the third predetermined period has elapsed since ventilation path selection switch 35 temporarily selected the second mode (Yes in S45), controller 60 controls and causes ventilation path selection switch 35 to select the previous mode that is a mode immediately before the second mode is selected. Accordingly, ventilation path selection switch 35 switches the second mode to the mode immediately before the switching is made (S46). The mode of ventilation path selection switch 35 returns back to the previously selected mode. Then, controller 60 ends the processing in the flowchart.

[Operational Effects]

Operational effects yielded by vehicle seat air-conditioning device 3 according to the present embodiment are to be described.

As described above, in vehicle seat air-conditioning device 3 according to the present embodiment, controller 60 temporarily switches ventilation path selection switch 35 to the second mode, when ventilation path selection switch 35 is in one of the modes other than the second mode, and a change in the first temperature detected by first temperature sensor 51 and a change in the second temperature detected by second temperature sensor 52 are in a predetermined temperature range for a second predetermined period.

According to this, air is not drawn in from seating surface 11*c* in the second mode only, and thus an air current that covers the body is temporarily stopped by switching from a mode other than the second mode to the second mode. Accordingly, a person seated in seat 1 readily notices a change in air current. If a state in which the temperature is stable maintains and the person seated in seat 1 possibly releases tension, air having a temperature difference can be blown out from an outlet. Accordingly, vehicle seat air-conditioning device 3 can give a warning to a person seated in seat 1.

The present embodiment also yields operational effects similar to those as described above.

Embodiment 5

In this embodiment, a difference from the vehicle seat air-conditioning device according to Embodiment 1, for instance, is a configuration in which air is drawn in from a side surface of seat 1, for instance. The other configuration in the present embodiment is the same as that of Embodiment 1, for instance, and thus the same signs are given to the same configuration and functions, and a detailed description of the configuration and functions is omitted.

<Configuration>

FIG. 14 is a perspective view illustrating an appearance of vehicle air-conditioning unit 2*b* in Embodiment 5, which is provided in a cabin of vehicle 100. FIG. 15 is a perspective view illustrating an appearance of vehicle seat air-conditioning device 3*c* according to Embodiment 5.

As illustrated in FIG. 14, vehicle 100 is provided with a driver seat, a front passenger seat, center console 2*a*, and air-conditioning unit 2*b*.

The driver seat and the front passenger seat are each seat 1 for a person to be seated, and are aligned in the width direction (the right-and-left direction) of vehicle 100. Center console 2*a* is provided in a center portion of vehicle 100 between the driver seat and the front passenger seat, and separates the driver seat from the front passenger seat. Note that the term "between the driver seat and the front passenger seat" means not only a space between the driver seat and the front passenger seat, but also a space that includes the driver seat and the front passenger seat, extending from the driver seat to the front passenger seat. Center console 2*a* is provided in vehicle 100. Center console 2*a* is elongated in the length direction of vehicle 100, and is connected to an instrument panel of vehicle 100. Air-conditioning unit 2*b* is an air-conditioning device for conditioning air in the cabin. Specifically, air-conditioning unit 2*b* is provided in the vehicle body of vehicle 100, and is covered with the instrument panel of vehicle 100. The present embodiment shows, as an example, outlets 2*c* of air-conditioning unit 2*b* such as an air conditioner disposed in a center portion of vehicle 100 in the width direction (the right-and-left direction).

As illustrated in FIG. 14 and FIG. 15, seat 1 provided in vehicle 100, for instance, cools or warms a person seated in seat 1 by blowing air onto the upper half of the body of the person. Specifically, seat 1 can cool or warm the body of a person seated in seat 1 by blowing air onto the head, the neck, the shoulders, the back, the waist, the buttocks, and the thighs, for instance, of the person. The air in the cabin of vehicle 100 can be conditioned by drawing in air from second inlet 532*a* provided in the side surface of seat 1 and generating air currents between second inlet 532*a* and outlets 2*c* of air-conditioning unit 2*b* for vehicle 100. Seat 1 is a generic term for a driver seat and a front passenger seat. In the present embodiment, description is given using a driver seat as an example of seat 1.

Such vehicle 100 includes vehicle seat air-conditioning device 3*c* for a vehicle that includes seat 1, and power supply 70.

[Vehicle Seat Air-Conditioning Device 3*c*]

Vehicle seat air-conditioning device 3*c* is an air-conditioning device that conditions air in the cabin of vehicle 100. Vehicle seat air-conditioning device 3*c* can blow air onto a person seated in seat 1 from behind the person. Vehicle seat air-conditioning device 3*c* blows air by drawing in air staying around seat 1 and discharging the air drawn in. Accordingly, if the temperature around seat 1 is higher than an ordinary temperature, warm air is blown, whereas if the temperature around seat 1 is lower than an ordinary temperature, cool air is blown. Note that an air conditioner that can perform heating and cooling operations may be provided in vehicle seat air-conditioning device 3*c*.

FIG. 16 is a plan view illustrating vehicle seat air-conditioning device 3*c* according to Embodiment 5. FIG. 17 includes side views illustrating vehicle seat air-conditioning device 3*c* according to Embodiment 5. FIG. 16 and FIG. 17 illustrate vehicle seat air-conditioning device 3*c* in a state in which the inside thereof is shown. FIG. 18 is a block diagram illustrating vehicle seat air-conditioning device 3*c* according to Embodiment 5.

As illustrated in FIG. 15 to FIG. 18, vehicle seat air-conditioning device 3*c* includes seat 1, blower 34, second ventilation path 532, outlet temperature sensor 50, and controller 60.

As illustrated in FIG. 15 to FIG. 17, second seat pad 13*a* includes second ventilation path 532 for blowing out, from outlet 33*a*, air drawn in from second inlet 532*a*, and blower 34 that leads air from second inlet 532*a* to outlet 33*a*, which is provided in second ventilation path 532. By the driving of blower 34, air flows into second inlet 532*a* provided in second seat pad 13*a*, after which the air flowing into is led through second ventilation path 532 and is blown out from outlet 33*a*.

As illustrated in FIG. 17, seat frame 13*c* is provided inside of seat back 13. Seat frame 13*c* is a skeletal member that can support second seat pad 13*a* in a predetermined orientation by second seat pad 13*a* being attached thereto. Seat frame 13*c* is supported by first seat pad 11*a* turnably about the Y axis with respect to seating portion 10.

First vent holes 12*a* for drawing in air and second vent holes 12*b* for blowing out the air drawn in are formed in second seat cover 13*b*.

First vent hole 12*a* is formed in side surface 13*a*1 on the positive side in the Y-axis direction (left side surface 13*a*1 when a person is seated in seat 1), at a position facing the front passenger seat of vehicle 100 and corresponding to second inlet 532*a*. In the present embodiment, a plurality of first vent holes 12*a* are formed in second seat cover 13*b*.

Air drawn in passes through first vent holes 12*a*. Thus, by the driving of blower 34, air present around first vent holes 12*a* is led to second ventilation path 532 from first vent holes 12*a* and second inlet 532*a*. Accordingly, first vent holes 12*a* also serve as second inlets for drawing in air present around first vent holes 12*a* by suction force from second inlet 532*a*. Note that first vent holes 12*a* may be portions of second ventilation path 532. In this case, first vent holes 12*a* are examples of second inlet 532*a*.

Second vent hole 12*b* is formed in a surface (on the positive side of the X axis direction) facing a person seated in seat 1, at a position corresponding to outlet 33*a* of second ventilation path 532. Second vent hole 12*b* is provided at a position above first vent hole holes 12*a*, or in other words, is provided vertically above or on the positive side of the Z-axis direction. In the present embodiment, a plurality of second vent holes 12*b* are formed in second seat cover 13*b*.

Air led through second ventilation path 532 and discharged from second inlet 532*a* passes through second vent holes 12*b*. Thus, when air led through second ventilation path 532 by the driving of blower 34 is discharged from outlet 33*a*, the air is led to second vent holes 12*b*. Accordingly, second vent holes 12*b* also serve as outlets from which air is blown out to the outside of seat 1. Note that second vent holes 12*b* may be portions of second ventilation path 532. In this case, second vent holes 12*b* are examples of outlet 33*a*.

Note that in the present embodiment, as described above, description is given using a driver seat as an example of seat 1, yet the same description applies also in the case where an example of seat 1 is a front passenger seat. If an example of seat 1 is a front passenger seat, the front passenger seat and the driver seat have a symmetrical configuration with respect to the X-Z plane.

Headrest 15 is a headrest portion that supports the head of a person seated in seat 1. Headrest 15 is fixed at an edge portion of seat back 13 on the positive side of the Z-axis direction.

Note that second vent holes 12*b* may be formed in headrest 15. Thus, a portion of second ventilation path 532 may be provided in headrest 15.

[Blower 34]

As illustrated in FIG. 16 to FIG. 18, blower 34 sends air from second inlet 532*a* to outlet 33*a*. Blower 34 can draw air in from first vent holes 12*a* formed in second seat cover 13*b* for seat 1, and blow the air drawn in, from second vent holes 12*b* formed in second seat cover 13*b*. Specifically, blower 34 is electrically connected to controller 60, and the driving thereof is controlled by controller 60, so that air is drawn in from second inlet 532*a* via first vent holes 12*a*, and the air drawn in is led to second ventilation path 532 and blown out from outlet 33*a*.

Blower 34 is provided in second ventilation path 532 in order to directly or indirectly draw air in from second inlet 532*a*, or stated differently, is provided inside of second seat pad 13*a*. Blower 34 may be fixed to seat frame 13*c*, for example. Note that in the present embodiment, blower 34 is provided on second ventilation path 532, but may be provided outside of second ventilation path 532 as long as an air flow path can be formed in second ventilation path 532. Blower 34 may be provided outside of seat back 13, and thus a position at which blower 34 is provided is not limited in particular.

[Second Ventilation Path 532]

Second ventilation path 532 leads air drawn in from second inlet 532*a* by blower 34 to outlet 33*a*. Thus, air flows through second ventilation path 532. Second ventilation path 532 blows air drawn in from second inlet 532*a*, from outlet 33*a* provided in seat back 13 of seat 1. Second ventilation path 532 is formed by a ventilation duct, for example. Second ventilation path 532 connects second inlet 532*a* to outlet 33*a*, and thus an end of second ventilation path 532 forms second inlet 532*a* and the other end forms outlet 33*a*.

Second inlet 532*a* can draw air in from side surface 13*a*1 of seat 1. Air-permeable second seat cover 13*b* is provided over second inlet 532*a*. Specifically, a first portion of second seat cover 13*b* in which first vent holes 12*a* are formed covers second inlet 532*a*, so that capability of drawing air in from second inlet 532*a* can be ensured. The first portion of second seat cover 13*b* is an example of a cover. Note that in the present embodiment, air is drawn in from second inlet 532*a* via first vent holes 12*a*, but second inlet 532*a* may have a configuration in which air is directly drawn in therefrom.

A configuration of second inlet 532*a* is to be described with reference to FIG. 19.

FIG. 19 is a cross sectional view of vehicle seat air-conditioning device 3*c* taken along line XIX-XIX in FIG. 15. As illustrated in a of FIG. 19, second inlet 532*a* is formed in only side surface 13*a*1 of seat 1. Part a of FIG. 19 corresponds to FIG. 14, for instance. As illustrated in b of FIG. 19, second inlet 532*a* may be formed in only back surface 13*a*3 that is on the opposite side from front surface 13*a*2 in contact with a person seated in seat 1. As illustrated in c of FIG. 19, second inlet 532*a* may be formed in a corner portion that stretches from a portion of side surface 13*a*1 to a portion of back surface 13*a*3 of seat 1.

As illustrated in FIG. 15 to FIG. 17, air drawn in from second inlet 532*a* and led into second ventilation path 532 can be blown out from outlet 33*a*, from front surface 13*a*2 of seat 1 on the positive side of the X axis direction. Air-permeable second seat cover 13*b* is provided over outlet 33*a*. Specifically, a second portion of second seat cover 13*b* in which second vent holes 12*b* are formed covers outlet 33*a*, so that capability of blowing air out from outlet 33*a* can be ensured. The second portion of second seat cover 13*b* is also an example of a cover. Note that in the present embodiment, air is discharged from outlet 33*a* via second vent holes 12*b*, but outlet 33*a* may have a configuration of directly blowing air out.

Fins 33*b* that leads air blown out from outlet 33*a* in a predetermined direction are provided at outlet 33*a*. Note that fins 33*b* may be provided in orientations turnable about the Y axis. In this case, the direction of air blown out from outlet 33*a* can be changed by tilting the orientations of fins 33*b*. Note that fins 33*b* may be controlled turnably by controller 60 in FIG. 18.

Fins 33*b* are provided vertically above the center of outlet 33*a* in the height direction. Stated differently, fins 33*b* are not provided vertically below the center of outlet 33*a* in the height direction. When air is blown out from outlet 33*a* provided with fins 33*b*, air as a viscous fluid is attracted towards fins 33*b* due to the Coanda effect, and thus air is blown out from outlet 33*a* along the surfaces of fins 33*b*, thus readily generating descending air currents.

Such fins 33*b* are provided as elements of vehicle seat air-conditioning device 3*c*. Note that fins 33*b* may not be provided at outlet 33*a*, and are not essential elements of vehicle seat air-conditioning device 3*c*.

As illustrated in FIG. 15, FIG. 16, and FIG. 20, one or more three-dimensional structures 39 are provided in second ventilation path 532. FIG. 20 is a perspective view of three-dimensional structure 39. Three-dimensional structure 39 has a honeycombed structure obtained by binding hexagonal tubes 39*a* into one. Three-dimensional structure 39 has openings that allow air to pass through in the length direction. Three-dimensional structure 39 is provided in an orientation along air led through second ventilation path 532, so that certain strength is ensured in second ventilation path 532. In the present embodiment, three-dimensional structure 39 is provided preferably in a portion close to outlet 33*a* of second ventilation path 532. When a person is seated in seat 1, even if the person leans against seat back 13, three-dimensional structure 39 avoids second ventilation path 532 from being compressed, and air conduction can be further ensured. Note that in the present embodiment, tubes 39*a* are hexagonal, yet the shape is not limited thereto and may be a polygon having a corner count of 5 or less or 7 or more. Note that three-dimensional structure 39 may be formed of different types of polygonal tubes. Note that in the present embodiment, three-dimensional structure 39 is tubular, but may have a plate-like shape, that is, a mesh-like shape formed of hexagonal openings.

Such three-dimensional structure 39 is provided as an element of vehicle seat air-conditioning device 3*c*. Note that three-dimensional structure 39 may not be provided in second ventilation path 532, and is not an essential element of vehicle seat air-conditioning device 3*c*.

Such second ventilation path 532 includes first air-sending path 232*a* and second air-sending path 232*b*, as illustrated in FIG. 16 and FIG. 17.

First air-sending path 232*a* extends from second inlet 532*a* in the negative Y-axis direction to a center portion of seat pad 13*a*, and thereafter is bent and further extends in the positive Z-axis direction by a predetermined amount. First air-sending path 232*a* is L-shaped when viewed in the X-axis direction, as illustrated in FIG. 16. An end of first air-sending path 232*a* forms second inlet 532*a*, and the other end of first air-sending path 232*a* communicates with (is connected to) second air-sending path 232*b*. Blower 34 is provided inside of first air-sending path 232*a*.

Second inlet 532*a* is provided at a position above center console 2*a*. Thus, second inlet 532*a* is provided vertically above center console 2*a*. Accordingly, for example, second inlet 532*a* is provided at a height corresponding to outlets 2*c* of air-conditioning unit 2*b* such as an air conditioner provided in a center portion of the instrument panel of vehicle 100, and thus air staying between the driver seat and the front passenger seat and including conditioned air blown out from outlets 2*c* of air-conditioning unit 2*b* can be drawn in from second inlet 532*a*.

As illustrated in a of FIG. 17, when seat back 13 is viewed in a direction (the Y-axis direction) in which the driver seat and the front passenger seat are aligned, second inlet 532*a* overlaps seat frame 13*c*, or is provided between seat frame 13*c* and back surface 13*a*3 on the opposite side from front surface 13*a*2 that is in contact with a person seated in the driver seat. In the present embodiment, when seat back 13 is viewed in the Y-axis direction, second inlet 532*a* overlaps seat frame 13*c*.

Second air-sending path 232*b* further extends from the tip of extending first air-sending path 232*a* to two sides in the positive Y-axis direction and the negative Y-axis direction. Second air-sending path 232*b* is straight when viewed in the X-axis direction, as illustrated in FIG. 16. Second air-sending path 232*b* substantially forms outlet 33*a*. Fins 33*b* are provided at second air-sending path 232*b* that forms outlet 33*a*.

Outlet 33*a* is provided at a position above second inlet 532*a*, and thus is provided in the positive Z-axis direction relative to (vertically above) second inlet 532*a*. The position of outlet 33*a* is not limited to the position in FIG. 16, and one or more outlets 33*a* are provided at one or more of the positions corresponding to the head, neck, shoulders, back, waist, buttocks, and thighs of a person.

As illustrated in FIG. 15 and FIG. 16, three-dimensional structure 39 is provided in at least one of first air-sending path 232*a* or second air-sending path 232*b*. In the present embodiment, three-dimensional structure 39 is provided in first air-sending path 232*a*. Note that three-dimensional structure 39 may be provided in second air-sending path 232*b* that is a portion closer to outlet 33*a*, but is provided so as not to cover outlet 33*a*.

With such a configuration of vehicle seat air-conditioning device 3*c*, air staying between the driver seat and the front passenger seat is drawn in, and the air drawn in is blown out from one or more of the portions corresponding to the head, neck, shoulders, back, waist, buttocks, and thighs of a person, thus generating air currents that cover a person seated in seat 1.

When air is blown out from outlet 33*a*, air currents are generated vertically above the center of outlet 33*a* between fins 33*b* and the inner wall of second air-sending path 232*b* and between two adjacent fins 33*b*, and air moves along the surfaces of fins 33*b* and the inner wall surface of second air-sending path 232*b*, so that air moves from outlet 33*a* also vertically below the center of outlet 33*a* due to the Coanda effect, or in other words, air is blown out. The air blown out from outlet 33*a* due to the Coanda effect flows in the X-axis direction toward the negative Z-axis direction. Accordingly, air currents that cover a person seated in a seat from the head to the thighs of the person can be generated. Thus, air that flows along the posture of a person seated in the driver/front passenger seat can be blown onto the person.

[Outlet Temperature Sensor 50]

As illustrated in FIG. 16 to FIG. 18, outlet temperature sensor 50 is provided in the vicinity of outlet 33*a*, and detects temperature in the vicinity of outlet 33*a*. For example, outlet temperature sensor 50 can detect the temperature of air blown out from outlet 33*a*. Note that outlet temperature sensor 50 may be provided inside of outlet 33*a*, that is, the inside of second air-sending path 232*b*, or may be provided in the vicinity of outlet 33*a* provided outside of second ventilation path 532. Outlet temperature sensor 50 outputs, to controller 60, information indicating the temperature, as a detected result.

[Controller 60]

Controller 60 controls blower 34 according to the temperature detected by outlet temperature sensor 50. For example, controller 60 sets the air volume of blower 34 to a first air volume when the temperature detected by outlet temperature sensor 50 is higher than or equal to a threshold. Controller 60 sets the air volume of blower 34 to a second air volume smaller than the first air volume when the temperature detected by outlet temperature sensor 50 is lower than the threshold. Thus, controller 60 controls blower 34 to increase the air volume of blower 34 if the temperature detected by outlet temperature sensor 50 is high, whereas controller 60 controls blower 34 to decrease the air volume of blower 34 if the temperature detected by outlet temperature sensor 50 is low. Note that the threshold is about 18 degrees Celsius, for example, but the temperature can be set as appropriate and thus is not limited to 18 degrees Celsius. For example, the threshold may be changed according to a season.

<Result of Simulation>

FIG. 21 illustrates results of simulation of the flow velocity of air blown out from an outlet. Part a1 of FIG. 21 illustrates an outlet that is not provided with a fin, and a2 of FIG. 21 shows a result of simulation of the flow velocity of air blown out from the outlet in at of FIG. 21. Part b2 of FIG. 21 illustrates an outlet when a fin is provided at the center of the outlet in the height direction, and b2 of FIG. 21 shows a result of simulation of the flow velocity of air blown out from the outlet in b1 of FIG. 21. Part c1 of FIG. 21 illustrates an outlet when a single fin is provided vertically above the center of the outlet in the height direction, and c2 of FIG. 21 shows a result of simulation of the flow velocity of air blown out from the outlet in c1 of FIG. 21. Part d1 of FIG. 21 illustrates an outlet when a single fin is provided at the center of the outlet in the height direction and another single fin is provided vertically above the center, and d2 of FIG. 21 shows a result of simulation of the flow velocity of air blown out from the outlet in d1 of FIG. 21. Note that at, b1, c1, and d1 of FIG. 21 are schematic diagrams of the second ventilation path when viewed in the Y-axis direction.

As can be seen from a2 of FIG. 21, the air blown out from the outlet flows in the normal direction orthogonal to the opening plane of the outlet. Also in the case of b2 of FIG. 21, there is no significant difference from the case of a2 of FIG. 21. On the other hand, as compared with the cases of a2 and b2 of FIG. 21, it can be seen from c2 and d2 of FIG. 21 that air flows in an arcing manner in the X-axis direction toward the negative side of the Z-axis direction.

Accordingly, in the present embodiment, a configuration in which fins 33*b* are provided vertically above the center of outlet 33*a* in the height direction is adopted.

<Processing>

FIG. 22 is a flowchart illustrating processing performed by vehicle seat air-conditioning device 3*c* according to the embodiment.

First, as illustrated in FIG. 22, outlet temperature sensor 50 detects a temperature in the vicinity of outlet 33*a* (S51). Outlet temperature sensor 50 outputs, to controller 60, information indicating the temperature, as a detected result. Controller 60 obtains the information indicating the temperature from outlet temperature sensor 50. Controller 60 controls blower 34 according to the temperature indicated by the obtained information, that is, the temperature in the vicinity of outlet 33*a* detected by outlet temperature sensor 50.

Next, controller 60 determines whether the temperature detected by outlet temperature sensor 50 is higher than or equal to a threshold (S52).

Controller 60 controls blower 34 to set the air volume of blower 34 to a first air volume (S53) when the temperature detected by outlet temperature sensor 50 is higher than or equal to the threshold (Yes in S52). Specifically, controller 60 increases the air volume of blower 34 by setting the air volume of blower 34 to "High" if the temperature detected by outlet temperature sensor 50 is higher than or equal to the threshold.

Controller 60 controls blower 34 to set the air volume of blower 34 to a second air volume smaller than the first air volume (S54) when the temperature detected by outlet temperature sensor 50 is lower than the threshold (No in S52). Specifically, controller 60 increases the air volume of blower 34 by setting the air volume of blower 34 to "Low" when the temperature detected by outlet temperature sensor 50 is lower than the threshold. Then, controller 60 ends the processing.

[Operational Effects]

Next, operational effects yielded by vehicle seat air-conditioning device 3*c* according to the present embodiment are to be described.

As described above, in vehicle seat air-conditioning device 3*c* according to the present embodiment, a driver seat and a front passenger seat each include seat back 13, the driver seat and the front passenger seat each being seat 1 of the vehicle, and second inlet 532*a* is provided in: one of side surface 13*a*1 of the driver seat that faces the front passenger seat, back surface 13*a*3 on an opposite side from front surface 13*a*2 that is in contact with a person seated in the driver seat, or a corner portion stretching from a portion of side surface 13*a*1 to a portion of back surface 13*a*3 of the driver seat, side surface 13*a*1, back surface 13*a*3, and the corner portion being included in seat back 13; or one of side surface 13*a*1 of the front passenger seat that faces the driver seat, back surface 13*a*3 on an opposite side from front surface 13*a*2 that is in contact with a person seated in the front passenger seat, or a corner portion stretching from a portion of side surface 13*a*1 to a portion of back surface 13*a*3 of the front passenger seat, side surface 13*a*1, back surface 13*a*3, and the corner portion being included in seat back 13.

According to this, the position of second inlet 532*a* can be placed in side surface 13*a*1, back surface 13*a*3, or the corner portion, and thus the degree of freedom of providing second inlet 532*a* can be ensured. Further, second inlet 532*a* can be formed not only in side surface 13*a*1 of the driver or front passenger seat, but also in a portion that stretches to a portion of back surface 13*a*3 of the driver or front passenger seat, and thus the opening area of second inlet 532*a* can be increased as much as possible. Accordingly, air blown out by the air-conditioning unit can be more efficiently drawn in from second inlet 532*a*.

Furthermore, outlets 2*c* of vehicle air-conditioning unit 2*b* (hereinafter, also referred to as outlets 2*c* of air-conditioning unit 2*b*) provided in vehicle 100 are normally provided in an instrument panel of vehicle 100. Conditioned air resulting from conditioning air is blown out from outlets 2*c* of air-conditioning unit 2*b* toward the driver seat and the front passenger seat.

In vehicle seat air-conditioning device 3*c* according to the present embodiment, second inlet 532*a* is provided between the driver seat and the front passenger seat, and thus conditioned air blown out from outlets 2*c* of air-conditioning unit 2*b* contributes to conditioning ambient air, and thereafter is drawn in from second inlet 532*a*. Accordingly, air-conditioning efficiency in the cabin is less likely to be lowered.

Since second inlet 532*a* is provided at a position where a person, for instance, is unlikely to be present in a space between second inlet 532*a* and outlets 2*c* of vehicle air-conditioning unit 2*b*, conditioned air blown out from outlets 2*c* of air-conditioning unit 2*b* is less likely to be interrupted by a person seated in the driver seat or the front passenger seat.

Thus, in vehicle seat air-conditioning device 3*c*, a decrease in air-conditioning efficiency in the cabin is reduced, and also air blown out from vehicle air-conditioning unit 2*b* can be efficiently drawn in and blown toward a person.

In particular, ambient air that includes conditioned air can be drawn in from second inlet 532*a*, without being influenced by a disturbance such as a difference between physiques or a posture of a person seated. Accordingly, conditioned air from vehicle air-conditioning unit 2*b* is reused, and thus energy consumption of the vehicle can be reduced.

In addition, this configuration eliminates necessity of providing a duct that connects vehicle air-conditioning unit 2*b* to vehicle seat air-conditioning device 3*c*, and thus the cost of manufacturing vehicle seat air-conditioning device 3*c* is less likely to increase. Moreover, since a duct is not provided, the space of the cabin is less likely to be decreased.

In vehicle seat air-conditioning device 3*c* according to the present embodiment, vehicle 100 is provided with center console 2*a* between the driver seat and the front passenger seat, and second inlet 532*a* is provided at a position above center console 2*a*.

According to this, the position of second inlet 532*a* can be placed at a certain height, and thus a space between second inlet 532*a* and outlets 2*c* of air-conditioning unit 2*b* is less likely to be blocked by an obstacle such as center console 2*a*. Accordingly, air blown out from air-conditioning unit 2*b* can be efficiently drawn in from second inlet 532*a*.

In vehicle seat air-conditioning device 3*c* according to the present embodiment, the driver seat and the front passenger seat each has a structure in which seat frame 13*c* is provided inside of seat back 13. When viewed in a direction in which the driver seat and the front passenger seat are aligned, second inlet 532*a* provided in the driver seat overlaps seat frame 13*c* or is between back surface 13*a*3 and seat frame 13*c*, back surface 13*a*3 being on the opposite side from front surface 13*a*2 that is in contact with a person seated in the driver seat.

According to this, when a person is seated in the driver/front passenger seat, cushioning of the driver seat and the front passenger seat can be ensured, and thus the person is less likely to feel uncomfortable. Furthermore, a possibility that movement of a hand of the person prevents air from being drawn in can be decreased.

In vehicle seat air-conditioning device 3*c* according to the present embodiment, second inlet 532*a* is provided with a cover that is air-permeable.

According to this, while capability of drawing air in from second inlet 532*a* is ensured, the appearance of the driver seat and the front passenger seat in each of which second inlet 532*a* is formed can be maintained well.

Vehicle seat air-conditioning device 3*c* according to the present embodiment includes: fin 33*b* that is provided at outlet 33*a* and leads, in a predetermined direction, air blown out from outlet 33*a*.

According to this, air that flows along the posture of a person seated in the driver/front passenger seat can be blown onto the person. Accordingly, the person seated in the driver/front passenger seat can be provided with a more comfortable air-conditioned environment.

In vehicle seat air-conditioning device 3*c* according to the present embodiment, fin 33*b* is provided vertically above a center of outlet 33*a* in a height direction.

According to this, even in a small space such as a cabin, the air-path axis of air blown out from outlet 33*a* due to the Coanda effect can be controlled. Accordingly, air that flows along the posture of a person seated in the driver/front passenger seat can be blown onto the person. Accordingly, the person seated in the driver/front passenger seat can be provided with a more comfortable air-conditioned environment.

Vehicle seat air-conditioning device 3*c* according to the present embodiment includes: outlet temperature sensor 50 electrically connected to controller 60, and provided in a vicinity of outlet 33*a*. Controller 60 controls blower 34 according to a temperature detected by outlet temperature sensor 50.

According to this, the temperature of air to be blown onto persons seated in the driver seat and the front passenger seat can be detected, and thus the air volume of blower 34 can be appropriately adjusted according to the temperature. Accordingly, the persons seated in the driver seat and the front passenger seat can be provided with a more comfortable air-conditioned environment.

In vehicle seat air-conditioning device 3*c* according to the present embodiment, controller 60: sets an air volume of blower 34 to a first air volume when the temperature detected by outlet temperature sensor 50 is higher than or equal to a threshold; and sets the air volume of blower 34 to a second air volume when the temperature detected by outlet temperature sensor 50 is lower than the threshold, the second air volume being smaller than the first air volume.

According to this, for example, if the temperature of air blown onto persons seated in the driver seat and the front passenger seat is low, the air volume of blower 34 can be decreased or if the temperature of air blown onto persons seated in the driver seat and the front passenger seat is high, the air volume of blower 34 can be increased.

Vehicle seat air-conditioning device 3*c* according to the present embodiment includes: three-dimensional structure 39 provided inside of at least one of first ventilation path 31, second ventilation path 532, or third ventilation path 33.

According to this, even if persons are seated in the driver seat and the front passenger seat, second ventilation path 532 are not compressed and air can be led therethrough, and thus second ventilation path 532 can lead air from second inlet 532*a* to outlet 33*a* with use of blower 34. Accordingly, the persons seated in the driver seat and the front passenger seat can be provided with a more comfortable air-conditioned environment.

Variation 1 of Embodiment 5

In this variation, a difference from vehicle seat air-conditioning device 3*c* according to the embodiment is that a portion of second ventilation path 131 slopes upward, as illustrated in FIG. 23. FIG. 23 is a plan view illustrating a seat provided with vehicle seat air-conditioning device 3*c* according to Variation 1 of Embodiment 5. The other configuration in this variation is the same as that of the embodiments unless otherwise specifically stated, and thus the same signs are given to the same configuration and functions, and a detailed description of the configuration and functions is omitted.

Between second inlet 532*a* and blower 34, second ventilation path 131 slopes from second inlet 532*a* to a position vertically above second inlet 532*a*. Specifically, first air-sending path 232*a* slopes upward relative to the X-Y plane at least between second inlet 532*a* and blower 34. Accordingly, blower 34 is provided at a position higher than (vertically above) second inlet 532*a*.

In such vehicle seat air-conditioning device 3*c* according to this variation, between second inlet 532*a* and blower 34, second ventilation path 131 slopes from second inlet 532*a* to a position vertically above second inlet 532*a*.

Accordingly, for example, even if a person spills drink, the liquid that is the drink is less likely to come into the seat farther from second inlet 532*a*. Accordingly, malfunction of an electrically equipped device such as blower 34 provided inside of second ventilation path 131 can be avoided.

This variation also yields operational effects similar to those as described above.

Variation 2 of Embodiment 5

In this variation, a difference from the vehicle seat air-conditioning device according to Embodiment 5 is that second inlet 532*a* is provided in a corner portion of seat back 13. The other configuration in this variation is the same as that of Embodiment 5, for instance, and thus the same signs are given to the same configuration and functions, and a detailed description of the configuration and functions is omitted.

FIG. 24 is a cross sectional view illustrating second inlet 532*a* formed in a corner portion of vehicle seat air-conditioning device 3*c* according to Variation 2 of Embodiment 5.

Second inlet 532*a* is formed in a corner portion of seat back 13 that stretches from a portion of side surface 13*a*1 to a portion of back surface 13*a*3 of the driver seat. Thus, second inlet 532*a* opens from side surface 13*a*1 of seat 1 toward the interior of the cabin and opens from back surface 13*a*3 of seat 1 toward the interior of the cabin.

A cover is provided over the corner portion. Accordingly, the cover covers second inlet 532*a*.

Air-permeability of a portion of the cover covering the portion of side surface 13*a*1 included in the corner portion is higher than air-permeability of a portion of the cover covering the portion of back surface 13*a*3 included in the corner portion. For example, through-holes for leading air to second ventilation path 532 are formed in the cover. Accordingly, the opening area of through-holes in the cover covering the portion of back surface 13*a*3 included in the corner portion is smaller than the opening area of through-holes in the cover covering the portion of side surface 13*a*1 included in the corner portion. Accordingly, air-permeability of the portion of the cover covering the portion of side surface 13*a*1 included in the corner portion and air-permeability of the portion of the cover covering the portion of back surface 13*a*3 included in the corner portion can be adjusted.

In this variation, the portion of the cover covering second inlet 532*a* in side surface 13*a*1 included in the corner portion is referred to as highly air-permeable portion 32*a*1. Further, the portion of the cover covering second inlet 532*a* in back surface 13*a*3 included in the corner portion is referred to as low air-permeable portion 32*a*2. Note that the portion of the cover covering the portion of side surface 13*a*1 included in the corner portion is made of, for example, fabric, and the fabric for highly air-permeable portion 32*a*1 is more coarsely woven than the fabric for low air-permeable portion 32*a*2.

In this manner, in the vehicle seat air-conditioning device according to this variation, second inlet 532*a* is formed in the corner portion, and the cover is provided over the corner portion. Air-permeability of the portion of the cover covering the portion of side surface 13*a*1 included in the corner portion is higher than air-permeability of the portion of the cover covering the portion of back surface 13*a*3 included in the corner portion.

Accordingly, the volume of air drawn in can be sufficiently ensured by forming second inlet 532*a* in the corner portion. Furthermore, dust stirred up by legs of a person seated in the rear seat is often sucked from the corner portion on the back surface 13*a*3 side. Accordingly, in vehicle seat air-conditioning device 3*c*, air-permeability of the portion of the cover covering the portion of back surface 13*a*3 included in the corner portion is lower, so that dust is less likely to be sucked in.

Embodiment 6

In the present embodiment, a difference from the vehicle seat air-conditioning device according to Embodiment 1 is that vehicle seat air-conditioning device 3*d* further includes outlet temperature sensor 50. The other configuration in the present embodiment is the same as that of Embodiment 1, for instance, and thus the same signs are given to the same configuration and functions, and a detailed description of the configuration and functions is omitted.

FIG. 25 is a block diagram illustrating vehicle seat air-conditioning device 3*d* according to Embodiment 6.

As illustrated in FIG. 25, vehicle seat air-conditioning device 3 includes outlet temperature sensor 50, in addition to blower 34, ventilation path selection switch 35, first temperature sensor 51, second temperature sensor 52, controller 60, and operation receiver 65, for instance.

Outlet temperature sensor 50 is electrically connected to controller 60.

Outlet temperature sensor 50 is provided, for example, in the vicinity of outlet 33*a*, and detects a temperature in the vicinity of outlet 33*a*. As illustrated in FIG. 25, outlet temperature sensor 50 outputs, to controller 60, information indicating the temperature, as a detected result.

Controller 60 controls blower 34 based on the temperature detected by outlet temperature sensor 50 when ventilation path selection switch 35 maintains one of the modes for a first predetermined period. Here, the first predetermined period is about several minutes for which a mode is assumed to be stable. A specific example of the first predetermined period is about 5 minutes. Note that this is a mere example, and the first predetermined period is not limited to 5 minutes.

<Processing>

FIG. 26 is a flowchart illustrating processing performed by vehicle seat air-conditioning device 3*d* according to Embodiment 6.

In FIG. 26, the same processing as that in FIG. 4 and the same processing as that in FIG. 22 are given the same signs, and description thereof is omitted as appropriate.

Controller 60 proceeds to step S61 when processing in steps S11 to S13 is performed, when processing in step S11 is performed, the result of step S12 is No, the result of step S14 is Yes, and processing in step S15 is performed, and when processing in step S11 is performed, the result of step S12 is No, the result of step S14 is No, and processing in steps S16 and S17 is performed.

Next, controller 60 determines whether the mode of ventilation path selection switch 35 is maintained for the first predetermined period (S61).

When controller 60 determines that the mode of ventilation path selection switch 35 is not maintained for the first predetermined period (No in S61), the processing in the flowchart in FIG. 26 ends. Then, controller 60 repeats processing from step S11.

On the other hand, when controller 60 determines that the mode of ventilation path selection switch 35 is maintained for the first predetermined period (Yes in S61), outlet temperature sensor 50 detects a temperature in the vicinity of outlet 33*a* (S62). Outlet temperature sensor 50 outputs, to controller 60, information indicating the detected temperature, as a detected result.

Next, controller 60 obtains information indicating the temperature.

Controller 60 ends the processing in the flowchart in FIG. 26 when the result of step S52 is Yes and processing in step S53 is performed and when the result of step S52 is No and processing in step S54 is performed. Then, controller 60 repeats processing from step S11.

[Operational Effects]

Next, operational effects yielded by vehicle seat air-conditioning device 3*d* according to the present embodiment are to be described.

As described above, in vehicle seat air-conditioning device 3*d* according to the present embodiment, controller 60 controls blower 34 based on the temperature detected by outlet temperature sensor 50 when ventilation path selection switch 35 maintains one of the modes for a first predetermined period.

According to this, in order to be compatible with the control by first temperature sensor 51 and second temperature sensor 52, priority is given to the control by first temperature sensor 51 and second temperature sensor 52, and outlet temperature sensor 50 can control blower 34 once the temperature is stabilized. According to this, vehicle seat air-conditioning device 3*d* can more finely adjust the temperature and the air volume. As a result, a more comfortable air-conditioned environment can be provided.

The present embodiment also yields operational effects similar to those as described above.

Other Variations Etc.

The above has described the present disclosure based on Embodiments 1 to 6, yet the present disclosure is not limited to such Embodiments 1 to 6, for instance.

For example, in the vehicle seat air-conditioning devices according to Embodiments 1 to 6, a seat may be provided with a seat heater. The seat heater is provided in at least one of the seating portion or the seat back of a seat in a vehicle, for instance, and warms the back, waist, buttocks, and thighs, for instance, by generating heat. The seat heater heats the seat at a heating setting, and does not heat the seat at a non-heating setting. The seat heater may be provided between the first seat pad and the first seat cover or between the second seat pad and the second seat cover. The seat heater may include a base material and a heater line. The base material may be a nonwoven fabric formed into a sheet with elastic, flexible, and ductile material or a foam resin such as urethane fabric. The heater line may be a conductive line that is electrically connected to a controller that controls power to be supplied to the heater line, and generates heat using power from a power supply controlled by the controller. The controller may be able to allow or stop electric current that is to flow through the heater line, or to control the amount of heat generated by the heater line by changing the value of the electric current. Note that the seat heater may be provided with a temperature sensor. In this case, the temperature sensor is an example of the first temperature sensor.

In the vehicle seat air-conditioning devices according to Embodiments 1 to 6, the first inlets and/or the second inlet may be formed in the seat back. The second inlet may be provided, facing an outlet (a duct in the center console, for example) of a heating, ventilation, and air conditioning (HVAC) system.

In the vehicle seat air-conditioning devices according to Embodiments 1 to 6, the vehicle seat air-conditioning device may have a function for adjusting the air volume of the blower. In this case, during a cooling operation, the controller may correct the target discharge temperature to a lower temperature when the air volume of the blower is set to "High", and may correct the target discharge temperature to a higher temperature when the air volume of the blower is set to "Low".

The vehicle seat air-conditioning devices according to Embodiments 1 to 6 described above may each be separately provided with an air-conditioning device such as an air conditioner that can perform heating and cooling operations. The vehicle seat air-conditioning devices may each be able to directly draw in conditioned air blown out from the vehicle air-conditioning device.

In the vehicle seat air-conditioning devices according to Embodiments 1 to 6, the seat may be provided with a seat heater. The seat heater is provided in at least one of the seating portion or the seat back of a seat in a vehicle, for instance, and warms the back, waist, buttocks, and thighs, for instance, by generating heat. The seat heater heats the seat at a heating setting, and does not heat the seat at a non-heating setting. The seat heater may be provided between the first seat pad and the first seat cover or between the second seat pad and the second seat cover. The seat heater may include a base material and a heater line. The base material may be a nonwoven fabric formed into a sheet with elastic, flexible, and ductile material or a foam resin such as urethane fabric. The heater line may be a conductive line that is electrically connected to a controller that controls power to be supplied to the heater line, and generates heat using power from a power supply controlled by the controller. The controller may be able to allow or stop electric current that is to flow through the heater line, or to control the amount of heat generated by the heater line by changing the value of the electric current.

In the vehicle seat air-conditioning devices according to Embodiments 1 to 6, in the driver seat, the inlet is provided on a side closer to the front passenger seat, but may be provided in a side surface on the opposite side from the side closer to the front passenger seat. In the front passenger seat, the inlet is provided on the side closer to the driver seat, but may be provided in a side surface on the side opposite from the side closer to the driver seat.

Vehicle seat air-conditioning device 3 according to Embodiment 2 described above may include outlet temperature sensor 50 in FIG. 25 electrically connected to controller 60 in FIG. 7. Thus, vehicle seat air-conditioning device 3 according to Embodiment 2 in FIG. 7 may have the same configuration as that of vehicle seat air-conditioning device 3*d* according to Embodiment 6. In the flowchart in FIG. 8, steps S61 and S62 in FIG. 26 may be added after step S27. Also in this case, the vehicle seat air-conditioning device can adjust the temperature and the air volume more finely. As a result, a more comfortable air-conditioned environment can be provided. Also in this case, operational effects are yielded which are similar to those yielded by vehicle seat air-conditioning device 3*d* according to Embodiment 6.

Vehicle seat air-conditioning device 3 according to Embodiment 3 described above may include outlet temperature sensor 50 in FIG. 25 electrically connected to controller 60 in FIG. 10. Thus, vehicle seat air-conditioning device 3 according to Embodiment 3 in FIG. 10 may have the same configuration as that of vehicle seat air-conditioning device 3*d* according to Embodiment 6. In the flowchart in FIG. 11, steps S61 and S62 in FIG. 26 may be added after step S34. Also in this case, the vehicle seat air-conditioning device can adjust the temperature and the air volume more finely. As a result, a more comfortable air-conditioned environment can be provided. Also in this case, operational effects are yielded which are similar to those yielded by the vehicle seat air-conditioning device according to Embodiment 5.

The processing units included in the vehicle seat air-conditioning devices according to Embodiments 1 to 6 described above are typically achieved as large-scale integrated circuits (LSIs). The integrated circuits may be each formed into a single chip or some or all of the integrated circuits may be formed into a single chip.

Furthermore, the way to achieve integration is not limited to large-scale integration, and implementation through a dedicated circuit or a general-purpose processor is also possible. A field programmable gate array (FPGA) that can be programmed after manufacturing an LSI or a reconfigurable processor that allows re-configuration of the connection and setting of circuit cells inside an LSI can be used.

Note that each of the elements in Embodiments 1 to 6 described above may be configured in the form of a dedicated hardware product, or may be achieved by executing a software program suitable for the element. Each of the elements may be achieved by a program executor such as a CPU or a processor reading and executing the software program recorded on a recording medium such as a hard disc or a semiconductor memory.

All the numerals used above are stated as examples to specifically describe the present disclosure, and thus Embodiments 1 to 6 of the present disclosure are not limited to the numerals stated as examples.

Split of functional blocks in the block diagrams is an example, and thus a plurality of functional blocks may be achieved as one functional block, one functional block may be split into a plurality of blocks, or some functions may be transferred to another functional block. Single hardware or software may process similar functions of a plurality of functional blocks, in parallel or by time division.

The order in which steps included in the flowcharts are performed is an example for specifically describing the present disclosure, and the steps may be performed in an order other than the above. Further, some of the steps may be performed simultaneously (in parallel) with other steps.

The present disclosure also encompasses embodiments as a result of adding, to Embodiments 1 to 6, various modifications that may be conceived by those skilled in the art, and embodiments achieved by combining elements and functions in Embodiments 1 to 6 in any manner without departing from the scope of the present disclosure.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2020-182004 filed on Oct. 30, 2020, Japanese Patent Application No. 2020-182439 filed on Oct. 30, 2020, Japanese Patent Application No. 2021-096842 filed on Jun. 9, 2021, and PCT International Application No. PCT/JP2021/037218 filed on Oct. 7, 2021.

INDUSTRIAL APPLICABILITY

The present disclosure is applicable to a seat for a movable body such as a vehicle and a sofa, for example.

The invention claimed is:

1. A vehicle seat air-conditioning device for use in a seat of a vehicle, the vehicle seat air-conditioning device comprising:

a blower;

a ventilation path selection switch;

a controller that controls the ventilation path selection switch;

a first temperature sensor that detects a temperature in the cabin of the vehicle;

a second temperature sensor that detects a surface temperature of a person seated in the seat;

a first ventilation path that leads air drawn in from a first inlet by the blower to the ventilation path selection switch, the first inlet being provided in a seating surface on a seating portion of the seat, the seating portion of the seat being a portion of the seat configured for a person to sit thereon and being separate from a seat back of the seat, the seating surface being a surface for the person to sit;

a second ventilation path that leads air drawn in from a second inlet by the blower to the ventilation path selection switch, the second inlet being different from the first inlet and provided in a portion of the seat other than the seating surface; and a third ventilation path that leads at least one of the air led through the first ventilation path by the blower or the air led through the second ventilation path by the blower from the ventilation path selection switch to an outlet provided in the seat, wherein the first inlet opens toward an interior of a cabin of the vehicle, the first inlet and the second inlet are provided vertically below the outlet, at least the first inlet, the second inlet, and the outlet are provided in the seat, and at least the first ventilation path, a portion of the second ventilation path, the ventilation path selection switch, the blower, and the third ventilation path are provided inside of the seat, the second inlet is provided at a portion of the seating portion other than the seating surface, the ventilation path selection switch has modes for leading air to the third ventilation path, the modes including:

a first mode in which the first ventilation path is connected to the third ventilation path;

a second mode in which the second ventilation path is connected to the third ventilation path; and a third mode in which the first ventilation path and the second ventilation path are connected to the third ventilation path, and the controller switches between the modes of the ventilation path selection switch by selecting one of the modes from among the first mode, the second mode, and the third mode, wherein the controller switches between the modes of the ventilation path selection switch, based on information indicating a first temperature detected by the first temperature sensor and information indicating a second temperature detected by the second temperature sensor, and wherein the controller causes the ventilation path selection switch to execute the second mode when the first temperature detected by the first temperature sensor is higher than or equal to a set cabin temperature, and the second temperature detected by the second temperature sensor is higher than or equal to a first surface temperature.

2. The vehicle seat air-conditioning device according to claim 1, wherein the controller causes the ventilation path selection switch to execute the third mode when the first temperature detected by the first temperature sensor is higher than or equal to a set cabin temperature, and the second temperature detected by the second temperature sensor is lower than a first surface temperature and is higher than or equal to a second surface temperature that is lower than the first surface temperature.

3. A vehicle seat air-conditioning device for use in a seat of a vehicle, the vehicle seat air-conditioning device comprising:

a blower;

a ventilation path selection switch;

a controller that controls the ventilation path selection switch;

a first temperature sensor that detects a temperature in the cabin of the vehicle;

a second temperature sensor that detects a surface temperature of a person seated in the seat a first ventilation path that leads air drawn in from a first inlet by the blower to the ventilation path selection switch, the first inlet being provided in a seating surface on a seating portion of the seat, the seating portion of the seat being a portion of the seat configured for a person to sit thereon and being separate from a seat back of the seat, the seating surface being a surface for the person to sit;

a second ventilation path that leads air drawn in from a second inlet by the blower to the ventilation path selection switch, the second inlet being different from the first inlet and provided in a portion of the seat other than the seating surface; and a third ventilation path that leads at least one of the air led through the first ventilation path by the blower or the air led through the second ventilation path by the blower from the ventilation path selection switch to an outlet provided in the seat, wherein the first inlet opens toward an interior of a cabin of the vehicle, the first inlet and the second inlet are provided vertically below the outlet, at least the first inlet, the second inlet, and the outlet are provided in the seat, and at least the first ventilation path, a portion of the second ventilation path, the ventilation path selection switch, the blower, and the third ventilation path are provided inside of the seat, the second inlet is provided at a portion of the seating portion other than the seating surface, the ventilation path selection switch has modes for leading air to the third ventilation path, the modes including:

a first mode in which the first ventilation path is connected to the third ventilation path;

a second mode in which the second ventilation path is connected to the third ventilation path; and a third mode in which the first ventilation path and the second ventilation path are connected to the third ventilation path, and the controller switches between the modes of the ventilation path selection switch by selecting one of the modes from among the first mode, the second mode, and the third mode, wherein the controller switches between the modes of the ventilation path selection switch, based on information indicating a first temperature detected by the first temperature sensor and information indicating a second temperature detected by the second temperature sensor, and wherein the controller causes the ventilation path selection switch to execute the first mode when the first temperature detected by the first temperature sensor is lower than a set cabin temperature, and the second temperature detected by the second temperature sensor is lower than a second surface temperature and is higher than or equal to a third surface temperature that is lower than the second surface temperature.

4. The vehicle seat air-conditioning device according to claim 1, comprising:

a first temperature sensor that detects a temperature in the cabin of the vehicle, wherein the controller:

obtains information indicating the temperature in the cabin detected by the first temperature sensor and information indicating a target temperature that is preset;

calculates a target discharge temperature based on a difference between the temperature in the cabin and the target temperature indicated by the information; and switches between the modes of the ventilation path selection switch, according to the target discharge temperature calculated.

5. The vehicle seat air-conditioning device according to claim 1, wherein the controller switches between the modes of the ventilation path selection switch, based on a table showing a correlation between a temperature in the cabin and an elapsed time during which a vehicle air-conditioner provided in the vehicle keeps discharging conditioned air.

6. The vehicle seat air-conditioning device according to claim 1, wherein a plurality of first inlets are provided, the plurality of first inlets each being the first inlet, and the plurality of first inlets are provided in a center portion and an outer edge portion of the seating surface.

7. The vehicle seat air-conditioning device according to claim 6, wherein the outer edge portion is at least one of a rear portion or a front edge portion of the seating surface.

8. The vehicle seat air-conditioning device according to claim 1, wherein one or more outlets are provided, the one or more outlets each being the outlet, and the one or more outlets are provided at one or more of positions corresponding to a head, a neck, a shoulder, a back, and a waist of a person.

9. The vehicle seat air-conditioning device according to claim 1, comprising:

a fin that is provided at the outlet and leads, in a predetermined direction, air blown out from the outlet.

10. The vehicle seat air-conditioning device according to claim 9, wherein the fin is provided vertically above a center of the outlet in a height direction.

11. The vehicle seat air-conditioning device according to claim 1, comprising:

an outlet temperature sensor electrically connected to the controller, and provided in a vicinity of the outlet, wherein the controller controls the blower according to a temperature detected by the outlet temperature sensor.

12. The vehicle seat air-conditioning device according to claim 11, wherein the controller:

sets an air volume of the blower to a first air volume when the temperature detected by the outlet temperature sensor is higher than or equal to a threshold; and sets the air volume of the blower to a second air volume when the temperature detected by the outlet temperature sensor is lower than the threshold, the second air volume being smaller than the first air volume.

13. The vehicle seat air-conditioning device according to claim 11, wherein the controller controls the blower based on the temperature detected by the outlet temperature sensor when the ventilation path selection switch maintains one of the modes for a first predetermined period.

14. The vehicle seat air-conditioning device according to claim 1, wherein the controller temporarily switches the ventilation path selection switch to the second mode, when the ventilation path selection switch is in one of the modes other than the second mode, and a change in the first temperature detected by the first temperature sensor and a change in the second temperature detected by the second temperature sensor are in a predetermined temperature range for a second predetermined period.

15. The vehicle seat air-conditioning device according to claim 1, wherein the second inlet is provided in a lower portion of the seating portion opposing the seating surface.

16. A vehicle seat air-conditioning device for use in a seat of a vehicle, the vehicle seat air-conditioning device comprising:

a blower;

a ventilation path selection switch;

a controller that controls the ventilation path selection switch;

a first ventilation path that leads air drawn in from a first inlet by the blower to the ventilation path selection switch, the first inlet being provided in a seating surface of the seat, the seating surface being a surface for a person to sit;

a second ventilation path that leads air drawn in from a second inlet by the blower to the ventilation path selection switch, the second inlet being different from the first inlet and provided in a portion of the seat other than the seating surface; and a third ventilation path that leads at least one of the air led through the first ventilation path by the blower or the air led through the second ventilation path by the blower from the ventilation path selection switch to an outlet provided in the seat, wherein the first inlet opens toward an interior of a cabin of the vehicle, the first inlet and the second inlet are provided vertically below the outlet, at least the first inlet, the second inlet, and the outlet are provided in the seat, and at least the first ventilation path, a portion of the second ventilation path, the ventilation path selection switch, the blower, and the third ventilation path are provided inside of the seat, the ventilation path selection switch has modes for leading air to the third ventilation path, the modes including:

a first mode in which the first ventilation path is connected to the third ventilation path;

a second mode in which the second ventilation path is connected to the third ventilation path; and a third mode in which the first ventilation path and the second ventilation path are connected to the third ventilation path, the controller switches between the modes of the ventilation path selection switch by selecting one of the modes from among the first mode, the second mode, and the third mode, a driver seat and a front passenger seat each include a seat back, the driver seat and the front passenger seat each being the seat of the vehicle, and the second inlet is provided in:

one of a side surface of the driver seat that faces the front passenger seat, a back surface on an opposite side from a front surface, or a corner portion stretching from a portion of the side surface to a portion of the back surface of the driver seat, the front surface being in contact with a person seated in the driver seat, the side surface, the back surface, and the corner portion being included in the seat back; or one of a side surface of the front passenger seat that faces the driver seat, a back surface on an opposite side from a front surface, or a corner portion stretching from a portion of the side surface to a portion of the back surface of the front passenger seat, the front surface being in contact with a person seated in the front passenger seat, the side surface, the back surface, and the corner portion being included in the seat back, the second inlet is provided with a cover that is air-permeable, the second inlet is provided in the corner portion and the cover is provided over the corner portion, and air-permeability of a portion of the cover covering the portion of the side surface included in the corner portion is higher than air-permeability of a portion of the cover covering the portion of the back surface included in the corner portion.

17. The vehicle seat air-conditioning device according to claim 3, wherein the controller causes the ventilation path selection switch to execute the third mode when the first temperature detected by the first temperature sensor is higher than or equal to a set cabin temperature, and the second temperature detected by the second temperature sensor is lower than a first surface temperature and is higher than or equal to a second surface temperature that is lower than the first surface temperature.

18. The vehicle seat air-conditioning device according to claim 3, wherein the controller temporarily switches the ventilation path selection switch to the second mode, when the ventilation path selection switch is in one of the modes other than the second mode, and a change in the first temperature detected by the first temperature sensor and a change in the second temperature detected by the second temperature sensor are in a predetermined temperature range for a second predetermined period.

* * * * *